United States Patent [19]

Garber et al.

[11] Patent Number: 4,905,163

[45] Date of Patent: Feb. 27, 1990

[54] INTELLIGENT OPTICAL NAVIGATOR DYNAMIC INFORMATION PRESENTATION AND NAVIGATION SYSTEM

[75] Inventors: Sharon R. Garber, Crystal; Darryn J. Kozak, New Brighton; John M. Kruse, Minneapolis, all of Minn.; Mark K. Clare, Fort Wayne, Ind.

[73] Assignee: Minnesota Mining & Manufacturing Company, St. Paul, Minn.

[21] Appl. No.: 252,917

[22] Filed: Oct. 3, 1988

[51] Int. Cl.$^4$ .............................................. G06F 15/18
[52] U.S. Cl. .................................... 364/513; 364/300; 364/200; 364/274.4; 364/274.7; 364/275.6; 364/275.9; 364/275.7
[58] Field of Search ................ 364/513, 300, 200, 900

[56] References Cited

U.S. PATENT DOCUMENTS 4,736,308 4/1988 Heckel .
4,752,889 6/1988 Rappaport et al. ................. 364/513

OTHER PUBLICATIONS

Date, C., An Introduction to Database Systems, Reading: Addison-Wesley, 1-8, 1982.
Roussopoulos, N., Faloutsos, F., and Sellis, T., An efficient pictorial database system for PSOL, IEEE Transactions on Software Engineering, vol. 14, 639-650, 1988.
Conklin, J., Hypertext: An introduction and survey, IEEE Computer, 17-41, Sep. 1987.
Sustik, J., Brooks, T., Retrieving Information with Interactive Videodiscs, Journal of the American Society for Information Science, 24, 424-432, 1983.
MacGuide, vol. 1, p. 179A, 1988.
Duda, R., and Hart, P. Pattern Classification and Scene Analysis, 1-9, New York, Wiley & Sons, 1973.
BYTE, p. 14, Aug., 1988.
Macuser, p. 261, May, 1988.
Bergeron, B., Greenes, R., HeartLab and EkgLab: Skill-Building Simultaneous in Cardiology, Demonstrations Digest, 11th Annual Symposium on Computer Applications in Medical Care, 29-30, 1987.
Myklebust, A., Mechanical computer-aided engineering, IEEE Computer Graphics and Applications, 25-25, Mar., 1988.
Gossard, D., Zuffante, R., and Sakurai, H., Representing Dimensions, Tolerances, and Features in MCAE Systems, IEEE Computer Graphics and Applications, 51-59, Mar. 1988.
Wenger, E., *Artificial Intelligence and Tutoring Systems*, Los Altos, Morgan Kaufman, 79-88, 1987.
MACSYMA (advertising brochure from Symbolics, Inc.).
Rich, E., *Artificial Intelligence*, New York: McGraw-Hill, 215-222, 1983.

(List continued on next page.)

*Primary Examiner*—Allen MacDonald
*Attorney, Agent, or Firm*—Merchant, Gould, Smith, Edell, Welter & Schmidt

[57] ABSTRACT

Disclosed is a computerized information presentation system for dynamically organizing information in order to present to a user previously unrecognized relationships among portions of the information. The system comprises information description storage for storing information comprising a plurality of concepts and for each concept knowledge of allowable attributes for the concept and one or more of attributes, attribute values, and relationships among attributes and attribute values. The system further comprises categorization knowledge storage for storing knowledge of criteria for placing the concepts into categories and context determination for determining a current context based on system state. Mapping knowledge storage is included for storing knowledge of mappings between a particular context and the presentation of information. The system also includes dynamic categorization for dynamically placing the concepts into categories for presentation using the categorization criteria, the current context and the knowledge of mappings and for displaying on a user screen selected concepts and categories.

313 Claims, 83 Drawing Sheets

OTHER PUBLICATIONS

Fisher, K., Faletti, Jr., Thornton. R., Patterson, H., Lipson, J., and Spring, C., Computer-based knowledged representation as a tool for students and teachers, draft of paper, 1987.

Kinko's Academic Sourseware Exchange Spring 1988 Catalog, p. 49, 1988.

Halasz, F., Moran, T., and Trigg, R. NoteCards in a Nutshell, ACM, 45–52, Jun. 1987.

Komorowski, H., Greenes, R., Barr, C., and Pattison-Gordon, E., Browsing and Authoring Tools for a Unified Medical Language System, Harvard Medical School, Brigham and Women's Hospital, MA.

Delisle, N., and Schwartz, M., Neptune: a Hypertext System for CAD Applications, Technical Report No. CR-85-50, Computer Research Laboratory, Tektronix Laboratories, 1986.

Wenger, E., Artificial Intelligence and Tutoring Systems, Los Altos: Morgan Kaufmann Publishers, 3–25 and 427–432, 1987.

STATIC-DATA-STRUCTURES 914

AVAILABLE-ACTIVITIES 836

ACTIVITY-DATA-STRUCTURE 908

CONCEPT-NETWORK 910

CONCEPT-DATA-STRUCTURE 918

DYNAMIC-DATA-STRUCTURES 916

USER-HISTORY 912

©1988 3M COMPANY

```
USER-HISTORY (NAME JOHN JONES) 884

(BACKGROUND PHYSICIAN) 886

(TEMPORAL-HISTORY
          (SE-CANNULA  FOCUS-DISEASE))  888

(NUM-TIMES-PER-ACTIVITY
          (SE-CANNULA 4) (FOCUS-DISEASE 1))  890

(AMOUNT-TIME-PER-ACTIVITY
          (SE-CANNULA 3-MIN) (FOCUS-DISEASE 5-MIN))  892

(NUM-REQUESTS-FOR-INFO-BY-TYPE
          (TEXT 5)  (AUDIO 4))   894

(CONCEPTS-STUDIED
                CANNULA-SELECTION DISEASE-GENERAL)  896
  (CONCEPTS-UNDERSTOOD CANNULA-TYPES)  898

(CONCEPTS-NOT-UNDERSTOOD CANNULA-PLACEMENT)  900

(ACTIVITIES-IN-CURRENT-SESSION
                SE-CANNULA FOCUS-AORTA)  902

(CURRENT-ACTIVITY FOCUS-AORTA)  904

(CURRENT-CONCEPT DISEASED-AORTA)  906
```

©1988 3M COMPANY

```
DOMAINS (ABNORMAL-ECG? (NO YES)) 728

(AGE (32 33 41 51)) 730

(ALLERGY (NONE PENICILLIN SULFA)) 732

(DIAGNOSIS (ATRIAL-FIBRILLATION HEARTBLOCK INFARCTION))

(PHYSICIAN (KATZ SMITH GLARON))

(SEX (MALE FEMALE))

(SYMPTOM (WEAKNESS UNCONSCIOUS ANGINA))

(TREATMENT (ANGIOPLASTY PACEMAKER DIGITALIS))
```

© 1988 3M COMPANY

```
KNOWLEDGE STRUCTURE (ALPHABETIZED-DIMENSIONS
    (ABNORMAL-ECG? AGE ALLERGY DIAGNOSIS)) 734

(DEFAULT-SLOT-BEING-PICTURED  NEAR-HEART) 736

(MEMBERSHIP-DIMENSIONS
    (MEMBERSHIP SEX NIL (MALE FEMALE))) 738

(NN-CLOSENESS-FORMULAS
    (FIND-SIMILAR-PATIENTS (SYMPTOM 60 ABNORMAL-ECG?
     20 SEX 15 AGE 5))) 740

(RANK-ORDERED-DIMENSIONS
    (DIAGNOSIS TREATMENT SYMPTOM PHYSICIAN)) 742

(ROOT-UNIT PATIENTS) 744

(USEFUL-DIMENSIONS
    (DIAGNOSIS TREATMENT SYMPTOM PHYSICIAN)) 746
```

© 1988 3M COMPANY

CURRENT-QUERY (CURRENT-ROOT-UNIT NORMAL-HEART) 750

(KNOWLEDGE-STRUCTURE-UNIT
    KNOWLEDGE-STRUCTURE 716) 752

(SPACE-EXPLORER-SELECTION DISEASED-HEART) 754

(STANDING-CANDIDATES
    (NORMAL-HEART DISEASED-HEART YOUNG-HEART)) 756

(STANDING-CONSTRAINTS
    (NO-MALE NO-UNDER-ONE-YEAR)) 258

(STANDING-INDEXES MALE-INDEX) 260

(START-NEAREST-NEIGHBOR METHOD) 262

(START-SPACE-EXPLORER METHOD) 264

(TYPE-OF-SEARCH FAST) 266

(USER-MODEL-MORE-INFO PICTURE) 268

© 1988 3M COMPANY

DIMENSIONS-TO-EXPLORE (DIMENSION-VALUES-PLIST XX) 272

(EXPLORABLE-MEMBER-DIMS XX) 274

(INDEXED-STANDING-SETS XX) 278

(LIST-OF-DIMENSIONS (XX)) 280

© 1988 3M COMPANY

*FIG. 23*

```
┌─────────────────────────────────────────┐
│                                    ╱ 445│
│  ┌───────────────────────────────────┐  │
│  │ EQUATION DATA STRUCTURE           │  │
│  │                                   │  │
│  │    (NAME POISEUILLES LAW)  446    │  │
│  │                                   │  │
│  │    (CURR-ARRANGEMENT-PAIR         │  │
│  │      (PRINTABLE XXX) 450          │  │
│  │      (COMPUTABLE XXX)452) 448     │  │
│  │                                   │  │
│  │    (POSS-ARRANGEMENT-PAIRS        │  │
│  │      ((PRINTABLE XXX) 456         │  │
│  │       (COMPUTABLE XXX)) 458       │  │
│  │      ((PRINTABLE YYY)             │  │
│  │       ((COMPUTABLE YYY))) 454     │  │
│  │                                   │  │
│  │    (TERM-IN-LHS V) 460            │  │
│  │                                   │  │
│  │    (TERMS R, L, V, FLOW) 462      │  │
│  │                                   │  │
│  │    (TYPICAL VALUES                │  │
│  │        ("ADULT" ((L 72 "INCHES") (V 3 "CP"))))464 │
│  │                                   │  │
│  └───────────────────────────────────┘  │
└─────────────────────────────────────────┘

© 1988 3M COMPANY
```

FIG. 65

```
                                            ┌─ 437
┌─────────────────────────────────────────┐
│ TERM DATA STRUCTURE                     │
│                                         │
│    (NAME FLOW) 466                      │
│                                         │
│    (CURR VAL 96) 468                    │
│                                         │
│    (DESCRIPTIVE TEXT (THE FLOW OF BLOOD)) 470 │
│                                         │
│    (INTERNAL UNITS M**3/SEC) 472        │
│                                         │
│    (INTERNAL VALUE 0) 474               │
│                                         │
│    (MAX VAL ("L/MIN" 10)) 476           │
│                                         │
│    (PHYSICAL UNITS "./MIN") 478         │
│                                         │
│    (MIN VAL ("L/MIN" 0)) 480            │
│                                         │
│    (POSSIBLE UNITS M**3/SEC  L/MIN) 482 │
│                                         │
│    (RELATED CONCEPTS LOW-PUMP-FLOW,     │
│         CALCULATED-BLOOD-FLOW) 484      │
└─────────────────────────────────────────┘
```

© 1988 3M COMPANY

```
NODE-DATA-STRUCTURE (NODE-LABEL ELECTRICAL-SHORT METHOD-XX) 1154

(LINKS-NAMES-AND-VALUES
        ((PREREQUISITE-IS ELECTRICAL-CURRENT)) 1156

(POINTS-TO-ME
        ((CAUSED-BY FIRE))) 1158

(SYNONYMS SHORTED-WIRE SHORT) 1160

(RELATED-EQUATION OHMS-LAW) 1162
```

© 1988 3M COMPANY

CONTROL-SEMANTIC-NETS (CURRENT-LINKS PREREQUISITE-IS CAUSED-BY) 1168

(CURRENT-KBS FIRE-KNOWLEDGE-BASE) 1169

(CURRENT-QUERY (KB FIRE)) 1170

(FORMAT-MODIFICATION
        ((PATTERN FOREST)
         (MARKINGS NIL)
         (ORIENTATION HORIZONTAL)) 1172

(WORD-MATCH-RESTRICTED-TO-INDEXING
        (FIRE-INDEX FIRE)) 1174

(WORD-MATCH-RESTRICTED-TO-KBS
        (FIRE-KNOWLEDGE-BASE) 1176

©1988 3M COMPANY

*FIG. 77*

INTELLIGENT OPTICAL NAVIGATOR DYNAMIC INFORMATION PRESENTATION AND NAVIGATION SYSTEM

TECHNICAL FIELD

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to a computerized information system for dynamically organizing information in order to present to a user previously unrecognized relationships among portions of the information and for presenting techniques for navigation through the information.

BACKGROUND ART

In most fields of endeavor today, people require access to large bodies of information. Frequently the information is textual, but it might also include pictures, graphical images or auditory signals. For example, medical records may include x-rays, ekgs, patient descriptions and CT scans. Whether the area is medicine, art history, car mechanics, or home shopping, there is a need to organize information for presentation to a user and to make that organization flexible and dynamic. An important feature of the present Intelligent Optical Navigator (ION) system is its dynamic nature. That is, as the user browses through information available in the system, both the structure of the information and the manner of presenting it is changed in response to the user's input, and this is accomplished without the need for re-programming, which typically would require the skills and expertise of a system developer. This dynamic re-structuring allows a user to organize and view information according to the user's needs and preferences. As is described below, today's technology does not provide the dynamic, flexible re-organization and presentation of information which is present in the ION system.

In today's technology, databases are often used to organize and present information (for further information on typical database technology, see Date, C., *An Introduction to Database Systems*, Reading: Addison-Wesley, 1–80, 1982). Most databases include only text, but more recent advances allow access to visual databases as well (see, for example, Roussopoulos, N., Faloutsos, F., and Sellis, T., An efficient pictorial database system for PSQL, IEEE Transactions on Software Engineering, vol. 14, 639–650, 1988).

A limitation of traditional database technology is that it does not allow a user to organize information dynamically to fit the user's individual needs. Once an initial structure is built into the database, access to information is limited to the pre-built structure, typically a fixed set of queries. Through a series of manipulations, a system developer can add new queries using special query languages, but a system user is restricted to the types of queries which have been built in by the system developer. In that sense, the systems are not dynamic. In addition, items of information must be accessed sequentially. If, for example, a user asks for records of patients who visited a clinic on July 3rd and who had a diagnosis of heart disease, the system would pull up perhaps 30 patient records which then would be viewed sequentially. There is no possibility of viewing the data using an organization specified by the user as the user views the data unless that organization has been pre-built into the system by a system developer. In traditional systems, it also is impossible for a user to add into the system new information about arbitrary relationships between items of data. Suppose, for example, that a user wanted to indicate that patient A is related to patient B. Unless a "related" concept already existed in the system, the information could not be added.

The advent of hypertext systems has alleviated some, but not all, of these concerns (typical hypertext systems are described in Conklin, J., Hypertext: An introduction and survey, IEEE Computer, 17–41, September, 1987). In a typical hypertext system, a user may place arbitrary links between items of information and use these links to browse through information. However, in hypertext systems, the structure is limited to simple links between two items, and views into the data cannot be changed dynamically. A user cannot dynamically devise a new structure with which to view the data without asking a system developer to write new code. The ability to devise new structures is often important because it is the structure which helps give users an understanding of where they are currently located and where they can move within a space of data.

Accordingly, a problem with today's technology for information organization and presentation is that it lacks the flexibility to provide the capability for a user to dynamically re-arrange the presentation based upon the user's needs. For example, suppose that a user wishes to view travel information about different cities. With a typical database system, the user could specify certain characteristics about a city such as size and weather, and retrieve information about cities which meet those characteristics. In a typical hypertext system, the user could point to a map to indicate a geographical area, retrieve information about a city in that region, browse sequentially through information on its hotels, weather, and entertainment, and then jump to information which supplements the entertainment information currently on the screen. It would be difficult, however, to view simultaneously three or four cities which are organized on the user's monitor according to a structure defined by the user, for example, to create a definition of city-similarity and use the newly-created definition to find cities similar to the one on view. These functions require the ability of a system to dynamically re-organize based on user needs.

The present system circumvents these difficulties by providing a flexible structure for storing multi-media information and a series of presentation modes, each of which provides a different view of the information and an organization which can be altered dynamically by the user. The preferred system also provides user modeling (for example, it can monitor user activity to determine preferences and incorporate these preferences into future interaction with the user) and easy movement between related information in the multiple presentation modes (for example, a user may easily view the same information from the perspectives of two or three different presentation modes). The present system can be integrated with database or hypertext systems to serve as an intelligent front end to these systems and to provide the structure and dynamic re-organization capabilities desired while providing access to previously stored information. In addition to its use as an intelligent front end to a database, it can be integrated into many other types of systems such as tutorial, training, or simulation systems.

There are six presentation modes available in the current system. These are referred to in the present application as the Space Explorer, Nearest Neighbor, Focus, Dynamic Image Scanner, Living Equations, and SNETS systems. Each presentation mode will be described briefly below and compared with prior art which relates most closely to the mode.

The present Space Explorer system provides a method for organizing information into an n-dimensional space where the dimensions and methods of navigation through the space are selected by a user and may be changed dynamically. For example, suppose that a user wished to browse through information on art history. With the Space Explorer system, the user could decide to view only information on 20th century artists from the United States and then could ask the system to structure the information according to artist, medium and art-style. The Space Explorer system then would present a "three dimensional space" where the dimensions are artist, medium and art-style. A center work of art would be surrounded by three satellites, each differing from the center on one of the selected dimensions. The user then could navigate through the space by changing values on any of the dimensions displayed, thus causing the entire space to be re-organized dynamically. For example, if the user changed artist to "Chagall", all presented works of art would for that moment become "Chagall" pieces of art, with the other dimension values remaining intact. Navigation could also be accomplished by altering the dimensions, selecting new dimensions or adding dimensions to the current structure.

The ability to provide a structure based on an n-dimensional space and to dynamically alter the structure are unique characteristics of the Space Explorer system. Sustik and Brooks (Sustik, J., Brooks, T., Retrieving Information with Interactive Videodiscs, Journal of the American Society for Information Science, 34, 424–432, 1983) describe an idea in which a user can browse through information by gradually changing a value along a continuum such as color. However, only one dimension can be selected at a time, and the idea was not developed into a system. Educomp has released a "Macintosh" computer demo under the trademark "Mac a Mug" in which a graphic representation of a face is presented, and a user can browse through possible faces by altering characteristics such as hair style (MacGuide, Vol 1, page 179A, 1988). In the "Mac a Mug" system, the potential characteristics are predefined and may not be changed. None of these systems allows for dynamic re-organization of an n-dimensional space.

The preferred Nearest Neighbor system allows a user to create and use definitions of similarity in order to organize a plurality of concepts dynamically according to their similarity. For example, a user might select a concept "car" and a definition of similarity which indicates that another car is similar to the first if it is made by the same manufacturer, has roughly the same price and roughly the same engine size. The user might also indicate that seating capacity should be considered but should be a lower priority in a similarity definition. Using these criteria, the Nearest Neighbor system can retrieve information on several cars which are most similar to the initially selected car. An important component of the system is the ability of a user to create similarity definitions and to use a plurality of definitions in a single retrieval session. Thus, the system is dynamic and can be tailored to an individual's needs.

The Nearest Neighbor system differs from databases and hypertext systems by providing dynamically changing definitions of similarity and using them to structure the data. In database systems, queries must be predefined by a system developer and cannot be changed by a system user, and there is no concept of a "similarity" query. In hypertext systems a user may follow links but may not make similarity queries. Another example of prior art is pattern recognition systems which help to categorize objects by their attributes but do not allow a user to specify arbitrary similarity definitions or to use newly created definitions to access related data (see for example, Duda, R., and Hart, P., *Pattern Classification and Scene Analysis*, 1–9, New York, Wiley & Sons, 1973). They typically are quite slow, require complex mathematical analysis, and are used most often to perform image analysis. Thus, the Nearest Neighbor system provides a new way of thinking about and organizing information which can be very useful because it is flexible and can be molded to a user's needs.

The preferred Focus system allows a user to view a real world object from a number of different perspectives. For example, a user might want to view a car from a number of different positions and distances; the Focus system makes it easy for a user to select and change the position and distance. An important part of the Focus system is the flexibility provided in selection of real world object characteristics and values which are of interest in a particular situation and which provide access to a set of perspectives. A typical prior art system might provide access to multiple views of an object, but the views are pre-built and cannot be changed dynamically.

For example, a training system identified by the trademark "Electric Cadaver" (Byte, p. 14, August, 1988) provides a medical student with the ability to view anatomy by zooming in on a body part, rotating the part and viewing it via x-ray or graphics. It supports only limited editing of text and animation sequences. The Cardiac Imaging Project developed by Lynch (MACUSER, p. 261, May, 1988) provides animation sequences of anatomy and physiology of the heart, but these may only be viewed sequentially. A system identified by the name "HeartLab" system (see Bergeron, B., Greenes, R., HeartLab and EkgLab) Skill-Building Simulations in Cardiology, Demonstrations Digest, 11th Annual Symposium on Computer Applications in Medical Care, 29–30, 1987) provides graphic views of the heart for use in training in heart disease. When an area of the heart is selected, corresponding heart sounds may be heard. Unlike the Focus system, these systems are all domain dependent. The Search/Retrieval System described in U.S. Pat. No. 4,736,308 entitled "Search/Retrieval System" provides multiple pieces of information simultaneously. However, information may only be textual, and there is not an intelligent aid provided to help select the information for display.

Other examples of prior art may be found in computer-aided design (CAD) and computer-aided engineering (CAE) systems used to develop and manipulate representations of physical objects (see for example, Myklebust, A., Mechanical computer-aided engineering, IEEE Computer Graphics and Applications, 24–25, March, 1988, and Gossard, D., Zuffante, R., and Sakurai, H., Representing Dimensions, Tolerances, and Features in MCAE Systems, IEEE Computer Graphics and Applications, 51–59, March, 1988). The representations used in these systems are limited to line drawings or solid renderings based on computer graphics. The preferred Focus system is not limited in this regard, but can present to a user any video image or sequence. It also allows a user to specify dynamically a desired representation, context and level of detail.

In all of these prior art systems, the views available are built in by a system developer and generally may not be changed by a user. In contrast, the present Focus system provides the user with dynamic control over organization of presentation and method of navigating through the information. For example, the user may decide at one moment to view an object according to an organization based on distance from the object and position of the object, and in the next moment to view the object according to an organization based on functional use of the object. The user may dynamically navigate through the information by changing an object attribute in the existing organization or by changing the entire organization. The advantage of this system is that the user selects the structure most helpful for the user's current situation, and the new structure is implemented immediately.

The present Dynamic Image Scanner system allows a user to navigate through a plurality of concepts by manipulating graphical representations of concepts. For example, a user who is interested in "chairs" might be presented with a graphical representation of a "standard chair." The user might manipulate the image graphically to indicate a chair of a greater width. The system can interpret the manipulation and use it to access information about a chair which matches the new graphical representation; perhaps the new chair might be a love seat. The Dynamic Image Scanner system is particularly useful in browsing through information in situations in which it is difficult to describe verbally the modifications one has in mind. It might be hard to describe a chair which has a particular form but easy to draw the form. The system is dynamic and flexible because the user has the ability not only to make graphical manipulations but also to select the relationship desired between graphical interpretation and concepts selected. That is, in one case, the user might ask for a chair which is closest in form to the one drawn. In another case, the user might ask for information about the process of building such a chair.

There are many systems available which allow a user to make graphic manipulations on a screen. For example, graphics packages allow a user to draw complex objects, and CAD/CAM systems allow a user to manipulate 2-d and 3-d images. However, these packages have no method of interpreting manipulations and using interpretations to access related information. The "Electric Cadaver" system mentioned above allows a user to manipulate a nerve on a graphic representation of the body and access information on related disorders. However, there is only one type of manipulation available, and only one type of relationship available. In addition, it is tied to a specific medical application. Hypertext and database systems do not incorporate graphic manipulation into their querying techniques.

The preferred Living Equations system allows a user to examine both numerical and graphical representations of an equation, to manipulate the equation by altering the form of the equation, the values, or the units, and to examine relationships between terms of the equation and between concepts which are available in other systems such as the SNETS system described below. There are systems available which provide much more complex analyses of mathematical relationships but which are not as flexible. For example, they may be tied to a particular domain. A case in points is a system identified by the name "STEAMER" system (see Wenger, E., *Artificial Intelligence and Tutoring Systems*, Los Altos, Morgan Kaufmann, 79–88, 1987) which provides an interactive, inspectable simulation of a steam propulsion plant using computer graphics. A user can manipulate a variable such as temperature and see the results on the rest of the system. There are also packages which perform complex mathematical operations. For example, a system identified by the trademark "MACSYMA" (see advertising brochure from Symbolics, Inc.) performs algebra and trigonometry, calculus and differential equations and numerical analysis. By contrast, the Living Equations system handles single equations but provides a variety of related information about the equations. For example, when examining an equation on Poiseuille's law, a user can jump to a portion of a semantic net related to the changes in flow observed when manipulating the law. Related information which can be accessed includes motion sequences, graphics and pictures as well as text to provide a better understanding of the relationships observed. In addition, the Living Equations system is not limited to one domain such as steam plants, but can be applied across a variety of domains.

The preferred SNETS system allows a user to create, display, edit, store and browse through semantic nets and to integrate semantic nets with other forms of viewing information. A semantic net is a knowledge representation which displays concepts and relationships between them in a graphical form in which concepts are represented as nodes and relationships are represented as links between nodes (see, for example, Rich, E., *Artificial Intelligence*, New York: McGraw-Hill, 215–222, 1983). There are several semantic net building tools available under a variety of names such as "SemNet" (see Fisher, K., Faletti, J., Thornton, R., Patterson, H., Lipson, J., and Spring, C., Computer-based knowledge representation as a tool for students and teachers, draft of paper, 1987), "Learning Tool" (see Kinko's Academic Courseware Exchange Spring 1988 Catalog, page 49, 1988), "NoteCards" (see Halasz, F., Moran, T., and Trigg, R., NoteCards in a Nutshell, ACM, 45–52, June, 1987), "Unified Medical Language System" (Komorowski, H., Greenes, R., Barr, C., and Pattison-Gordon, E., Browsing and Authoring Tools for a Unified Medical Language System, Harvard Medical School, Brigham and Women's Hospital, Boston, MA), and "Neptune" (Delisle, N., and Schwartz, M., Neptune: a Hypertext System for CAD Applications, Technical Report No. CR-85-50, Computer Research Laboratory, Tektronix Laboratories, 1986).

All of these tools (including the SNETS system) allow a user to create semantic nets, to add and delete nodes and links and to browse through semantic nets. However, none of the systems provides the flexibility of the browsing capabilities available in the SNETS system. The "NoteCards" system referred to above allows navigation by following links and has a limited searching capability based on keyword matching. The "SemNet" system provides no capability to select sub-portions of the network. The system available under the name "Learning Tool" provides only three link-types and limited database-type queries. The "Unified Medical Language Systems" provides a "fish-eye" view of a node and its relationships. With this type of view, only closely related nodes are displayed. The "Neptune" system allows depth-first traversal and the ability to limit link types during a search. A major difference between these systems and the SNETS system is the availability of multiple methods of navigation in the SNETS system and the fact that views may be selected via a natural language interface. The SNETS system allows a user to view selected portions of a semantic net such as "causal links only," or "only concepts related to thunderstorms." A user may request information related to a particular concept and may ask to view the concept along with all or a selected subset of link-types connected to the concept. The depth of links also may be specified. The user can also ask to see that portion of the net which connects two selected concepts. Again, in this case, the link-types of interest may be selected as well. Additional methods of navigation include the ability to view all portions of a semantic net residing in a single knowledge base or multiple knowledge bases. The preferred system also is able to recognize misspellings.

The presentation modes described above are enhanced by the addition of a preferred User Modeling system which provides a set of data structures and a methodology to allow a system to monitor a user's responses and to modify interaction with a user depending upon responses. For example, a system might determine that a user often requests information in a visual form and almost never requests a graphic form. When several forms are available, the system might present information initially in a visual form to match the user's typical preferences. The present User Modeling system also can be used to determine when to initiate interaction with a presentation mode and to select a mode which fits a particular context. For example, the User Modeling system might be used to examine an individual's user history, determine what concepts are not understood and select a presentation mode best able to communicate those concepts. Within a particular presentation mode, the present User Modeling system can help make decisions such as the way in which information should be displayed to a particular user, and it can record relevant information about a user's activities while interacting with the presentation mode.

There has been much prior art in the area of intelligent tutoring (see, for example, Wenger, E., Artificial Intelligence and Tutoring Systems, Los Altos: Morgan Kaufmann Publishers, 3–25 and 427–432, 1987). The prior art includes systems which perform user modeling and which use this information to teach skills to an individual. The present User Modeling system augments rather than competes with this prior art. That is, it provides a structure which allows techniques developed in the prior art to be combined with the present Intelligent Optical Navigation (ION) system. For example, the ION system could be used within a context of a tutorial program where some of the teaching techniques are defined by prior art but use the Space Explorer and Nearest Neighbor systems. In addition, the present User Modeling system provides a user modeling methodology specific to multi-media systems and to the ION system. This is a methodology which is not present in prior art.

DISCLOSURE OF INVENTION

The present invention is a computerized information presentation system for dynamically organizing information in order to present to a user previously unrecognized relationships among portions of the information and for presenting techniques for navigation through the information. The system comprises information description means for storing information comprising a plurality of concepts, the information description means comprising means for storing for each concept knowledge of allowable attributes for the concept and one or more of attributes, attribute values, and relationships among attributes and attribute values. The system further comprises categorization knowledge means for storing knowledge of criteria for placing the concepts into categories and context determination means for determining a current context based on system state. Mapping knowledge means are included for storing knowledge of mappings between a particular context and the presentation of information. The system also includes dynamic categorization means for dynamically placing the concepts into categories for presentation using the categorization criteria, the current context and the knowledge of mappings and for displaying on a user screen selected concepts and categories.

BRIEF DESCRIPTION OF DRAWINGS

FIG. 7 illustrates data structures for the preferred User Modeling system.

FIG. 12 illustrates a user-history data structure.

FIG. 20 illustrates a domains data structure.

FIG. 21 illustrates a knowledge structure data structure.

FIG. 22 illustrates a current-query data structure.

FIG. 23 illustrates a dimensions-to-explore data structure.

FIG. 65 illustrates an equation data structure.

FIG. 66 illustrates a term data structure.

FIG. 75 illustrates a node data structure.

FIG. 77 illustrates a control-semantic-nets data structure.

DETAILED DESCRIPTION

General Introduction

Figure 1:
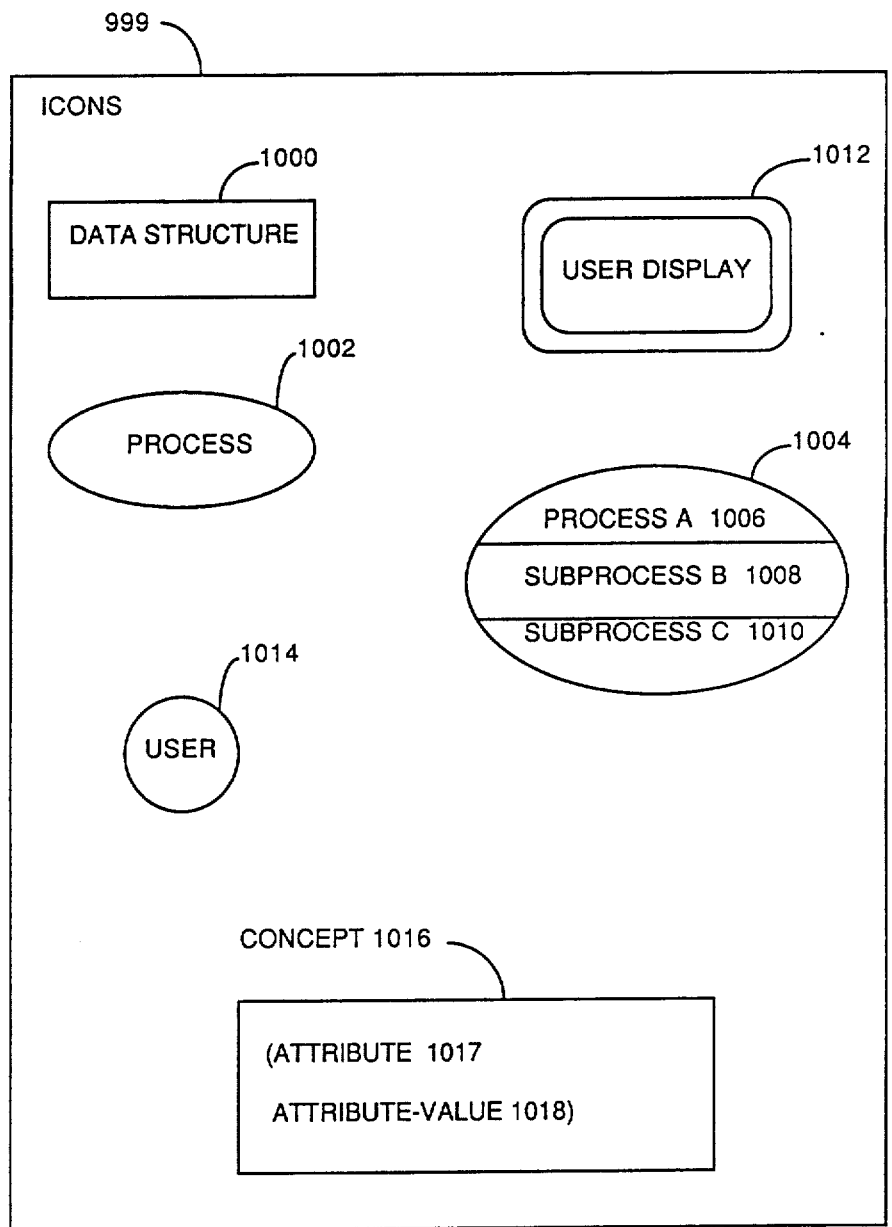
FIG. 1 illustrates the icons used in drawings of the present application.

FIG. 1 illustrates icons 999 which will be used throughout the present application to describe data structures and processes of the preferred ION system. In the preferred embodiment, data structures 1000 are placed in rectangles, processes such as 1002 and 1004 are placed in ovals, a user 1014 is portrayed by a circle, a user display 1012 is in a double rounded-rectangle, and a concept 1016 is in a rectangle. A concept 1016 may be thought of as a specialized data structure 1000 which may include a plurality of attribute 1017/attribute-value 1018 pairs enclosed in parentheses. In object oriented programming terms, a concept 1016 may be considered to be an object, and an attribute 1017/attribute-value 1018 pair may be considered to be a slot and slot value respectively. An example of a concept 1016 is a "car," which might have "color" equal to "blue". In the preferred scheme, "car" would be presented in a concept 1016 rectangle which includes an attribute 1017/attribute-value 1018 pair with value expressed as (color blue).

Figure 2:
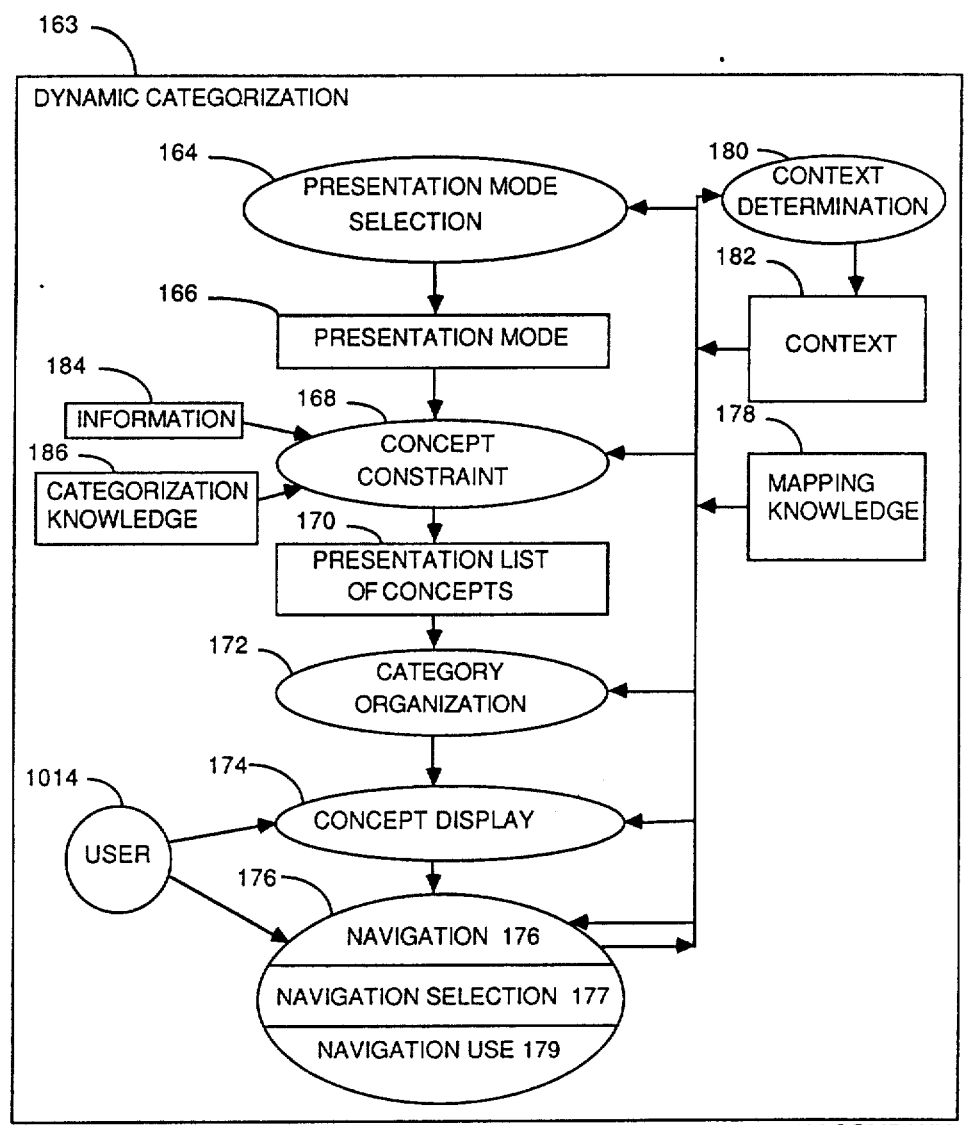
FIG. 2 represents the top level processes for the preferred ION system.

As illustrated in FIG. 2, the preferred ION system dynamically organizes information 184 and presents the organization to a user 1014, allowing the user to browse through information, and to view previously unrecognized relationships among portions of the information. There is a plurality of ways to organize and browse through information 184 in the preferred ION system; these are called presentation modes 166 (see FIG. 2) and include the Space Explorer system, the Nearest Neighbor system, the Focus system, the Dynamic Image Scanner system, the Living Equations system, and the SNETS system.

Figure 3:
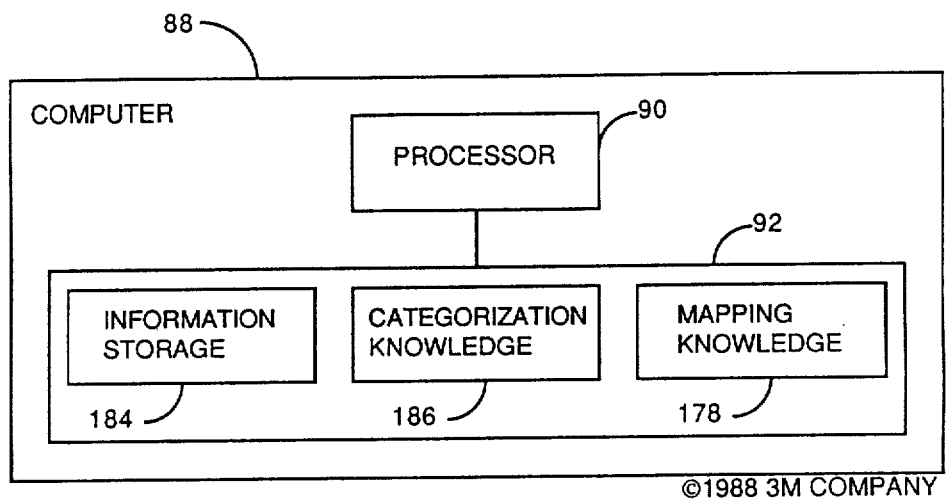
FIG. 3 schematically represents a hardware embodiment of the preferred system.

Referring to FIG. 3, the preferred embodiment operates on a computer 88 comprising a processor 90 with associated memory 92, the latter being subdivided for explanatory convenience into information storage 184

(which includes means for storing information comprising a plurality of concepts 1016 and is described more fully below), categorization knowledge 186 which includes means for storing knowledge of criteria for placing the concepts into categories, and mapping knowledge 178 which includes means for storing knowledge of mappings between a context 182 (see FIG. 2) and the presentation of information. Those skilled in the art will recognize that computer memory 92 may be embodied as a combination of internal memory along with fixed and removable mass storage. Those skilled in the art will also recognize that appropriate user interface, input, and output means (not illustrated) are normally provided with such equipment. In the present application, a particular process and means for carrying out the particular process are typically equivalent, the means carrying out a particular process typically comprising processor 90, memory 92 also being implemented in the case of information storage.

FIG. 2 illustrates dynamic categorization process 163 which is the general process of movement through the preferred ION system. In the preferred system, dynamic categorization process 163 provides means for dynamically placing concepts 1016 into categories for presentation using categorization knowledge 186 of criteria for placing concepts into categories, a context 182 determined by system state (context determination is described in the section on the User Modeling system), and mapping knowledge 178 of mappings between a context and the presentation of information. Dynamic categorization process 163 also includes means for displaying on a user screen the concepts 1016 and the categories.

Figure 4:
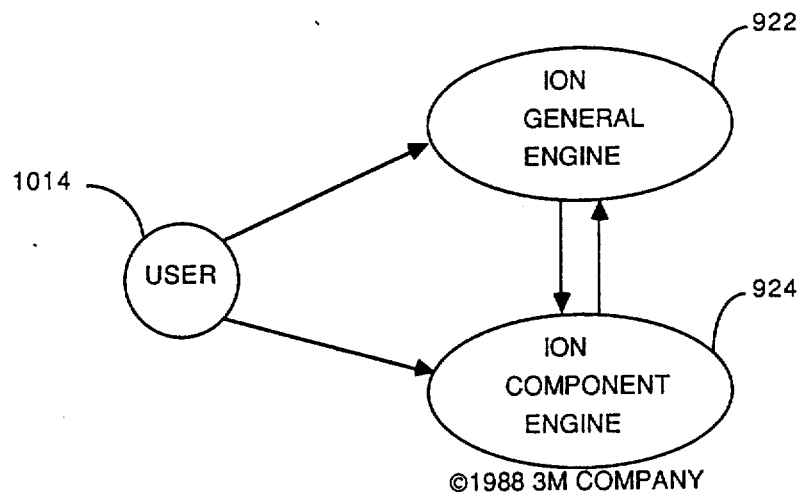
FIG. 4 illustrates interaction between the preferred ION system and preferred presentation modes.

One preferred process in dynamic categorization process 163 is presentation mode selection process 164. The preferred presentation mode selection process 164 is part of the ION general engine 922 (see FIG. 4) and is activated whenever a user 1014 first approaches the system or completes interaction with a presentation mode 166. Presentation mode selection process 164 determines which presentation mode 166 to activate, as is described more fully in the section on the preferred User Modeling system. The remainder of the preferred processes work in a different manner in different presentation modes, and they typically are handled by the ION component engine 924 for the particular presentation mode 166. As can be seen in FIG. 4, the general flow of control in the preferred ION system is from the ION general engine 922 to an ION component engine 924 and back to the ION general engine 922. However, control is not fixed. Throughout the system, control in all preferred processes is guided by the nature of the user's interactions with the system.

ION component engines 924 typically follow the general processes displayed in FIG. 2. Preferred concept constraint process 168 uses a context 182 to generate a presentation list of concepts 170. For example, it might be determined that a user is interested in information 184 on diseases but that the user is a beginner who does not understand subtle distinctions between diseases. Preferred concept constraint process 168 might collect information 184 about general categories of diseases, eliminating fine details, and place this information into a presentation list of concepts 170.

The next preferred step is category organization process 172, in which the presentation list of concepts 170 is organized for presentation. In the preferred embodiment, both context 182 and presentation mode 166 determine the organization. For example, if the preferred Nearest Neighbor system is in use, organization may be based on conceptual similarity among concepts 1016, and the nature of similarity definitions might depend upon the user's background. Concepts 1016 which have been organized and their organization are next presented to a user 1014 in preferred concept display process 174. Preferably, the nature of the display depends on the context 182 and presentation mode 166. For example, in the preferred Space Explorer system, the display includes a center dimensioned-concept 286 (FIG. 17) surrounded by a number of satellite dimensioned-concepts 282, 284, 288, and 290 which represent an n-dimensional space.

Following concept display, a user 1014 typically is presented with the option to navigate through information 184 using preferred navigation process 176. For example, in the preferred Dynamic Image Scanner system, a user 1014 may navigate by manipulating a graphic image which bears a particular relationship to a concept 1016. The preferred navigation process 176 includes means for selecting a navigation technique (navigation selection process 177) and means for using a navigation technique (navigation use process 179). Each of the processes (concept constraint 168, category organization 172, concept display 174, and navigation 176) is described more fully in the sections on presentation modes 166.

Figure 5:
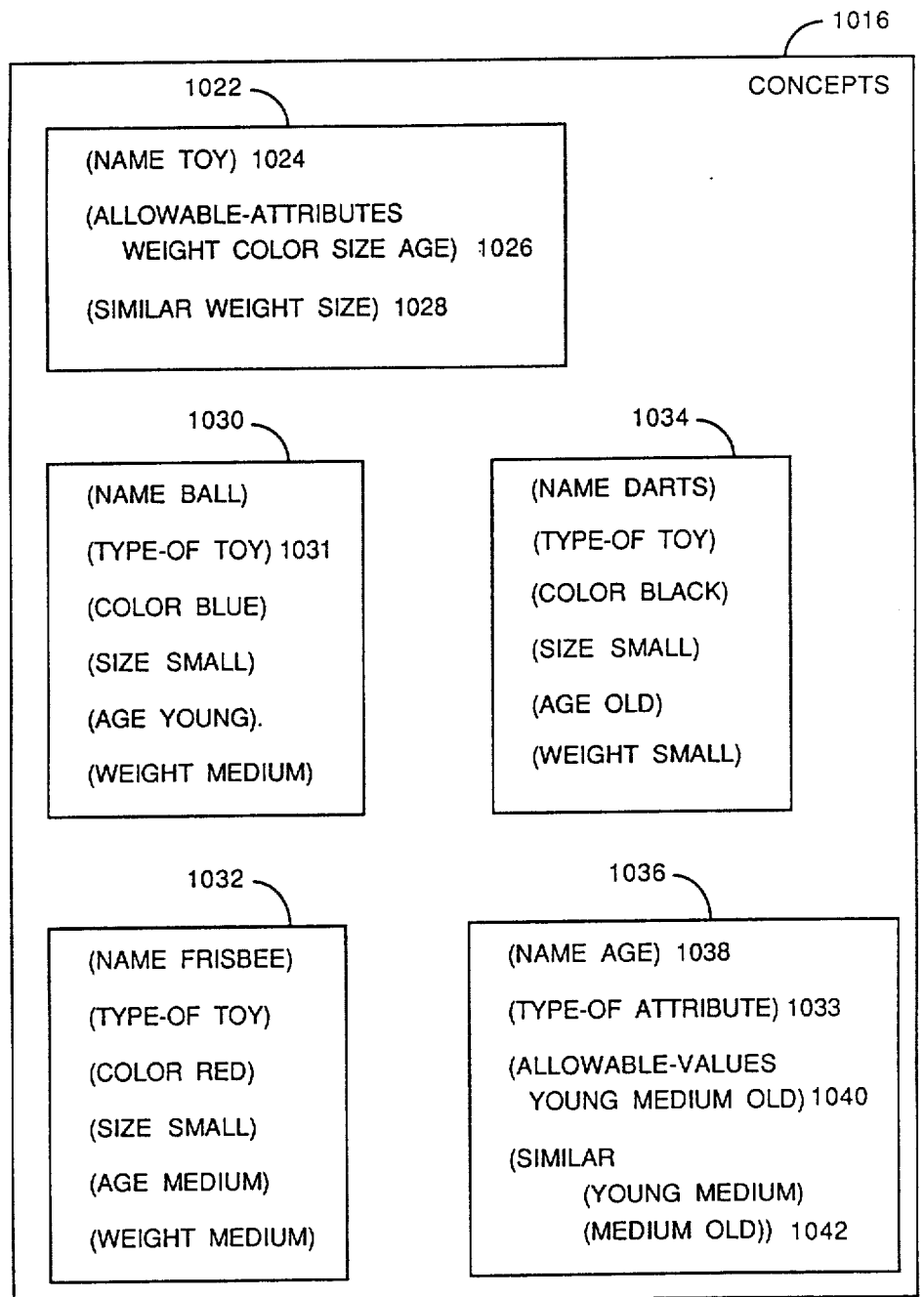
FIG. 5 illustrates data structures used to represent information comprising a plurality of concepts.

In all presentation modes 166, the preferred ION system organizes and presents information 184 to a user 1014. FIG. 5 illustrates the preferred form for storage of information 184. In the preferred embodiment, information comprises a plurality of concepts 1016. Examples of concepts 1016 such as "toy" 1022 and "ball" 1030 are illustrated in FIG. 5. Concepts 1016 may include information on attribute 1017/attribute-value 1018 pairs such as (similar weight size) 1028 and allowable attributes such as (allowable-attributes weight color size age) 1026. In the preferred embodiment, an interpretation of this information 184 is that there is an object called a "toy", "toys" may have attributes "weight", "color", "size" and "age", and a "ball" has a "color" of "blue".

In the preferred embodiment, information also includes relationships among attributes and attribute values. Relationships among attributes 1017 may be represented in a number of ways. For example, (similar weight size) 1028 in concept 1022 indicates that attributes "weight" and "size" are similar to each other. Relationships among attribute-values 1018 may be represented in a similar way. For example, in concept 1036, (similar (young medium) (medium old)) 1042 may be interpreted to mean that of allowable-values 1040 "young", "medium", "old", for concept "age" 1036, "young" is similar to "medium" and "medium" is similar to "old".

Another preferred way to represent relationships among concepts 1016 may be seen in concept 1030, in which (type-of toy) 1031 indicates that a "ball" is a type of "toy", thus representing a type/sub-type relationship between concepts 1030 and 1022. Typically, in a type/sub-type relationship, the sub-type concept 1016 inherits slots from the type concept 1016. In the example, "ball" inherits the slots "color", "size", "age", and "weight" from "toy". This is an example of the types of relationships which may be represented in the preferred scheme, but many additional relationships may be included. For example, one might represent a "part-of" relationship or a "test-of" relationship in a similar fashion. The particular attributes 1017, attribute-values 1018 and relationships represented typically depend upon the subject matter of interest.

Figure 6:
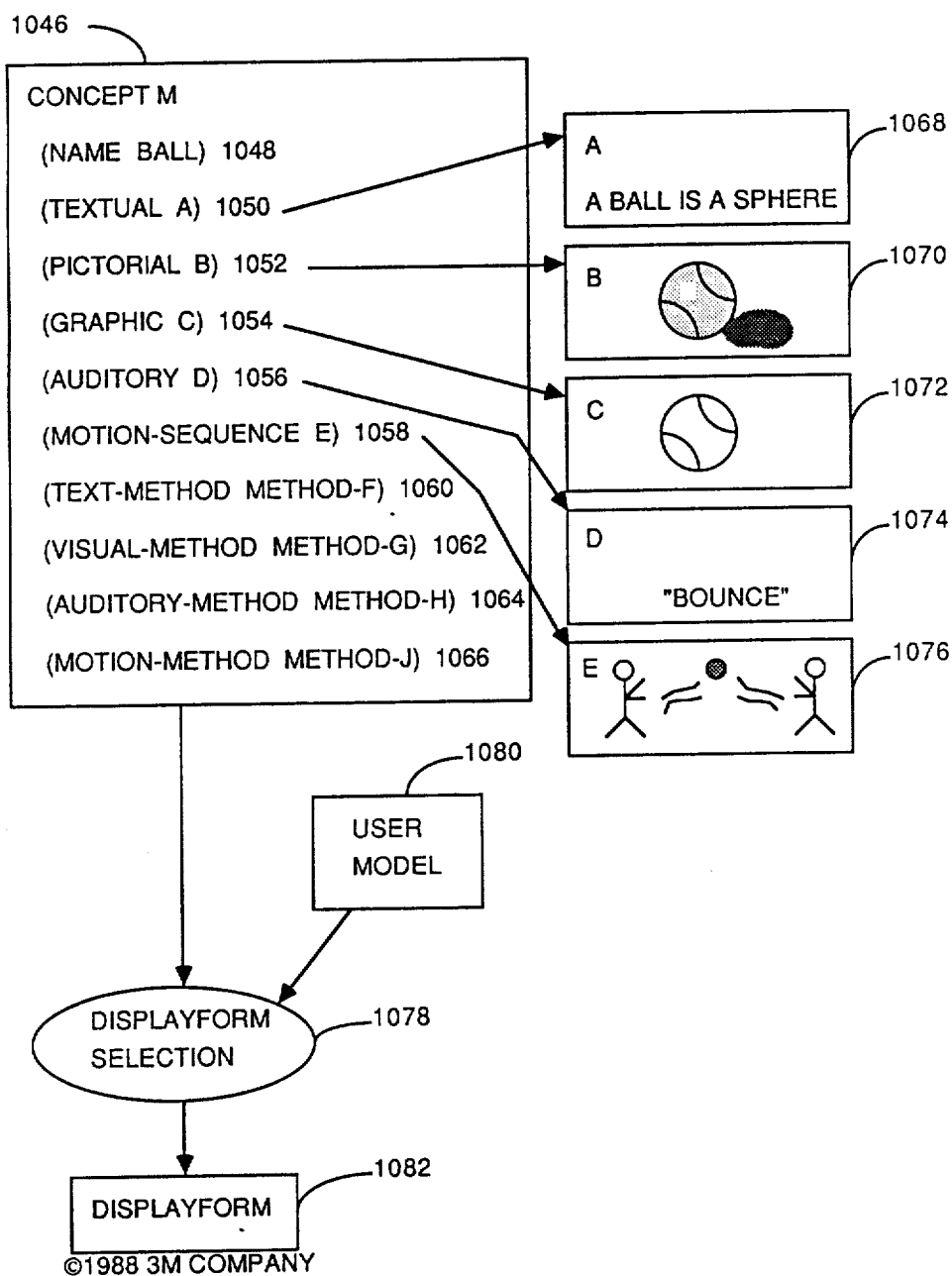
FIG. 6 illustrates data structures and processes used to handle multi-media information.

Within a concept 1016 in the preferred embodiment, it is often useful to include information 184 on different displayforms 1082 which the concept 1016 might take (see FIG. 6). It is useful in the present system to store multi-media representations corresponding to multiple sensory modalities of the concepts and methods to access the multi-media representations. For example, a concept 1016 such as concept 1046 of a "ball" may have the capability of being displayed to a user 1014 both in graphic and textual form. Concept 1046 illustrates some of the possible displayforms 1082 such as textual 1050, pictorial 1052, graphic 1054, auditory 1056 and motion-sequence 1058, and the way in which they may be represented in the preferred ION system. In the preferred embodiment, information 184 stored in a slot such as motion-sequence 1058 is information on storage of the displayform 1082 (in this case a motion sequence) of the concept 1016, and there are additional slots such as text-method 1060 which include methods to access and display the displayform 1082 to a user 1014. The preferred way in which displayforms 1082 are selected for presentation is described below in the User Modeling system section.

In the preferred embodiment, an important part of information storage is storage of categorization knowledge 186 which includes information 184 on relationships among concepts 1016 which allows the concepts 1016 to be placed into categories. Categorization knowledge 186 typically originates with a domain expert who may know, for example, that "disease A" and "disease B" are both caused by "weak mitral valves" but that their symptoms differ. Categorization knowledge 186 typically is acquired in a systematic fashion from domain experts, and it plays an important role in representation of information 184. Once it has been acquired, it can be input into the preferred ION system using the format for information storage described above.

In the preferred ION system, context determination process 180 monitors system and user activity as the user interacts with the system. The purpose of preferred context determination process 180 is to generate a context 182 comprising a system model of the user's goals and activities within system states in order to customize interactions with a particular user 1014. For example, context determination process 180 might determine what concepts 1016 a user 1014 does not understand, determine what information 184 to present in order to fill in the gaps, and determine which presentation mode 166 to use to present the information. In the preferred embodiment, system and user information is acquired and stored using the User Modeling system, and this system is described in the User Modeling system section. An important part of user modeling is the ability to map between a context 182 and presentation of information to a user. Mapping knowledge 178 preferably is stored in user model 1080 as a set of algorithms or methods. Storage of mapping knowledge 178 also is described in the section on the preferred User Modeling system.

Preferred systems and processes will be described in greater detail below.

General Description and Data Structures for User Modeling

The preferred User Modeling system provides a set of data structures and a methodology to allow a system to monitor a user's responses and to modify interaction with a user depending upon responses. For example, a system might determine that a user 1014 often requests information in a pictorial form and almost never requests a graphic form. When several forms are available, the system might present information initially in a pictorial form to match the user's typical preferences.

Figure 8:
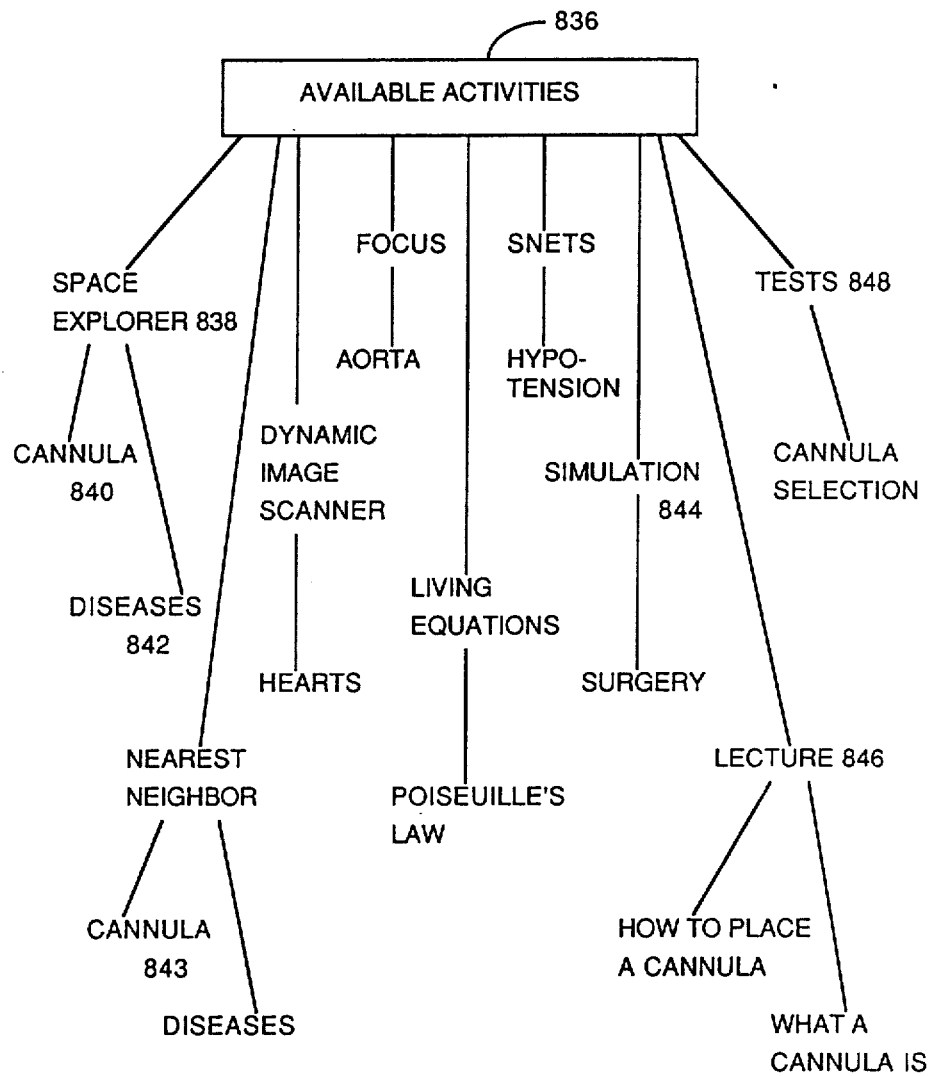
FIG. 8 illustrates a representation of an available activities data structure.

Data structures for the preferred User Modeling system are illustrated in FIG. 7. In the preferred embodiment, there are several static data structures 914 required for the User Modeling system. One such data structure is a structure for available activities 836, which is illustrated in FIG. 8. In the preferred embodiment, the purpose of available activities 836 is to store information about activities which are available in a system. For example, available activities 836 could include an activity on the subject of cannula 840 (tubes which shunt blood to and from the heart during bypass surgery). In the example illustrated in FIG. 8, there are several Space Explorer activities 838 available, one for a Space Explorer activity on the subject of cannula 840 and a second on the subject of diseases 842; there are also activities which are lectures 846 and tests 848. In the preferred system, many additional available activities 836 could be added.

Figure 9:
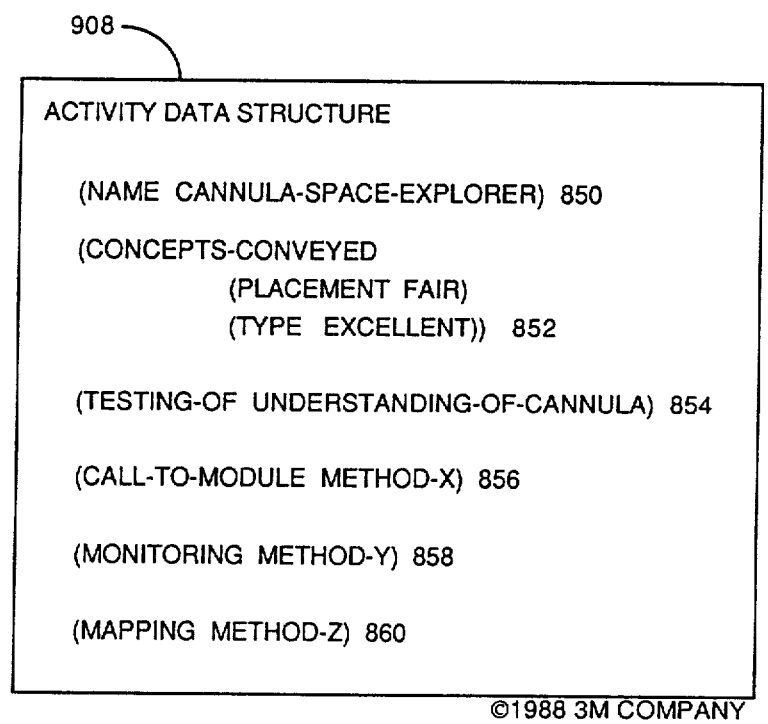
FIG. 9 illustrates an activity data structure.

In the preferred embodiment, an activity such as cannula activity 840 (which is a leaf node in the available activities 836 structure) has a corresponding activity data structure 908 such as that illustrated in FIG. 9. In the preferred system, an activity data structure 908 holds information about concepts 1016 (see FIG. 1) which are conveyed and/or tested by an activity 836 and methods to call an activity 836, to monitor user interaction, and to provide mappings between user interaction and concept 1016 understanding. The following slots are included in the preferred activity data structure 908: name 850 which includes reference to a presentation mode 166 such as Space Explorer and to a subject matter such as 'cannula' 840, concepts-conveyed 852 which contains names of concepts 1016 which are conveyed to a user 1014 by an activity 836 as well as an indication of how well they are conveyed, testing-of 854 which contains concepts 1016 which are tested for user understanding by an activity 836, call-to-module 856 which contains a method to initiate an activity 836, monitoring 858 which contains methods to monitor user interaction during an activity 836, and mapping 860 which contains methods for mapping from user interaction to user understanding of concepts 1016.

Figure 10:
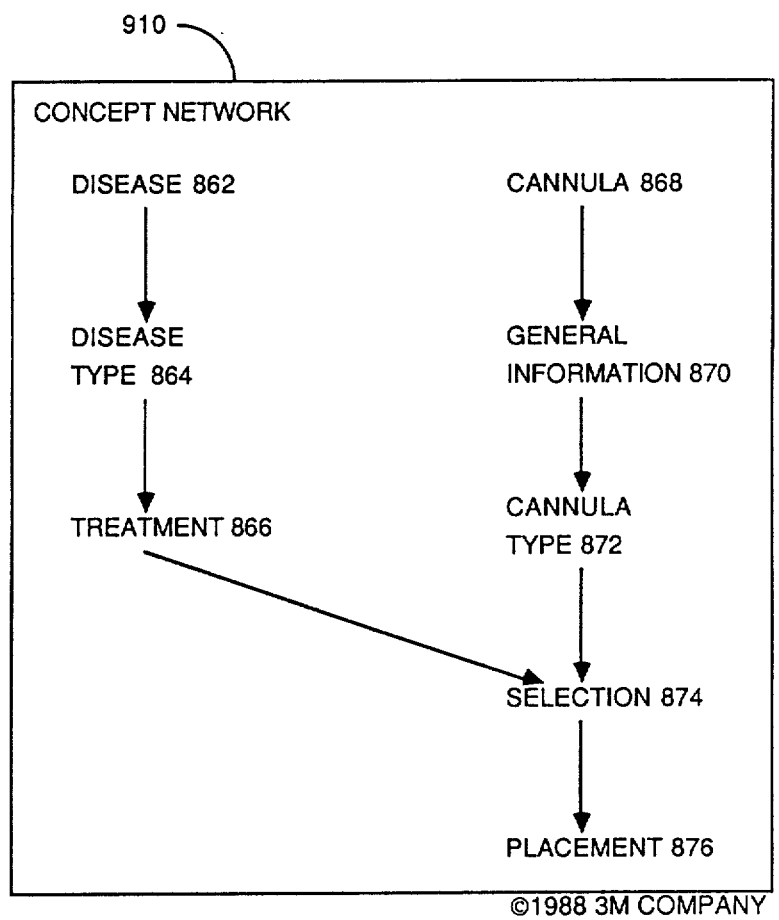
FIG. 10 illustrates a concept network data structure.

A concept network 910 such as that illustrated in FIG. 10 is another static data structure in the preferred User Modeling system. In the preferred embodiment, the purpose of a concept network 910 is to store information about relationships among concepts 1016, such as information that concept 'A' is a sub-component of concept 'B', and concept 'A' must be understood before concept 'B' can be understood. This could be very important information when a system is used in a tutorial mode. In FIG. 10, disease type 864 is a sub-component of disease 862, general information 870 is a sub-component of cannula 868, and selection 874 requires an understanding of both treatment 866 and cannula type 872.

Figure 11:
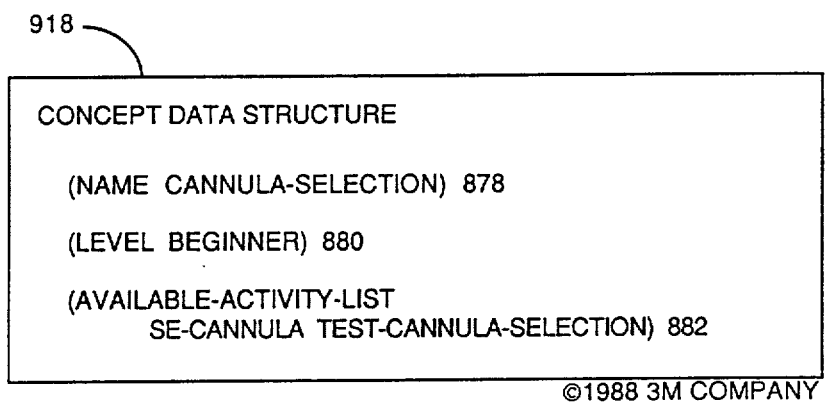
FIG. 11 illustrates a concept data structure.

In the preferred embodiment, concepts 1016 in a concept network 910 have a concept data structure 918 such as that illustrated in FIG. 11, which includes information on name 878, level 880 (which is an indication of skill level required to understand the concept 1016), and available-activity-list 882 (which contains pointers to activities 836 that convey information about the concept 1016).

In addition to static-data-structures 914, there is an important dynamic-data-structure 916 called user-history 912 (see FIG. 12) in the preferred User Modeling system. The purpose of preferred user-history 912 is to hold information which is specific to an individual user and which relates to activities 836 in which a user has engaged in current and previous sessions and about concepts 1016 which a user currently does or does not understand or to which a user has been exposed. In the preferred embodiment, information in user-history 912 can be used to individualize interaction with a user. The preferred user-history 912 data structure (see FIG. 12) includes the following slots: name 884 for a user's name, background 886 for information about a user's occupation or educational background, temporal-history 888 which holds a list of activities 836 in the order in which a user completed the activities 836 (temporal sequencing), num-times-per-activity 890 which includes information about the number of times a user participated in an activity 836 (this includes information on activities completed in previous sessions as well as those completed in a current session), amount-time-per-activity 892 which holds information on the amount of time spent in an activity 836, num-requests-for-info-by-type 894 which stores information on the number of requests for information in different forms such as text and audio, concepts-studied 896 which lists concepts 1016 which have been presented to a user, concepts-understood 898 which holds concepts 1016 which are understood by a user, concepts-not-understood 900 which holds concepts 1016 which are not understood by a user, activities-in-current-session 902 which holds information on activities 836 completed in a current session, current-activity 904 which holds the activity 836 in which a user is currently engaged, and current-concept 906 which holds the concept 1016 currently viewed by the user. The slots described in preferred user-history 912 are illustrative of the type of information which might be included in a system. User-history 912 could be expanded to incorporate additional information about a user, if it were desired by a system developer. For example, one might want to keep track of the user's response time while interacting with the system.

User Modeling Process Description

As can be seen in FIG. 2, context 182 (which includes user model 1080) may play a role in all preferred ION system processes. In the preferred ION system, some processes such as presentation mode selection process 164 work outside of a particular presentation mode 166, and others such as navigation process 176 operate independently within a presentation mode 166, as is the case in the preferred Space Explorer and Nearest Neighbor systems; therefore, it is useful to think about mode-specific and mode-independent processes as separate entities.

FIG. 4 illustrates a preferred general description of movement within the ION system which separates general from mode-specific processes. In the preferred embodiment, a user can initiate interaction with the system by activating the ION general engine 922; a combination of user and system input can be used to call a particular ION system component by accessing an ION component engine 924 for the component (presentation mode) of interest; and interaction can then proceed back and forth between the ION general engine 922 and an ION component engine 924 through a combination of user and system input until interaction is complete. Within this general description, there preferably are several ways in which the User Modeling system can determine system-user interaction. By way of further examples, the preferred User Modeling system can be used with the ION general engine 922 to determine which ION component to call (presentation mode selection process 164); it can also be used along with an ION component engine 924 to determine the nature of the interaction within a component. For example, it might be used to select an initial focal concept 146 for a Focus system session (see FIG. 45) or to select the mode of presentation of a concept 1016; or it can be used with the ION general engine 922 to generate a tutorial interaction. These examples will be described more fully below. They are illustrative of the way in which user modeling information can be used, but they are not exhaustive.

Figure 13:
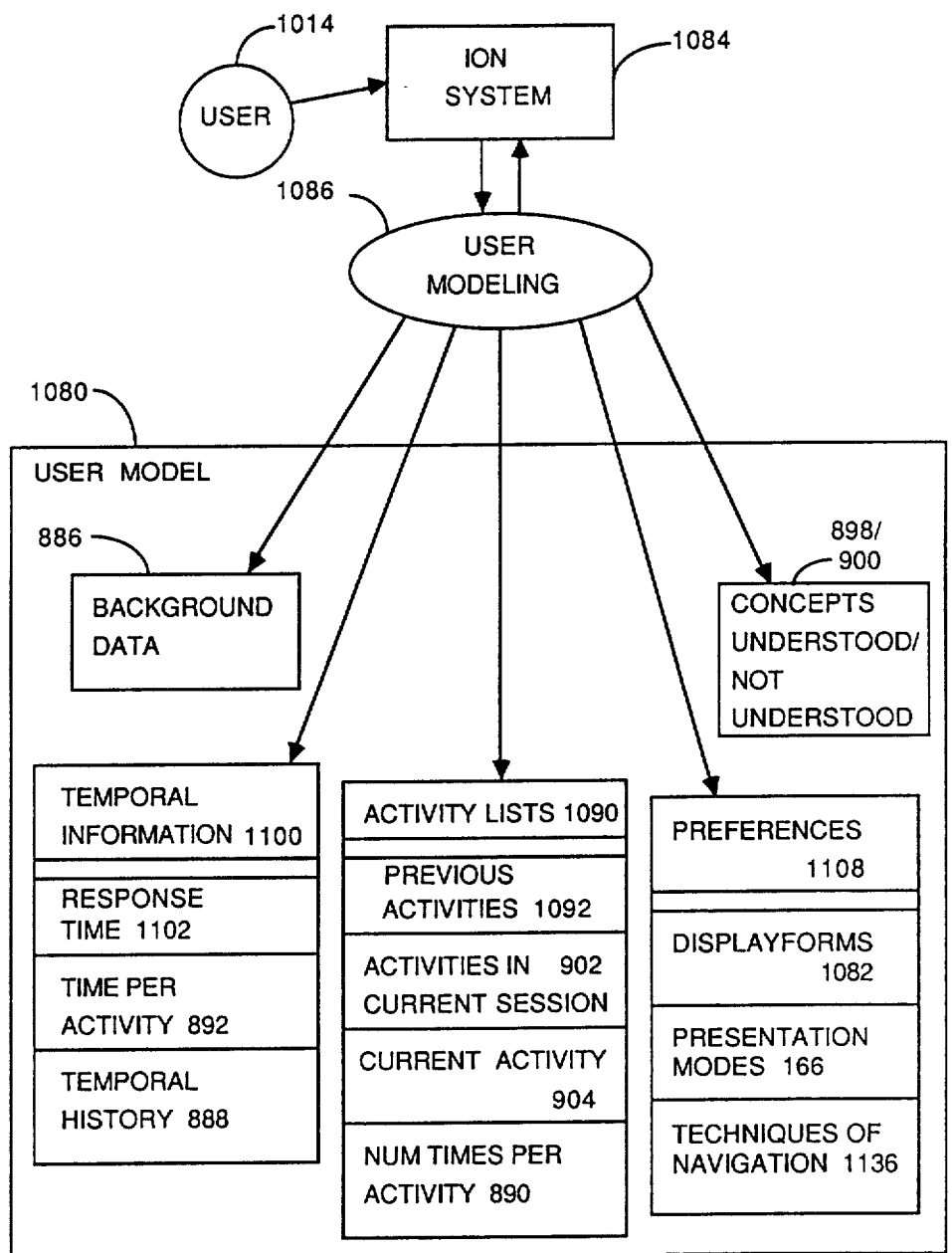
FIG. 13 illustrates data structures and processes used in the preferred User Modeling system.

It also is important to describe the preferred manner in which information 184 is input into user-history 912. The preferred general process is illustrated in FIG. 13. In the preferred embodiment, a user 1014 interacts with ION system 1084, user modeling process 1086 monitors a user's activities and outputs information such as background data 886 which forms a user model 1080, and the user model 1080 is stored along with other information in the user's user-history 912. Some of the data preferably is collected during interaction with a specific ION system module, and this collection process will be described below in the appropriate sections. Other pieces of data typically are input only once, such as when a user first interacts with the ION system. For example, when a user first activates the preferred ION system, the ION general engine 922 asks for the user's name. If it is not found in a user-history 912, the system preferably asks who they are and what their background is and places the appropriate information 184 into a new user-history 912 data structure for the user.

Presentation Mode Selection Process 164

Figure 14:
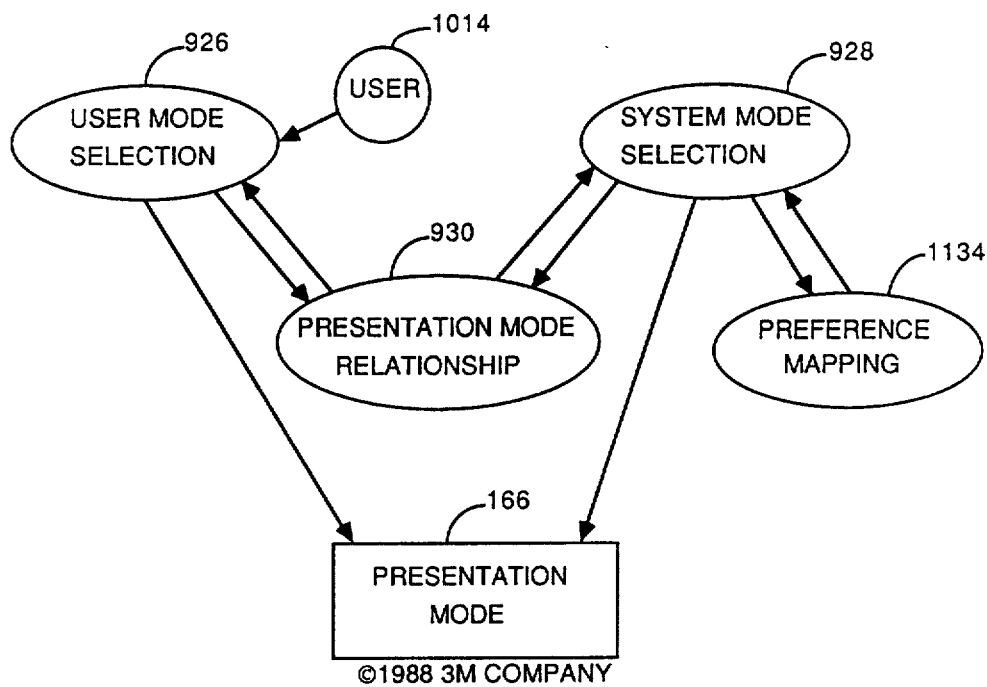
FIG. 14 illustrates a set of preferred processes used for presentation mode selection.

In the preferred ION system, whenever a user 1014 initiates an ION system session or completes an interaction with an ION component, the system and/or user must decide whether to initiate interaction with a new component, and if so which one. FIG. 2 illustrates preferred presentation mode selection process 164 at a general level of detail, and FIG. 14 illustrates the process in more detail. In the preferred embodiment, a user 1014 may make a selection directly via user mode selection process 926 with or without input from system mode selection process 928. In the preferred embodiment, both user mode selection process 926 and system mode selection process 928 may interact with presentation mode relationship process 930 which determines relationships between presentation modes 166, and the result of either process is selection of a presentation mode 166. System mode selection process 928 may interact with preferred preference mapping process 1134 in order to incorporate user preferences into the selection process.

An ION system developer can allow a user total control over selection, in which case user mode selection process 926 can access available activities 836 to determine what activities are available and to present them to a user in menu form. The preferred User Modeling system would be involved minimally if this process were used.

When system input is used for presentation mode selection, preferred ION general engine process 922 accesses the user's user-history 912. As described above, ION general engine process 922 preferably asks for the user's name and determines whether a user-history 912 exists for the user. If it does not exist, the preferred system asks the user 1014 for information on background, places the information in a newly created user-history 912 and accesses available activities 836. The preferred ION general engine process 922 then determines which of the available activities 836 match the user's skill level by comparing the user's background with the level 880 (see FIG. 11) of the concepts 1016 involved in each activity 836. Activities 836 which match the user's skill level then typically are presented as options to the user in menu form.

In the preferred embodiment, more complex methods of presentation mode selection may be used when a user-history 912 exists. For example, suppose that a user approaches a system for the second or third time. Preferred ION general engine process 922 can interact with preference mapping process 1134 to determine from user-history 912 whether there are concepts 1016 which are not understood by accessing slot concepts-not-understood 900 in order to select an activity 836 or set of activities 836 and 842 which address a concept 1016 which is not understood and which has not as yet been explored by the user and, therefore, does not appear in preferred slot temporal history 888.

In the preferred ION system, there may also be information in a presentation mode 166 which indicates its relationships to other presentation modes. For example, a Space Explorer system module may know that it relates closely to a particular Nearest Neighbor system module. In that case, the relationship may be used to help select a presentation mode 166 once a current presentation mode is known. In the preferred embodiment, knowledge about relationships between presentation modes 166 is stored in the presentation modes themselves, and presentation mode relationship process 930 can use this information to help make a selection of a presentation mode.

Preferably, when a presentation mode 166 is selected, the ION general engine 922 places the name of the presentation mode in the user's temporal-history slot 888 and in the current-activity 904 slot and activates the presentation mode.

User Modeling within a Presentation Mode 166

In the preferred embodiment, a presentation mode 166 such as the Space Explorer system provides a user with a method of browsing through and dynamically re-organizing information. The preferred User Modeling system works with a presentation mode 166 to help make decisions such as the way in which information 184 should be displayed to a particular user 1014, and it records relevant information about a user's activities while interacting with the presentation mode. Preferably, there is a great deal of flexibility in the type of information collected and interpreted by the User Modeling system, and procedures may vary between presentation modes 166. A few examples of the use of the User Modeling system will be presented below. These examples will be general because the preferred User Modeling system is meant to provide a structure to allow more specific procedures to be integrated with the ION system rather than a set of algorithms to generate tests, lectures or simulations in a particular domain. A person skilled in the art of tutoring, for example, can use the preferred User Modeling system to integrate a set of questions and answers on a particular subject into the ION system, but the User Modeling system will not help to generate the questions and answers.

One example of the use of the User Modeling system is to determine the displayform 1082 (see FIG. 15) to use when presenting information to a user. As described in the General Introduction Section, there are methods in the preferred ION system for storing multi-media representations of concepts 1016 which may include textual, pictorial, graphic, motion-sequence and auditory representations and methods of accessing the various representations. In many presentation modes 166, a user preferably is given the option to request further information about a concept 1016 which is on display. It is possible that there are multiple representations available for the requested information, and the User Modeling system typically is used to select an initial displayform 1082 for the concept 1016. The preferred ION component engine 924 for the particular presentation mode 166 could activate preferences mapping process 1134 in order to check num-requests-for-info-by-type slot 894 in the user's user-history 912 and determine which displayforms 1082 have been requested most frequently by the user in the past; this information typically is used to decide which displayform 1082 to present first. Preferably, as additional requests for displayforms 1082 are made by the user 1014, the user-history 912 will be updated to maintain an accurate reading of displayform preferences.

Figure 15:
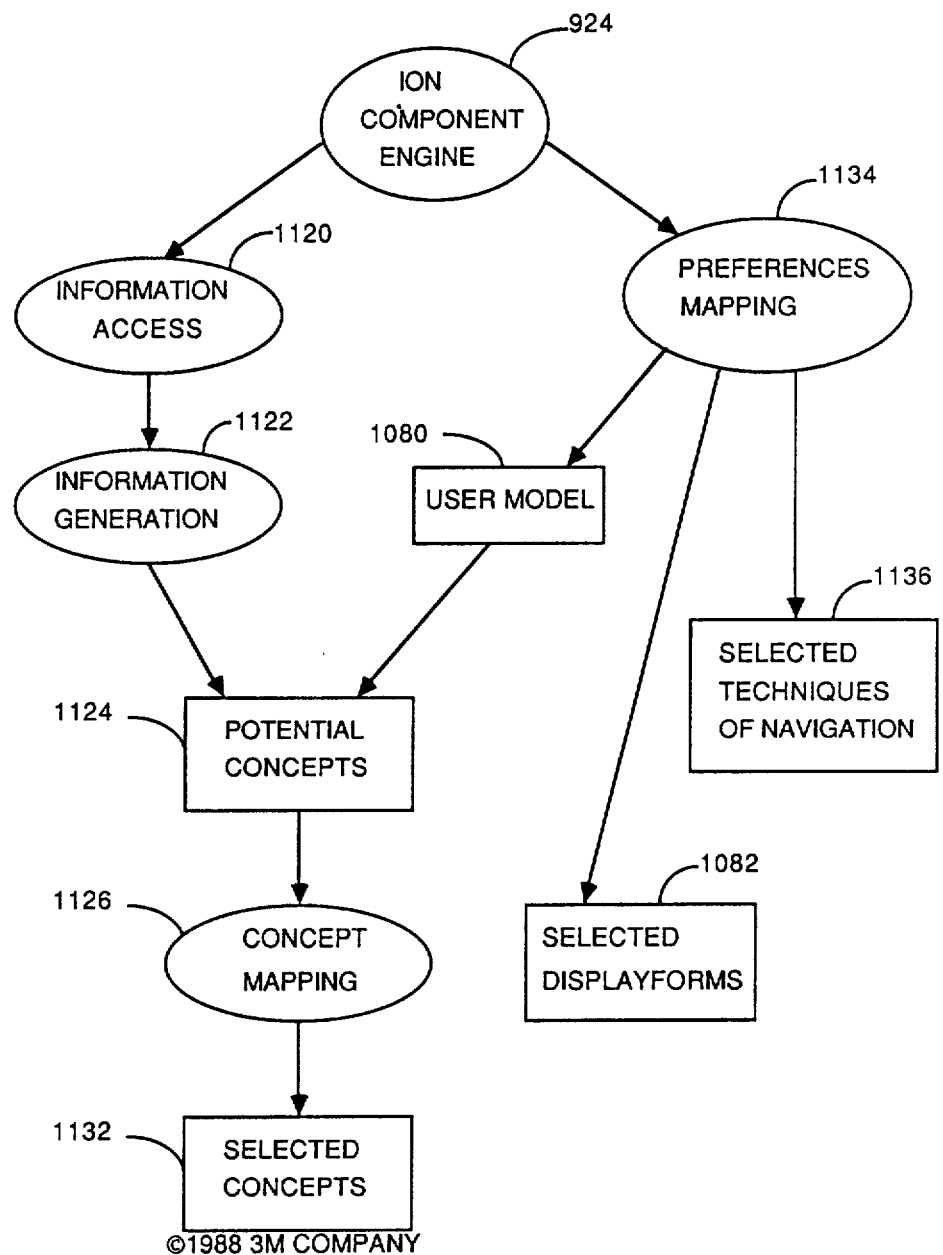
FIG. 15 illustrates preferred user preference processes.

FIG. 15 illustrates two additional ways in which a user model 1080 may guide interaction within a presentation mode in the present embodiment. One preferred way of using a user model 1080 is to select a technique of navigation 1136. For example, in the preferred Space Explorer system, a user may have an option between 'fast' and 'through' methods of search while navigating through a multi-dimensional space. If desired, a slot for navigation-techniques which holds the number of times different techniques had been requested could be added to the user-history 912. Then, when the Space Explorer system is called, preferences mapping process 1134 could access the user-history 912 (which is part of preferred user model 1080) to determine which technique of navigation 1136 to select.

A second potential use of user model 1080 in the preferred embodiment is to select concepts 1016 for presentation. For example, in the preferred embodiment when the Focus system is called it is necessary to select an initial focal concept 146. One preferred way of making a selection is to use ION component engine process 924 for the Focus system to generate a list of potential concepts 1124 and then to use concept mapping process 1126 to access the current-concept 906 slot of the user-history 912 and determine whether there is a potential focal concept 146 which matches the current concept 906; if so, it can be selected. Another example of preferred use of a user model 1080 for concept selection is to constrain a list of concepts 1016 which will be presented to a user. In the preferred Space Explorer system, for example, a user may request information related to a concept 1016 on display using information access process 1120. In the preferred embodiment, information generation process 1122 may be used to generate a list of concepts which bears a selected relationship to the selected concept. For example, if a car is displayed and a user asks for information on techniques of repairing the car, information generation process 1122 typically searches a knowledge base 715 (see FIG. 19) for repair techniques. If five techniques exist, potential concepts 1124 will include the five techniques, and concept mapping process 1126 can remove any potential concepts 1124 which are not understood by the user, according to the user model 1080.

As a user interacts with an ION component engine 924, information preferably is gathered for placement in a user-history 912. In the preferred embodiment, the particular information gathered will depend upon the context 182 and the presentation mode 166. Preferably, in all cases, num-requests-for-info-by-type 894 and current-concept 906 are updated whenever information is requested or a new concept 1016 is accessed; when interaction with a presentation mode 166 is completed, temporal-history 888, num-times-per-activity 890, activities-in-current-session 902, concepts-studied 896 and current-activity 904 preferably are updated. Other information may vary. For example, it may be appropriate to update amount-time-per-activity 892 in a simulation mode 844 (see FIG. 8) but not in test mode 848. As mentioned above, an activity data structure 908 preferably includes information on methods for monitoring and interpreting user interaction and would be used to determine when and how to update a user-history 912.

Tutorial Example

One of the more sophisticated uses for the preferred User Modeling system is for tutorials. An example of the way in which the User Modeling system may be used for a tutorial will be explained in this section. Suppose that a student wishes to learn about selection of cannula. A tutorial activity could be added to the list of available activities 836 which contains methods to guide student-system interaction. Such a method might look first at a concept network 910 (FIG. 10) and discover that selection 874 requires understanding of other concepts 1016 such as cannula type 872 and treatment 866. Information about difficulty level of each concept 1016 preferably is available in the concept's 1016 concept data structure 918, and there may be information available in the user-history 912 about the student's background. Suppose that a student is a beginner and must be helped with all concepts. The tutorial can then start at the top of the concept network 910 with either cannula 868 or disease 862 and search for activities 836 which provide information about those concepts.

In the present example, general information about cannula 870 may be found in a lecture 846 on "what a cannula is," and this might be a good place to start. The activity data structure 908 for "lecture-what a cannula is" preferably would indicate how to activate the activity and might indicate that there is no user interaction during the activity, i.e., that the user just watches and listens. It might also indicate that following presentation of the "lecture," the user-history 912 should be updated to add "what a cannula is" to concepts-studied 896. The concept network 910 typically would indicate that cannula type 872 would be a reasonable next concept 1016 to pursue following completion of the lecture, and available activities 836 preferably would indicate that this concept 1016 can be explored using Space Explorer cannula activity 840 or Nearest Neighbor cannula activity 843. At this point, the tutorial may provide both options to the student and allow the student to select the activity 836. This process might continue until a section on selection 874 is reached. Perhaps, following a lecture 846 on "how to place a cannula," the tutorial might decide to provide a test 848 on "cannula selection."

In the preferred embodiment, a test module 848 likely would have methods to provide questions and interpret answers to determine what concepts 1016 are and are not understood by the user. This information could be used to update concepts-understood 898 and concepts-not-understood 900 in the user-history 912 and serve as a basis for selection of the next step. If, for example, the student still did not understand treatment 866, the tutorial might initiate a simulation 844 on "surgery" in order to fill the gap. This is just one, simple example of use of the User Modeling system to provide a tutorial to a student. Those skilled in the art will recognize that many other and more complex examples also are possible.

General Description and Data Structures for Space Explorer

Figure 16:
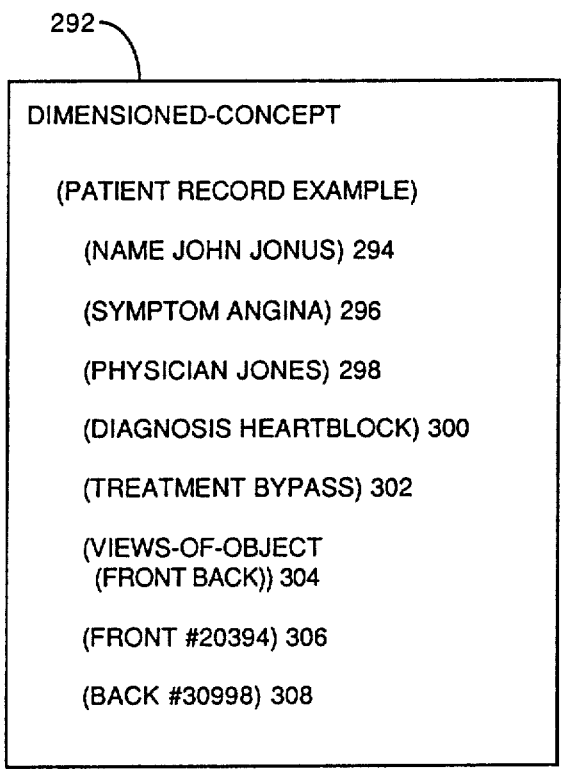
FIG. 16 illustrates a dimensioned-concept data structure.
Figure 17:
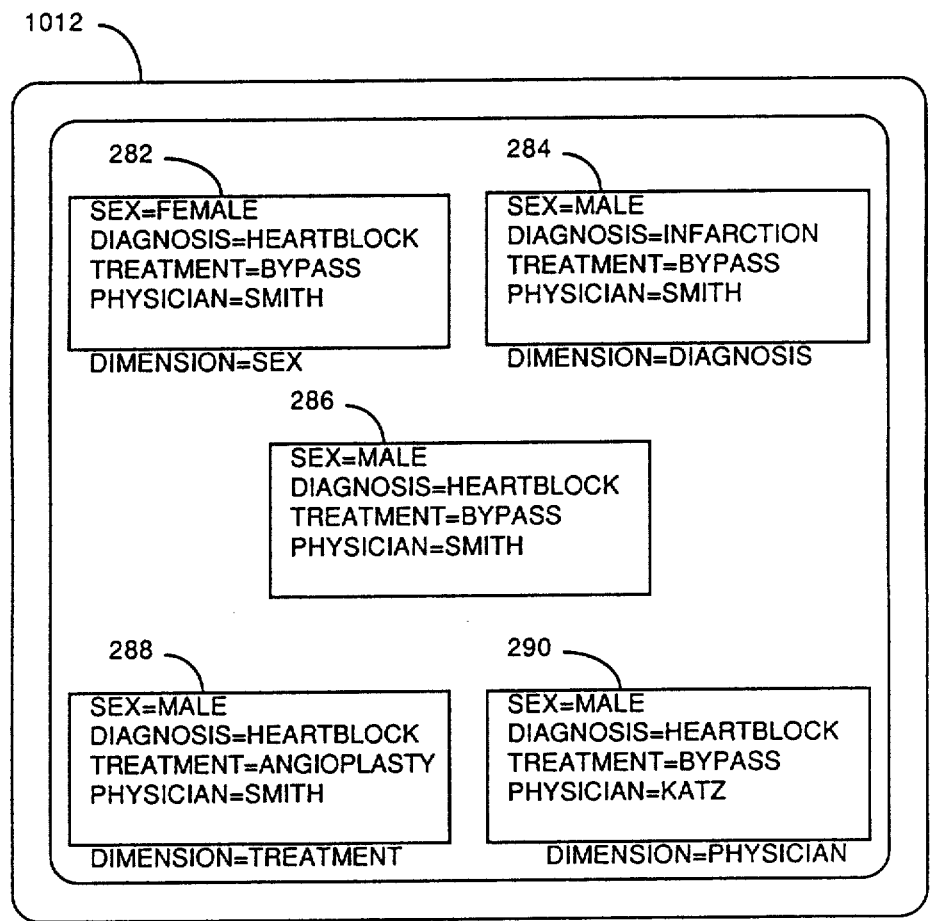
FIG. 17 illustrates a preferred Space Explorer system interface before navigation.

The preferred Space Explorer system allows a user to organize a plurality of dimensioned-concepts 292 (see FIG. 16) into an n-dimensional space such as the space illustrated in FIG. 17, and to navigate dynamically, intelligently, and visually through the n-dimensional space. For example, suppose that there existed a plurality of dimensioned-concepts 292 where each dimensioned-concept 292 represented a patient record. Such a record might include information on a patient's name 294, symptom 296, physician 298, diagnosis 300 and treatment 302. If there were hundreds of records, it might be difficult to browse through them unless a structure such as that provided by the Space Explorer system were provided. The present Space Explorer system is dynamic because a user may, contemporaneously with browsing through information, re-structure the information into an n-dimensional space and change the structure and presentation of the space without the need for re-programming.

An example of a Space Explorer system user interface 1012 in which the dimensioned-concepts 292 relate to patient characteristics is illustrated in FIG. 17. In applying the preferred embodiment to this example, one patient record typically can be considered to be a center dimensioned-concept 286, which may be surrounded by a number of satellite dimensioned-concepts 282, 284, 288, and 290. In the current embodiment, a satellite dimensioned-concept such as 282 differs from a center dimensioned-concept 286 with respect to one characteristic or attribute 1017. For example, compared to center patient 286, satellite 282 differs in sex, satellite 284 differs in diagnosis, satellite 288 differs in treatment, and satellite 290 differs in physician.

Figure 18:
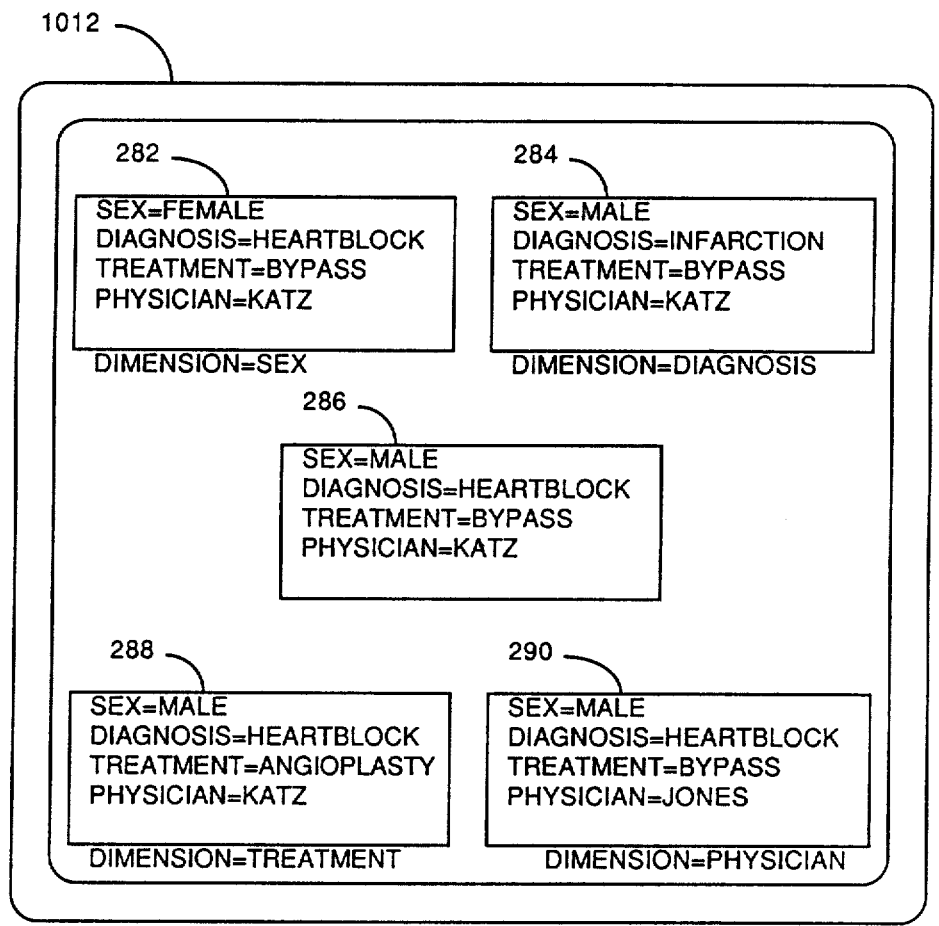
FIG. 18 illustrates a preferred Space Explorer system interface after navigation.

Using the preferred Space Explorer system, a user might navigate through conceptual space by changing an attribute 1017 of a center concept 286. For example, a user 1014 might change physician in center concept 286 from Smith to Katz, resulting in the n-dimensional space being re-configured to incorporate the change (see FIG. 18) so that the entire space now includes patients of physician Katz instead of Smith except for satellite 290, which is the 'physician satellite' and which, therefore, provides yet a third physician, Jones.

The preferred Space Explorer system allows a user to constrain a space of desired dimensioned-concepts 292, determine how a space should be configured, and navigate through a space, typically by altering attributes 1017. In the preferred embodiment, there is a one-to-one relationship between an attribute 1017 and a dimension. However, that need not be the case in general. For example, it would be possible to define a dimension such as 'general health' which incorporates the attributes 'age', 'disease', and 'symptom' combined with a weighting scheme; in such an example, the dimension 'general health', rather than corresponding one-to-one with a single attribute, incorporates several weighted attributes 1017. In the examples illustrated in the Figures thus far, however, we will assume that a dimension incorporates only one attribute 1017.

Figure 19:
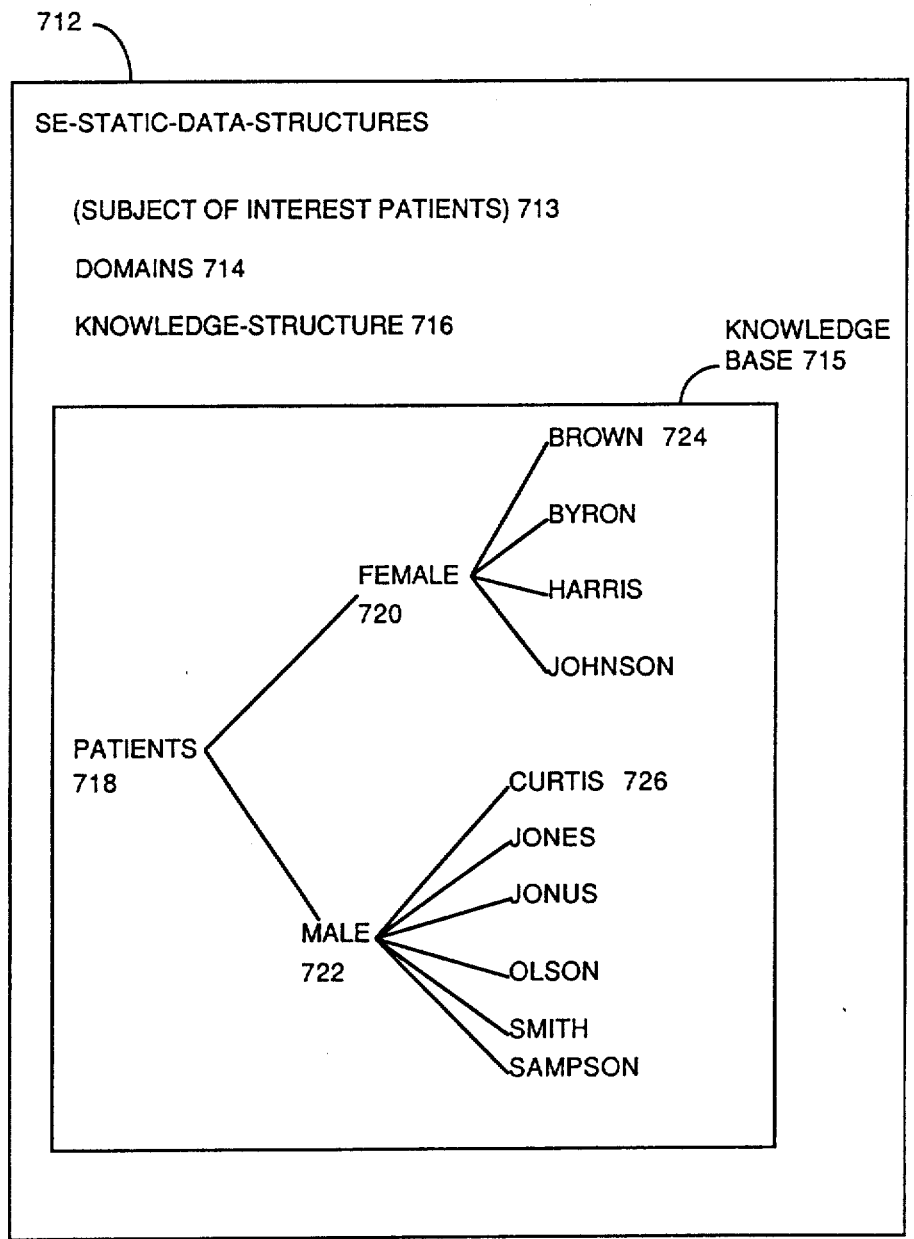
FIG. 19 illustrates static data structures for the preferred Space Explorer system.

There are both static and dynamic data structures in the preferred Space Explorer system embodiment. FIG. 19 illustrates preferred se-static-data-structures 712 of the current embodiment. One preferred se-static-data-structure is knowledge base 715 which relates to a subject of interest 713 such as cars, anatomy, or computers (see FIG. 19). In the example illustrated in FIG. 19, the subject of interest 713 relating to knowledge base 715 is patients 718.

A knowledge base typically incorporates a plurality of dimensioned-concepts 292. In the current example, dimensioned-concepts include medical records for particular patients such as Brown 724 and Curtis 726. In the current embodiment, a particular dimensioned-concept 292 is stored in a data structure (see FIG. 16) which includes a plurality of slots such as 296, each of which holds a dimension and the dimension's value for the dimensioned-concept 292. Thus, for dimensioned-concept 292, slot 296 holds the dimension "symptom" and the value "angina".

Often, it is convenient to group dimensioned-concepts 292 into categories. In the current example as illustrated in FIG. 19, patients such as Brown 724 and Curtis 726 are organized into categories or groups according to sex, and there are two groups, female 720 and male 722. The particular grouping is flexible. For example, we might decide to have two sets of groupings, one by sex and a second by ethnic background. In the current embodiment, there can be as many or as few groupings as desired.

Another se-static-data-structure 712 in the preferred embodiment is called domains 714 (see FIG. 20). Typically, there is one domains 714 structure for a subject of interest 713. In the preferred embodiment, domains 714 holds a slot for each dimension and set of dimension values used in the subject of interest 713. For example, the domains 714 example illustrated in FIG. 20 includes abnormal-ecg? slot 728 which holds values (no yes).

FIG. 21 illustrates a knowledge structure 716, a third se-static-data-structure 712 in the preferred embodiment, which holds information on dimensions of interest in a domain. For example, alphabetized-dimensions 734 typically holds a list of dimensions which could be used by the Space Explorer system, membership-dimensions 738 holds class/subclass information 184 used by the Space Explorer system such as the female 720 and male 722 categories illustrated in FIG. 19, useful-dimensions 746 holds dimensions currently active in the Space Explorer system, and rank-ordered-dimensions 742 provides a rank ordering of dimensions which could be used by the Space Explorer system.

In the preferred embodiment, there are data structures for dynamic data storage during execution of the Space Explorer system. Typically, there is a current-query 748 structure (see FIG. 22) which holds information such as current-root-unit 750 where a current domain is stored, knowledge-structure-unit 752 which holds a pointer to a domain's knowledge-structures unit such as knowledge-structure 716, and standing-candidates 756 which holds dimensioned-concepts 292 which are active currently. In the preferred embodiment, there is a second dynamic data structure called dimensions-to-explore 270 which is illustrated in FIG. 23. Typically, dimensions-to-explore 270 includes information such as explorable-member-dims 274 which holds dimensions which could be explored in a particular context. Further details about data stored in the data structures described above will be provided in the Space Explorer Process Description section following below.

Space Explorer Process Description

Figure 24:
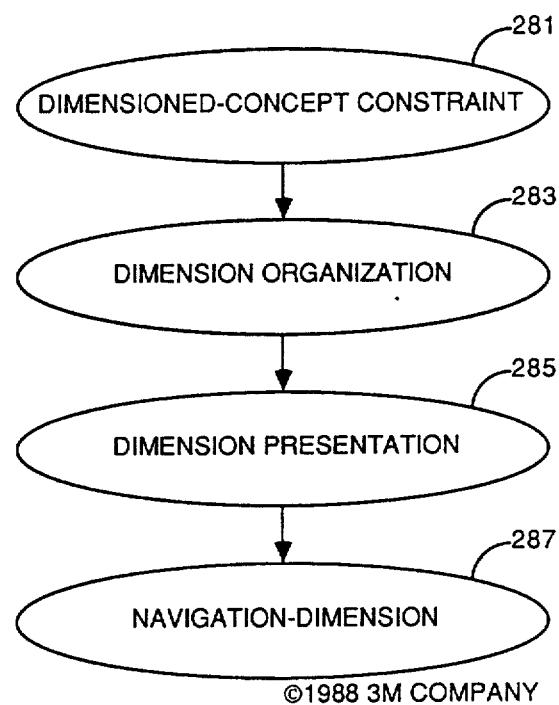
FIG. 24 illustrates general processes for the preferred Space Explorer system.

The preferred Space Explorer system follows the same general ION system processes described above and illustrated in FIG. 2 (concept constraint process 168, category organization process 172, concept display process 174 and navigation process 176). However, in the preferred Space Explorer system, these processes are specialized for exploring an n-dimensional space. These specialized processes include dimensioned-concept constraint process 281, dimension organization process 283, dimension presentation process 285, and navigation-dimension process 287 (see FIG. 24). In the current embodiment, a subject of interest 713 (FIG. 19) is selected and concepts 1016 which are both related to the subject of interest 713 and of current interest to a user are accessed in dimensioned-concept constraint process 281, concepts are organized into an n-dimensional space during dimension organization process 283, concepts are displayed to a user in a format similar to that illustrated in FIG. 17 using dimension presentation process 285, and a user is given options to navigate through an n-dimensional space in navigation-dimension process 287. These preferred system process components will be described below.

Dimensioned-Concept Constraint Process 281

Figure 25:
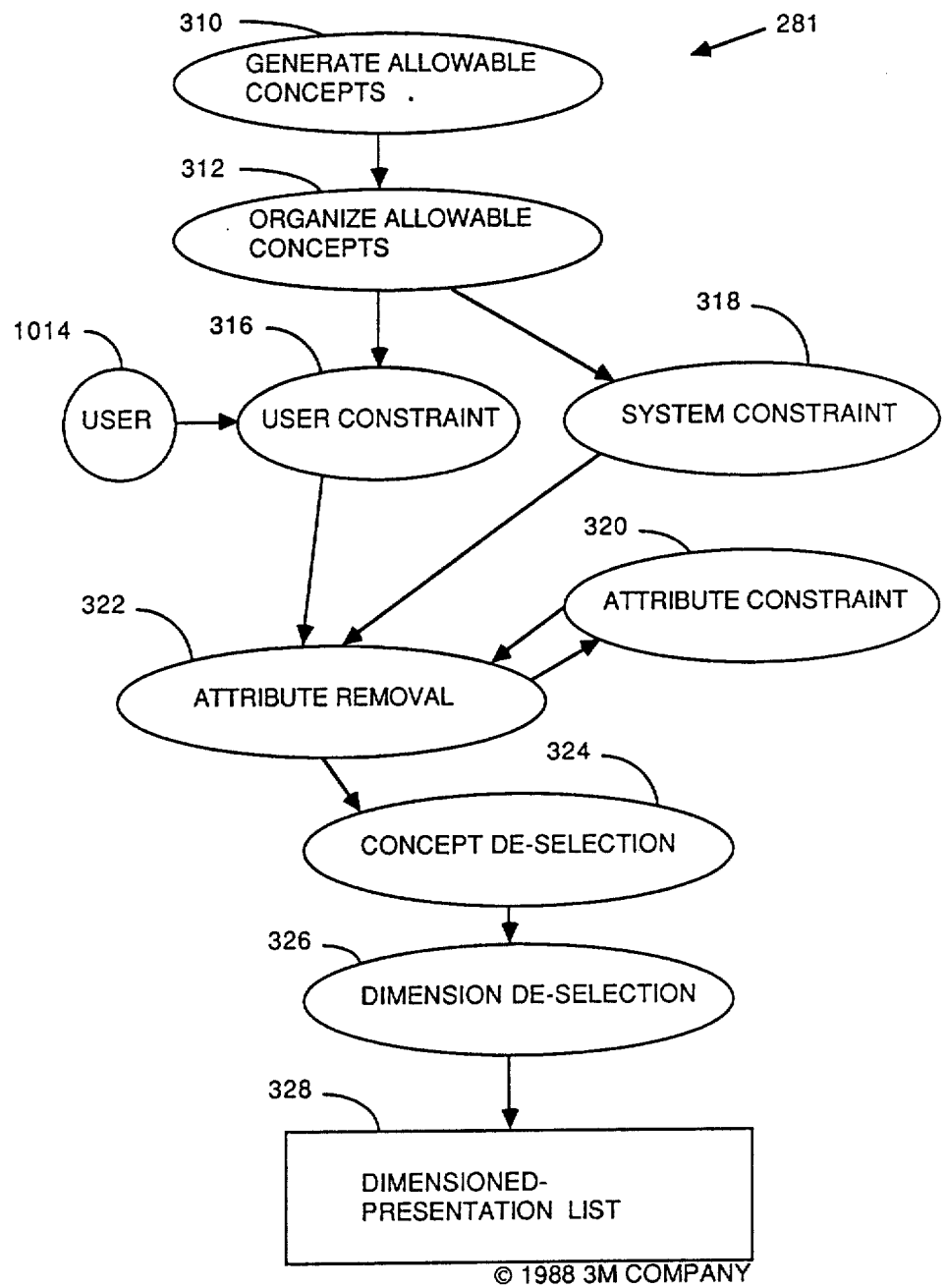
FIG. 25 illustrates dimensioned-concept constraint processes.

In the preferred embodiment of the Space Explorer system, the purpose of dimensioned-concept constraint process 281 is to generate a dimensioned-presentation list 328 which contains dimensioned-concepts 292 that can be presented to a user in an n-dimensional space during a particular Space Explorer system session. Preferred process 281 is illustrated in FIG. 25. In the preferred embodiment, a subject of interest 713 is selected, and concepts 1016 related to the subject of interest 713 are collected (generate allowable concepts process 310), the concepts are organized (organize allowable concepts process 312), either a user places constraints on the concept list (user constraint process 316) or the system places constraints on the concept list (system constraint process 318), attributes 1017 which do not fit into current constraints are removed (attribute removal process 322 and attribute constraint process 320), dimensioned-concepts which do not fit into current constraints are removed (concept de-selection process 324), dimensions which do not fit into current constraints are removed (dimension de-selection process 326) and a dimensioned-presentation list 328 is provided as an output.

Generate Allowable Concepts Process 310

In the preferred embodiment, the purpose of generate allowable concepts process 310 is to generate a list of allowable dimensioned-concepts for the presentation mode and the current context. In the current embodiment, the first step is to select a subject of interest 713, and there are three ways of making a selection. First, the user 1014 could request a Space Explorer system session on a subject of interest 713 directly. For example, when the user completes an activity, a menu may be provided which indicates all available activities. This menu may include one or more calls to the Space Explorer system as options, such as 'browse through houses'. The Space Explorer system may be configured to generate the list of subject of interest 713 options by accessing a global variable containing pointers to potential domains.

Second, a system such as a tutorial system may make a call to the Space Explorer system. For example, if in the middle of a tutorial session the user misses a question about the types of house architectures which exist, the tutorial system can call the Space Explorer system on houses and ask the user to examine different house types with the Space Explorer system. There is preferably a set of rules which indicates when the Space Explorer system can and should be called (see section on Presentation Mode Selection) and a list of potential subjects of interest 713. When a user error is encountered, the rules and list of potential subjects of interest 713 may be consulted to determine whether to make a call to the Space Explorer system.

Third, a related system preferably provides access to the Space Explorer system from other activities. If the user requests the Space Explorer system, the requesting system preferably looks at the current activity and determines whether there is a subject of interest 713 involved in the current activity which is in the list of potential subjects of interest 713. If there is a subject of interest 713, it can be selected. If not, the user 1014 may select a subject of interest 713 from the list of potential subjects of interest 713, or the Space Explorer system may select a default subject of interest 713.

In the present system as currently implemented, once a subject of interest 713, such as patients 718, has been selected, it is placed in the current-root-unit 750 slot of current-query 748 and is used to generate a list of allowable concepts by finding a data structure such as that in FIG. 19 which has patients 718 as its root unit and then collecting a list of children which are leaves of the data structure such as Brown 724 and Curtis 726 in FIG. 19.

Organize Allowable Concepts Process 312

In the preferred embodiment, the purpose of organize allowable concepts process 312 is to organize allowable concepts according to their attributes and attribute values and to generate a list of attributes and attribute values. For the present, we will assume that attributes and dimensions are equivalent. In the present system, relevant information for this step is stored in a knowledge structure 716 data structure for the subject of interest 713 selected during the generate allowable concepts process 310 described above. In the current embodiment, the list of dimensions is composed of a union of values from the membership-dimensions 738 and useful-dimensions 746 slots (see FIG. 21), and each dimension has information available about its attribute values.

User Constraint Process 316 and System Constraint Process 318

Figure 26:
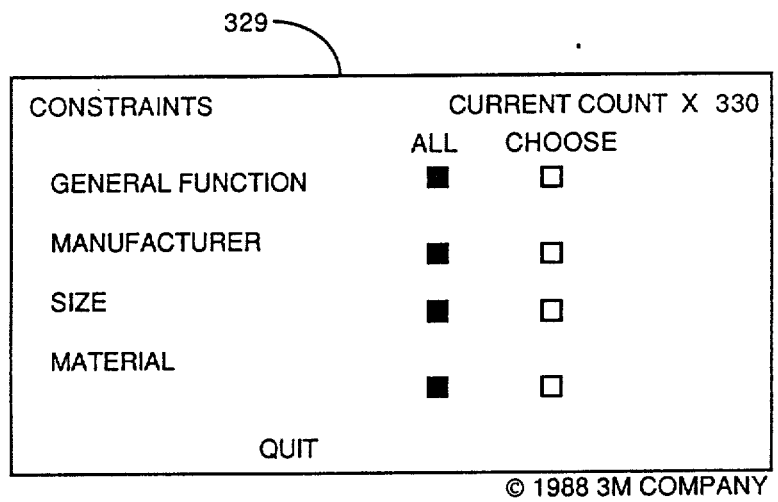
FIG. 26 illustrates a constraints user interface.
Figure 27:
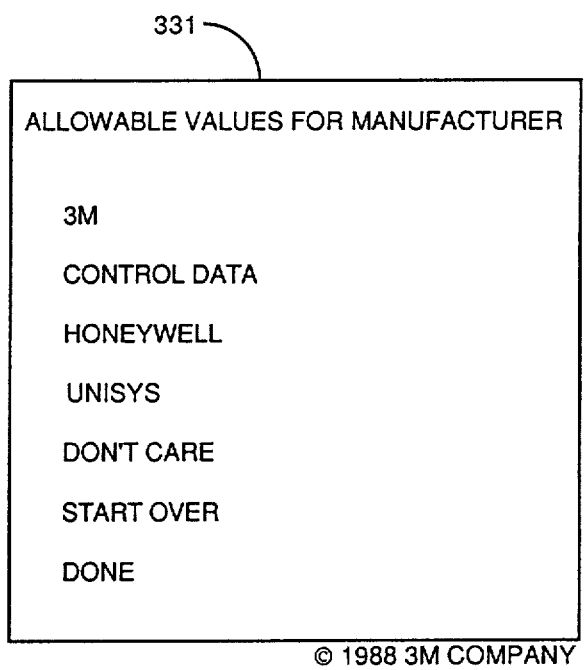
FIG. 27 illustrates a constraints sub-menu.

In the preferred embodiment, the purpose of the constraint processes (316 and 318) is to limit the attributes 1017 and/or attribute-values 1018 which will be active in a particular Space Explorer system session by allowing a user or the system to remove attribute values from the list of attributes and attribute values. Let us first consider the situation in which a user has control over the constraint process (user constraint process 316). It would be possible to present a user with a menu of attributes 1017 and attribute-values 1018 and to allow a user to select items which should be constrained. For example, a user might indicate that only patients of physicians Jones, Harris and Johnson should be included. FIG. 26 illustrates such a menu 329. A count 330 of dimensioned-concepts meeting current constraints is shown in the upper right corner of the menu. A user preferably can restrict any of the attributes 1017 in the left column by selecting 'choose' which brings up a sub-menu of attribute-values 1018 such as sub-menu 331 in FIG. 27. Constraint selection preferably ends when a user selects 'quit' from FIG. 26.

In the preferred embodiment, the Space Explorer system keeps track of selected constraints and presents only those options to a user which make sense in a current context. For example, suppose a user indicated interest in only two physicians and both physicians belong to hospitals 'A' and 'B'. Now, if a user is selecting hospitals, only hospitals 'A' and 'B' will be presented as options since the remaining hospitals have no physicians of interest.

System constraint process 318 works in much the same way as user constraint process 316 with the exception that constraints are selected by the Space Explorer system rather than a user. In the preferred embodiment, if the Space Explorer system is called from a context such as a tutorial, the tutorial may pass to the Space Explorer system information on a current topic which may be used to place constraints. For example, suppose that a user is in the middle of a tutorial on selection of scalpels when the Space Explorer system is called on the subject of surgical instruments. The Space Explorer system may wish to constrain the browsing space to that of scalpels.

In the current embodiment, constraints are stored in the standing-constraints 258 slot of the current-query 748 data structure and take a form similar to (slot-value-equality size 20) which indicates that size has an exact value of 20, (slot-value-range length (0 15.3)) which indicates that length has a range of values from 0 to 15.3, and (slot-value-set material (pvc vinyl)) which indicates that material can be either pvc or vinyl.

Attribute Removal Process 322 and Attribute Constraint Process 320

In the current embodiment, the purpose of attribute removal process 322 is to remove attributes 1017 which no longer have attribute values 1018 following removal of attribute values in user constraint process 316 or system constraint process 318. The Space Explorer system preferably checks to see whether there are any attributes 1017 which have no remaining attribute values 1018 and removes them. Attribute constraint process 320 then preferably determines whether constraints are placed on remaining attributes when one or more attributes have been removed from the list by attribute removal process 322, and removes additional attributes based on the constraints. For example, if in the domain of 'hearts' an attribute 'disease' has been removed, one might want to also eliminate the attribute 'treatment'. One could develop a set of rules determining relationships among attributes 1017 or store relationship information 184 in the domains 714 data structure for the domain and attribute.

Concept De-Selection Process 324

In the preferred embodiment, the purpose of concept de-selection process 324 is to generate a dimensioned-presentation list 328 by removing from a list of allowable concepts those dimensioned-concepts which have attributes 1017 or attribute values 1018 which have been removed prior to concept de-selection process 324 by the user constraint means and the system constraint means. In the preferred embodiment, since a dimensioned-concept 292 includes information on attributes 1017 and attribute values 1018, a simple comparison of active attributes and attribute values and dimensioned-concept attributes and attribute values can be made to decide which dimensioned-concepts 292 to remove. In the current embodiment, the dimensioned-presentation list 328 is stored in standing-candidates slot 756 of the current-query 748 data structure.

Dimension De-Selection Process 326

In the preferred embodiment, the purpose of dimension de-selection process 326 is to remove, from a list of active dimensions, those dimensions which do not meet current constraints, that is, process 326 uses the knowledge of mappings to remove dimensions for which there are no concepts in the dimensioned-presentation list. If there is a one-to-one relationship between attributes 1017 and dimensions, this process will have been completed following attribute removal process 322 and attribute constraint means 320. However, if there is a several-to-one relationship between a dimension and a plurality of attributes 1017, dimension de-selection process 326 can determine which dimensions should be removed based on prior attribute removal.

Dimension Organization Process 283

Figure 28:
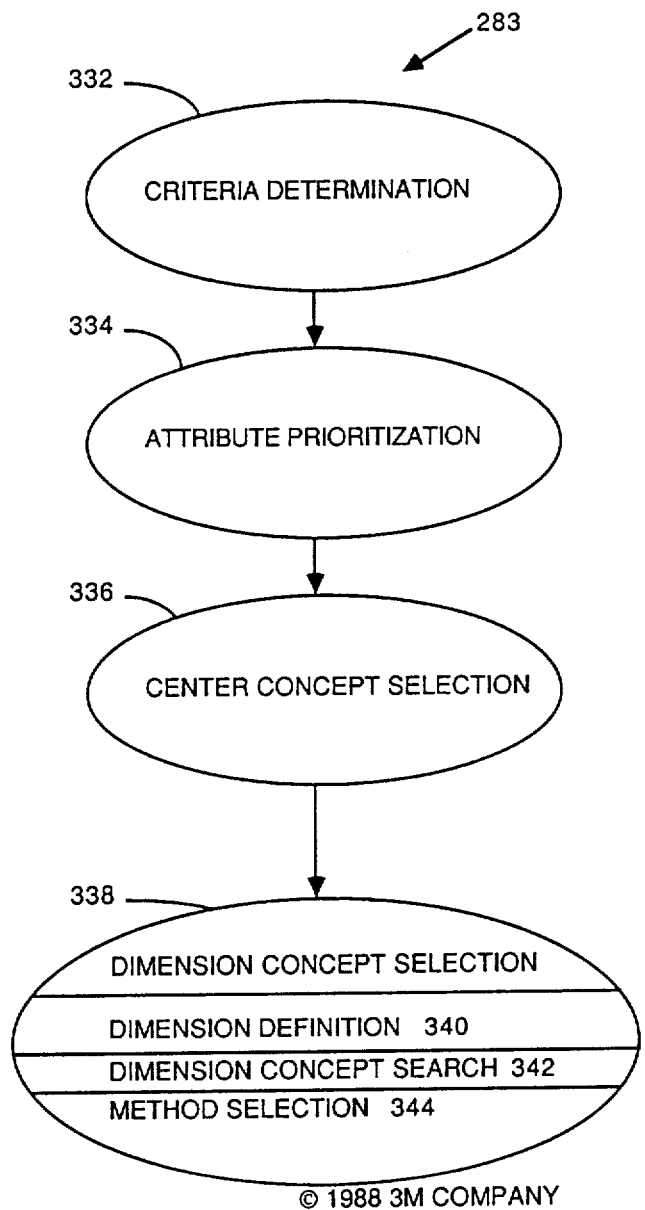
FIG. 28 illustrates dimensions organization processes.

Preferred dimension organization process 283 is illustrated in FIG. 28. In the preferred embodiment, the purpose of dimension organization process 283 is to organize a dimensioned-presentation list 328 into an n-dimensional space. The process of the current embodiment involves generating a list of attributes 1017 and attribute values 1018 to be used for concept organization (criteria determination process 332), prioritizing the list of attributes and attribute values (attribute prioritization process 334), selecting a dimensioned-concept to be a conceptual center of the n-dimensional space (center concept selection process 336) and searching for a dimensioned-concept for each satellite dimension (dimension concept selection process 338).

Criteria Determination Process 332

In the preferred embodiment, the purpose of criteria determination process 332 is to use the knowledge of mappings to generate a list of attributes 1017 and attribute values 1018 to be used to organize dimensioned-concepts 292 into an n-dimensional space in a particular context. Generally, this involves generating a list of allowable dimensions and attribute values 1018 and then allowing the Space Explorer system or a user to select desired dimensions from the list of allowable dimensions. In the current embodiment, dimensions which remain active following dimension de-selection process 326 are checked to see whether they are allowable dimensions. In the preferred embodiment, a dimension is allowable if it has at least two attribute values 1018. If there is only one attribute value 1018, it would not make sense to attempt to explore the dimension. In the current embodiment, the list of allowable dimensions may then be presented to a user in the form of a menu, and a user is given the opportunity to select a set of dimensions to explore; as implemented, the set may include from two to eight dimensions. It is also possible to allow the Space Explorer system to select dimensions. For example, if the Space Explorer system is called from a tutorial and it is known that the current user is naive about the domain being explored, the Space Explorer system may wish to limit the dimensions to those which fit into a student model of knowledge.

Attribute Prioritization Process 334

The purpose of preferred attribute prioritization process 334 is to use the knowledge of mappings to generate a general prioritized list of attributes and attribute values from the list of attributes and attribute values generated by criteria determination process 332. An important part of this goal is to prioritize the list of dimensions to be explored. In the preferred embodiment, class/subclass dimensions such as female 720 and male 722 in FIG. 19 are automatically given a higher priority than dimensions which do not have a class/subclass relationship. In the current embodiment, rank orderings of remaining dimensions may be found in the rank-ordered-dimensions slot 742 in the knowledge structure 716 data structure. As implemented, these priorities are combined to generate a final rank ordering of all dimensions to be explored, and the rank ordering is stored in the list-of-dimensions 280 slot of the dimensions-to-explore 270 data structure.

Center Concept Selection Process 336

In the preferred embodiment, the purpose of center concept selection process 336 is to use the knowledge of mappings to search through the list of dimensioned-concepts to select a dimensioned-concept 292 to be designated as an initial center concept of an n-dimensional space. Prior to selection of dimensioned-concepts 292 for center or satellite positions, indexes are preferably created for dimensions which will be explored. As implemented, an index includes an ordered list of attribute values 1018 for its dimension and a list of dimensioned-concepts 292 which match each attribute value. Indexes help to speed the searching process and may be stored in an indexed-standing-sets slot 278 of dimensions-to-explore 270.

In the preferred embodiment, a center concept is selected in the following way:

```
[define SELECT-CENTER 346
(* select concept 1016 which will be initial center)
find central attribute value 1018 for each dimension using its index
```

Dimension Concept Selection Process 338

```
for each dimension create a list of dimensioned-concepts 292 ordered by closeness to central
attribute value for dimension
if there is an intersection of the first elements in each list
then center concept is the first concept in the intersection
else combine first and second elements in one of the lists and look for intersection
continue process until intersection is found]
``` will only describe one method as an example. An example search method is as follows:

```
[define EXAMPLE-SEARCH 352
(*search for dimensioned-concept 292 for a satellite and its dimension)
select the closest attribute value 1018 for the target dimension
find all dimensioned-concepts 292 with the current target dimension value
for each dimensioned-concept 292, see if it matches all other dimension values required for
center concept
if there is a match, return dimensioned-concept 292
else remove the least important dimension and repeat until match is found or there
are no dimensions left
if no match is found, repeat with next closest attribute value]
```

The purpose of preferred dimension concept selection process 338 is to search through the dimensioned-presentation list of dimensioned-concepts 328 to find a concept for each satellite in an n-dimensional space, where a satellite corresponds to a dimension to be explored. Dimension concept selection process 338 preferably includes dimension definition process 340 for generating a satellite prioritized list of attributes 1017 and attribute values 1018 for each satellite by comparing the general prioritized list of attributes and attribute values to the conceptual center, dimension concept search process 342 for searching for a dimensioned-concept 292 for each satellite using its prioritized list of attributes and attribute values, and method selection process 344 for allowing the system or user to select a search method to be used by dimension concept search process 342.

The purpose of preferred dimension definition process 340 is to generate information required to perform a search for a dimensioned-concept 292. In the current embodiment, there are many types of search available; each performs a search for one satellite, and all of them are provided with the following information: the dimensioned-concept 292 which is the new center concept, the dimension of the satellite for which a search is being conducted, a list of dimensions for all current satellites, the list of dimensioned-concepts 292 which are currently available, a set of attribute values 1018 for each dimension ordered by closeness to a desired attribute value, a list of indexes for each satellite, a list for each satellite of the corresponding dimension, the attribute value of the center concept on that dimension, and the relationship between the new center and the previous center on that attribute value. This information preferably is collected and sent to a search function.

In the preferred embodiment, the purpose of dimension concept search process 342 is to use the information supplied by preferred dimension definition process 340 and a search method selected by method selection process 344 to search for a dimensioned-concept 292 for each satellite in an n-dimensional space. Typically, there are many search methods available, a particular method is appropriate for a particular context, and some domain knowledge resides in the search method. This makes the preferred Space Explorer system flexible and expandable. Since there are many potential search methods, we The purpose of preferred method selection process 344 is to allow either the Space Explorer system or a user to select a search method for use in selection of dimensioned-concepts 292 for an n-dimensional space. In the current system, any number and variety of search methods may be stored and used. It is preferred that, at any time during a Space Explorer session, a user may have the option to select a new search method; a menu of options preferably is displayed and a user preferably is asked to select a desired search method. It also would be possible to allow a user to create a new search method which would then be added to a collection of methods and provided as an option. If the Space Explorer system is called from another module such as a tutorial, the system may decide to make its own selection of search method. A selection may be based on context or user model 1080. For example, if there is information indicating that a user prefers searches which are fast although slightly less accurate, the system may select a "fast search" automatically for that user.

Dimension Presentation Process 285

Figure 29:
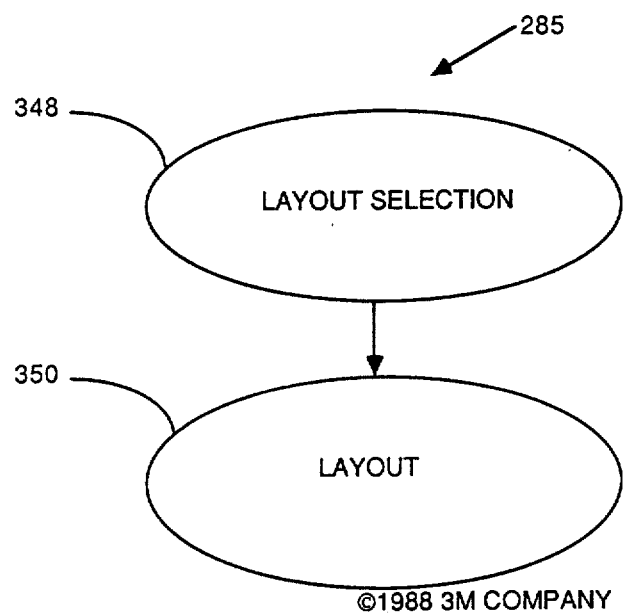
FIG. 29 illustrates dimension presentation processes.

The purpose of preferred dimension presentation process 285 is to display to a user a plurality of concepts simultaneously including a conceptual center concept and a plurality of satellite concepts which are organized by dimensions. Typically, this involves selecting a layout for the screen which is appropriate for the number of dimensions to be explored (layout selection process 348) and performing the display (layout process 350), that is, placing the conceptual center of the n-dimensional space on the user screen surrounded by satellites which each differ from the center along one dimension. These processes are illustrated in FIG. 29. In the preferred embodiment, a layout selection is required because the layout of the screen is flexible and dynamic. For example, it is preferred that either a user or the Space Explorer system may choose a variable number of satellites for exploration. As implemented, there may be as few as two satellites and as many as eight, and different numbers of items require a different layout scheme. Screen formats for different numbers of screen items preferably are stored and then retrieved during the layout selection process 348. It also would be possible to generate screens dynamically using a graphing placement algorithm. Generally, once a layout has been selected, layout process 350 places the center dimensioned-concept 292 in the spot designated as center spot on the layout, and each satellite dimensioned-concept 292 is placed in a separate spot designated for a satellite on the layout. FIG. 17 illustrates a layout appropriate for a center concept and four satellites. Other layouts are also possible. It would also be possible to place satellites into satellite spots in an arbitrary order or to specify a particular order if desired.

Navigation-Dimension Process 287

Figure 30:
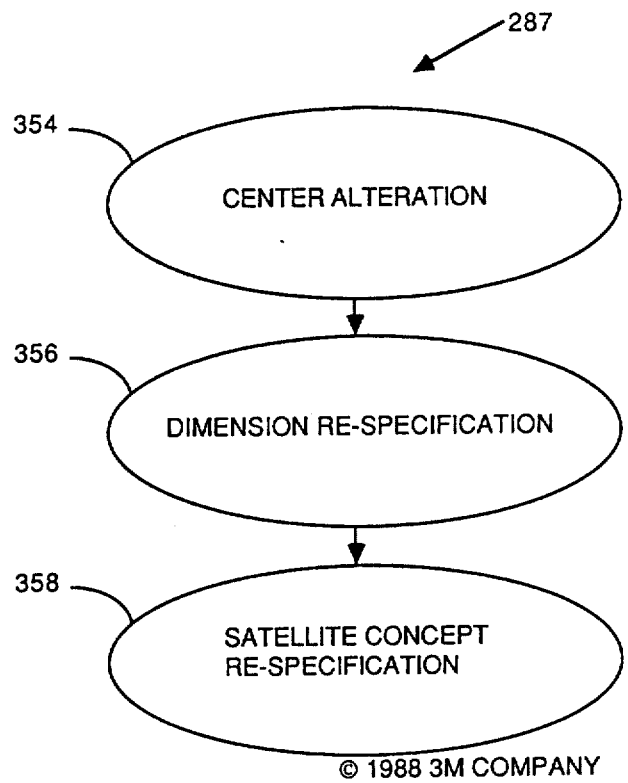
FIG. 30 illustrates navigation-dimension processes.

Preferred navigation-dimension process 287 is illustrated in FIG. 30. In the current embodiment, the purpose of navigation-dimension process 287 is to allow a user to navigate through an n-dimensional space by presenting the user with a technique of navigating through the dimensions. Typically, the process involves allowing the user to change the conceptual center of the n-dimensional space (center alteration process 354), generating a new prioritized list of attributes and attribute values for each dimension based on the new conceptual center (dimension re-specification process 356) and selecting new dimensioned-concepts 292 for each satellite by searching through the dimensioned-presentation list using the new prioritized list of attributes and attribute values for the corresponding dimension (satellite concept re-specification process 358).

Center Alteration Process 354

Figure 31:
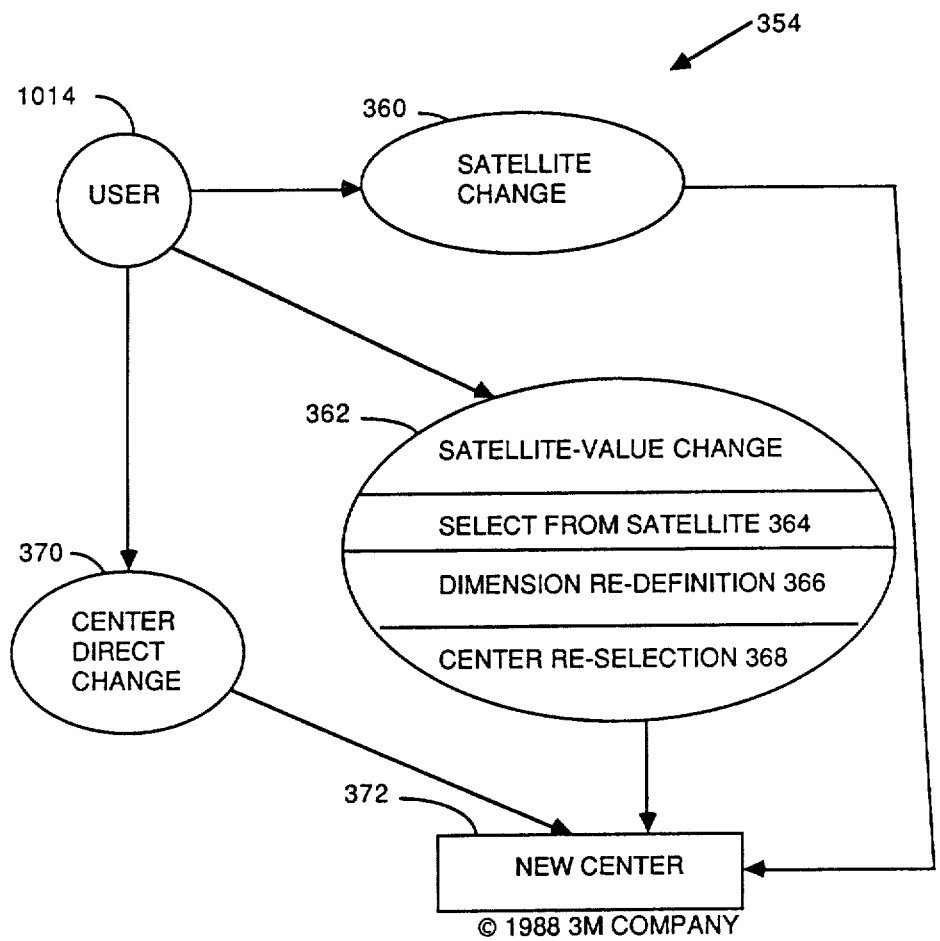
FIG. 31 illustrates satellite change processes.

Preferred center alteration process 354 is illustrated in FIG. 31. Typically, a new center 372 is selected by allowing the user to re-define an attribute value 1018 of a satellite (satellite-value change process 362), by allowing the user to select a satellite concept to be moved from a satellite to the conceptual center (satellite change process 360), or by allowing a user to select a conceptual center from the dimensioned-presentation list (center direct change process 370).

Figure 32:
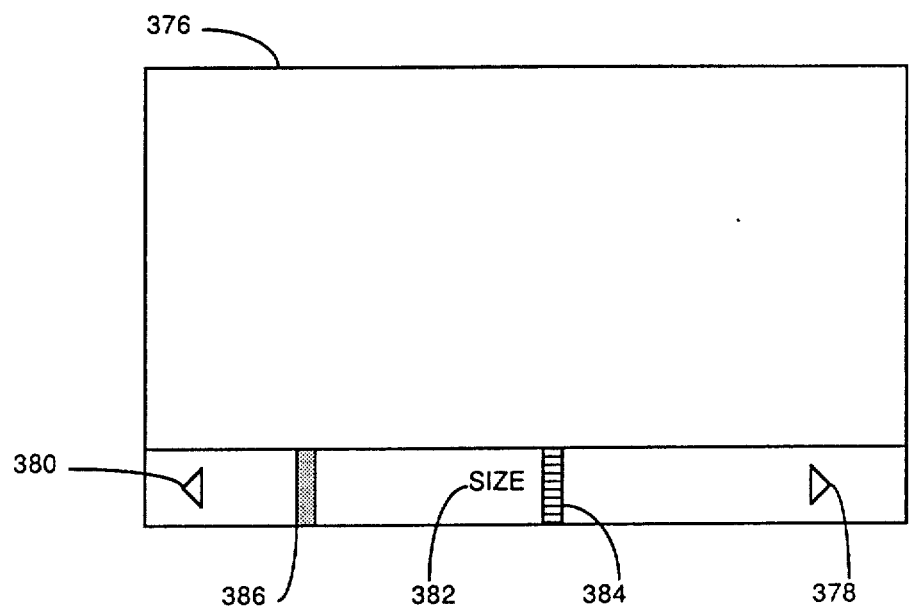
FIG. 32 illustrates a preferred Space Explorer system satellite user interface.

Satellite-value change process 362 provides one way of selecting a new center. It is easiest to understand the process by first becoming familiar with a typical user display 1012. FIG. 32 illustrates one way of representing attribute value information 184 of a satellite 376 on a user display 1012. In the preferred embodiment, the bottom of a satellite typically has a panel with attribute value 1018 information such as name of dimension 382, relative positioning of the satellite on the scale of potential attribute values 384, relative positioning of the center dimensioned-concept 292 on the scale of potential attribute values 386, an arrow pointing to the right 378 and an arrow pointing to the left 380.

In the current embodiment, there are three ways of selecting an attribute value 1018 for the satellite (select from satellite process 364): if a user selects the right pointing arrow 378, the dimension attribute value of the center moves one position to the right, and the satellite attribute value is re-set; if a user selects the left pointing arrow 380, the dimension attribute value of the center moves one position to the left, and the satellite attribute value is re-set; if a user selects the center of the panel between 380 and 378, a menu of all attribute values is presented, a user selects an attribute value from the menu which then becomes the new center attribute value, and the satellite attribute value is re-set. In the preferred embodiment, once a new attribute value has been selected, dimension re-definition process 366 is invoked to re-define the set of attribute values required for a center concept by generating a difference list of prioritized attributes and attribute values which define the difference between the conceptual center of the n-dimensional space and the new attribute value for the satellite. Typically, the process is the same as that in attribute prioritization process 334. In the current embodiment, the next step is center re-selection process 368 which parallels center concept selection process 336 in which a search is made for a conceptual center of the n-dimensional space using the difference list.

Satellite change process 360 provides a second way of selecting a new center concept. In the preferred embodiment, a user has the option in satellite change process 360 to select a dimensioned-concept 292 which is currently attached to a satellite and indicate that the concept should be moved to the center position of an n-dimensional space.

Center direct change process 370 provides a third way of selecting a new center concept. In the preferred embodiment, it is possible to provide a user with a menu of dimensioned-concepts 292 and to allow a user to select one of the concepts for placement into the center position of an n-dimensional space.

Dimension Re-Specification Process 356

The purpose of preferred dimension re-specification process 356 is to re-organize attribute values 1018 for satellites following selection of a new center dimensioned-concept 292. In the current embodiment, the re-specification process is the same as that described in dimension definition process 340.

Satellite Concept Re-Specification Process 358

The purpose of preferred satellite concept re-specification process 358 is to select a new dimensioned-concept 292 for each satellite following selection of a new center. In the current embodiment, the process is the same as that described in dimension concept search process 342.

General Description and Data Structures for Nearest Neighbor

The preferred Nearest Neighbor system allows a user to create and use definitions of similarity in order to organize and view a plurality of concepts 1016 according to their similarity. This feature of the present system is dynamic, i.e., it operates contemporaneously with the user's accessing the system and requires no reprogramming of the system in order to organize and view new concept similarities. For example, a user of the preferred embodiment might select a concept 1016 "car" and a definition of similarity which indicates that another car is similar to the first if it is made by the same manufacturer, has roughly the same price and roughly the same engine size. The user might also indicate that seating capacity should be considered but should be a lower priority in a similarity definition. Using these criteria, the Nearest Neighbor system could retrieve information on several cars which are most similar to the initially selected car. An important component of the preferred embodiment is the ability of a user to create similarity definitions and to use a plurality of definitions in a single retrieval session. In the preferred embodiment, data structures 1000 for the Nearest Neighbor system overlap with those of the Space Explorer system. In particular, se-static-data-structures 712 (see FIG. 19) are used by the current embodiment of the Nearest Neighbor system.

Nearest Neighbor Process Description

Figure 33:
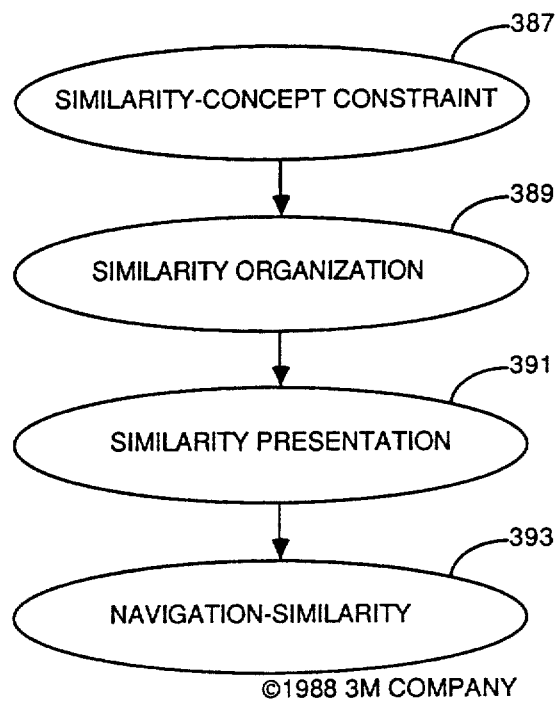
FIG. 33 illustrates general processes for the preferred Nearest Neighbor system.

The preferred Nearest Neighbor system follows the same general processes described above for the ION system and illustrated in FIG. 2 (concept constraint process 168, category organization process 172, concept display process 174 and navigation process 176). However, in the preferred Nearest Neighbor system, these processes are specialized for organizing concepts according to their similarity. These specialized processes include similarity-concept constraint process 387, similarity organization process 389, similarity presentation process 391, and navigation-similarity process 393 (see FIG. 33).

In the current embodiment, a top concept 410 (see FIG. 34b) is selected and a similarity-presentation list of similarity-concepts is generated in similarity-concept constraint process 387, the similarity-presentation list is organized by degree of similarity of concepts to the top concept 410 using a weighting in similarity organization process 389, a plurality of concepts is displayed simultaneously to a user, including a top concept 410 and a plurality of related concepts which are organized by similarity to the top concept 410 in similarity presentation process 391, and a user is presented with a technique of navigating through similarity-concepts by altering top concept 410 or similarity definition 398 (see FIG. 35) during navigation-similarity process 393. An important aspect of the preferred embodiment is the ability to create, modify and select similarity definitions 398. These processes are illustrated in FIG. 35.

Creating and Modifying Similarity Definitions

Figure 35:
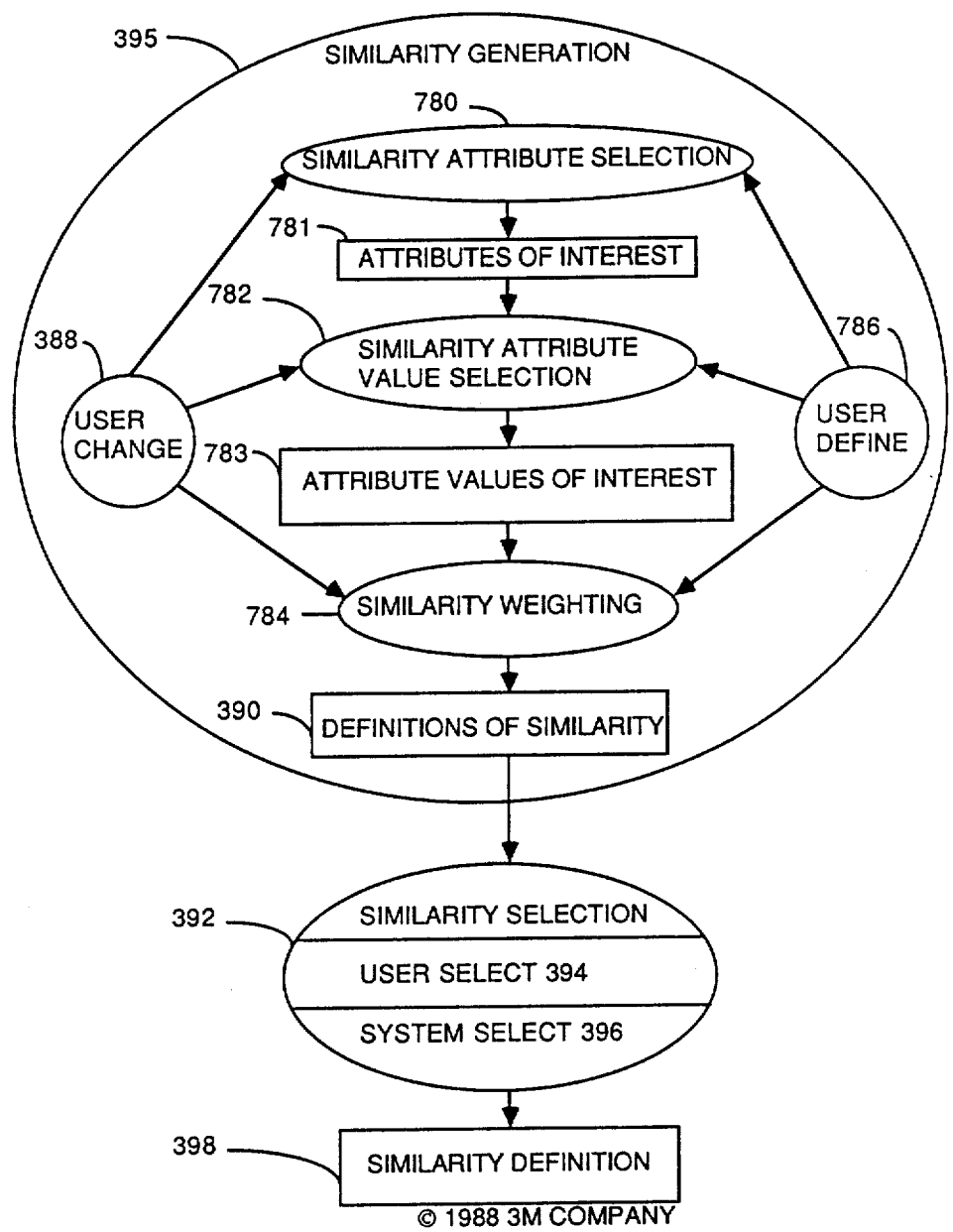
FIG. 35 illustrates similarity generation and selection processes.

The processes involved in creation, modification and selection of similarity definitions in the current embodiment are illustrated in FIG. 35. In the creation process of applying the preferred embodiment, one may generate a plurality of similarity definitions 390 (similarity generation process 395) by generating a list of selected attributes 1017 for use in a similarity definition (similarity attribute selection process 780), generating a list of selected attribute-values 1018 for use in the similarity definition (similarity attribute value selection process 782), and generating a weighting of members of the list of selected attributes and the list of selected attribute-values for use in the similarity definition (similarity weighting process 784). In the preferred embodiment, a similarity definition may be selected (similarity selection process 392); either a user may be allowed to select a definition of similarity (user select process 394), or a system may use a particular context to select a similarity definition 398 for use in a Nearest Neighbor system session from among definitions of similarity 390 currently available to the Nearest Neighbor system (system select process 396).

In the preferred embodiment, a user may dynamically (i.e. contemporaneously with accessing the system and without reprogramming the system) generate a new definition of similarity by specifying a new list of selected attributes, a new list of selected attribute-values and a new weighting (user define process 786), or may change the definition of similarity by altering the list of selected attributes, the list of selected attribute-values or the weighting (user change process 388). The preferred first step in allowing a user 1014 to define 786 or change 388 a similarity definition 398 is to ask a user to select attributes of interest 781 (similarity attribute selection process 780) in the new similarity definition 398. As illustrated in FIG. 20, in the subject area of patient records, attributes 1017 might include abnormal-ecg?, age, allergy, diagnosis, physician, sex, symptom, and treatment. Imagine that a nurse is creating a definition of similarity 398 to access patient records similar to one particular patient record. Perhaps the nurse is interested in patients who had the same physician and diagnosis, but the nurse is less interested in other patient characteristics. In this case, the nurse might select physician and diagnosis as the attributes of interest 781. In the preferred embodiment of the Nearest Neighbor system, information on available attributes 1017 for a subject of interest 713, are stored in domains 714 for the subject of interest 713, and the Nearest Neighbor system can access the available attributes, present them to a user 1014 and ask the user to select attributes of interest 781.

The next step of the current embodiment is to allow a user to select attribute-values of interest 783 in a similarity definition 398 using similarity attribute value selection process 782. Once attributes of interest 781 have been selected, the preferred Nearest Neighbor system can access potential attribute-values 1018 for each attribute of interest 781 using the domains 714 data structure for the subject of interest 713. For example, attribute physician in FIG. 20 has attribute-values Katz, Smith and Glaron. In the current embodiment, a user may be presented with attribute-values 1018 and asked to select those values which are of interest in a similarity definition 398. Often, it may be the case that all attribute-values 1018 are of interest, and user define step 786 may be omitted. However, user define step 786 is included in the current embodiment because a user may want to indicate that one or more attribute-values 1018 should have no bearing on a similarity definition. Following below is an example illustrating the way in which this might work in the current embodiment.

Suppose that the attribute value Katz is removed from the attribute physician. Now, a patient record for one of Smith's patients is selected to be a top concept 410, and the Nearest Neighbor system is attempting to match the Smith patient to a patient of Katz. In the preferred embodiment, because Katz has been removed, there will be no credit given to a similarity match between the two records on the physician attribute. If Katz had remained as an alternative, it might receive a weighting, albeit small, indicating some similarity between the records in the current embodiment on the physician attribute. In other words, removal of an attribute-value 1018 in the preferred Nearest Neighbor system is equivalent to assigning it a weighting of zero. In the preferred embodiment, the default position is to include all attribute-values 1018 for an attribute 1017 but to allow a user to selectively remove one or more of the attribute-values. The result of user define step 786 of the preferred embodiment is creation of attribute values of interest 783.

The third step of the preferred embodiment is similarity weighting process 784 during which a user 1014 may assign weightings to attributes of interest 781 and attribute values of interest 783 to be used in a similarity definition 398. In the current embodiment, weightings of attributes 1017 are mandatory, and the sum of weightings for all attributes of interest 781 must equal 100. A user of the current embodiment may select weightings for attributes 1017 in whatever manner is desired as long as each attribute has a weighting and the sum equals 100. There preferably is more flexibility in weightings for attribute-values 1018, and there are a number of schemes which may be used.

For example, it may be useful in some situations to assign full weight to an attribute 1017 if there is an exact match of attribute-values 1018 between a top concept 410 and another concept 1016 but to assign a default weighting such as 20% if there is not a match. In situations where there is a numerical ordering to attribute-values 1018 as there would be for size, one may wish to devise a scheme in which the weighting is determined by dividing the absolute value difference of top concept 410 and a second concept 1016 for the attribute 1017 by the range of attribute-values available for the attribute.

In yet a third situation, it may be desired to specify closeness between attribute-values 1018 which could then be used to assign weightings during a matching process. For example, suppose that a two-story house is more similar to a tudor than it is to a ranch style house. If top concept 410 is a two-story house and a second concept 1016 is a tudor, it may receive a relatively high weighting; if a second concept is a ranch style house, it may receive a smaller weighting. In the preferred embodiment, similarity weighting process 784 allows a user 1014 to specify a weighting procedure and specific weights desired for attribute-values 1018. In the current embodiment, the result of this process is a set of definitions of similarity 390.

Similarity Selection Process 392

The purpose of preferred similarity selection process 392 is to allow a user or a system to select a similarity definition 398 from among definitions of similarity 390. In many cases, a user may wish to select a definition of similarity 390. In these cases, generally the Nearest Neighbor system may simply provide a list of available definitions and request a selection. In other cases, a separate system may be running when the Nearest Neighbor system is called. In these cases, the calling system may wish to make the definition selection. For example, there may be several similarity definitions 390 for a patient records subject of interest 713. Perhaps one definition is appropriate for a physician, a second for a nurse and a third for a medical records technician. If the calling system knows that a current user 1014 is a nurse, it may choose to select the nurse definition rather than providing access to all three definitions. In either case, the output of similarity selection process 392 in the current embodiment is a similarity definition 398 which is stored in a global variable which can be accessed during the remaining Nearest Neighbor processes which are described below.

Similarity-Concept Constraint Process 387

Figure 34A:
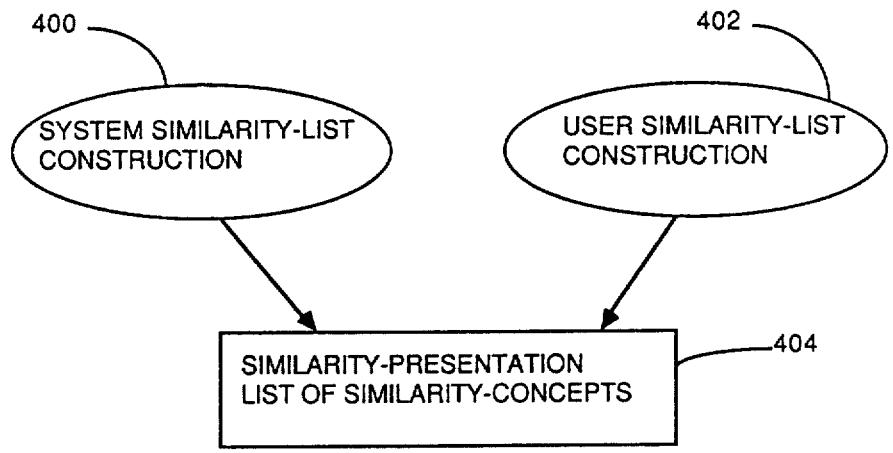
FIG. 34a illustrates similarity-list construction processes.
Figure 34B:
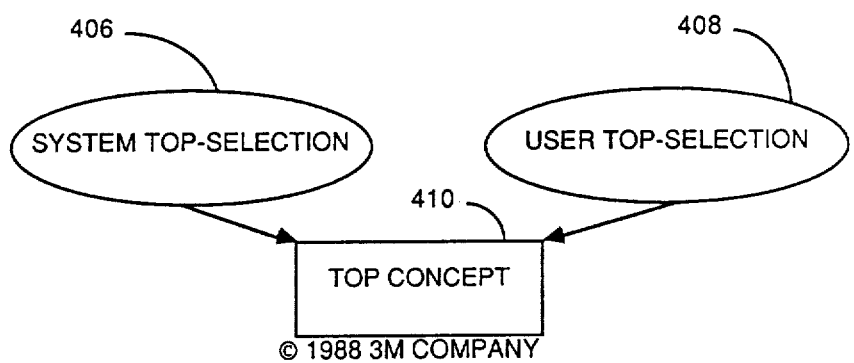
FIG. 34b illustrates top concept selection processes.

The purpose of preferred similarity-concept constraint process 387 is to select a top concept 410 which will be used as a basis for comparison and to construct a similarity-presentation list of similarity-concepts 404 to be compared with the top concept 410 (see FIG. 34a). In the current embodiment, the first step of the process is to generate a similarity-presentation list of similarity-concepts 404; either the system may be allowed to generate the similarity-presentation list using a particular context (system similarity-list construction process 400) or the user may be allowed to generate the similarity-presentation list (user similarity-list construction process 402). There are several options available for these processes. For example, if there is a subject of interest 713 which is of interest to a user, the Nearest Neighbor system may wish to examine knowledge base 715 for the subject of interest 713 (see FIG. 19) and place all leaf nodes into the similarity-presentation list of similarity-concepts 404 (process 400). In other cases, a user may wish to restrict list membership (process 402). In those cases, similarity-concept constraint process 387 may be used to generate the similarity-presentation list of similarity-concepts 404 (which in this case would be equivalent to the dimensioned-presentation list 328).

Once a similarity-presentation list of similarity-concepts 404 has been generated it may be presented in its entirety to a user to allow a user to select a top concept 410 using user top selection process 408. Another option is to allow another system to select a top concept 410 (system top-selection process 406) using a particular context. For example, in the preferred embodiment, the Nearest Neighbor system may be called from another activity. Perhaps a user is studying cars using the Space Explorer system when the Nearest Neighbor system is called. In this case, the Space Explorer system may pass the car which is currently the center concept to the Nearest Neighbor system to serve as a top concept 410.

Similarity Organization Process 389

Figure 36:
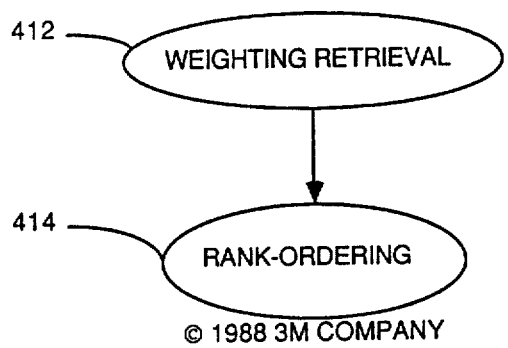
FIG. 36 illustrates similarity organization processes.

In the preferred embodiment, similarity organization process 389 is used to compare a top concept 410 to a set of concepts 1016 in a similarity-presentation list of similarity-concepts 404 and to rank order the set of concepts according to their similarity to the top concept 410 (see FIG. 36). The first step in the current embodiment is to retrieve a similarity definition 398 for use in the rank ordering and access a current weighting for the selected similarity definition (weighting retrieval process 412). As mentioned earlier, the similarity definition 398 which has been selected during similarity selection process 392 has been stored in a global variable and can be retrieved at this time. The second step in the current embodiment is to use a similarity definition 398 to rank order the concepts (rank-ordering process 414). Preferred rank-ordering process 414 is used for comparing the top concept to additional similarity-concepts in the similarity-presentation list using the current weighting, for using the comparison to generate a rank-ordered list of the similarity-concepts on a similarity scale, and for assigning a rank ordering to each similarity-concept.

The preferred weighting process has been described earlier. Basically, in the preferred embodiment, each concept 1016 is compared to the top concept 410 along the attributes of interest 781 using appropriate weightings. The result of the current process is a rank ordering of concepts 1016, where each concept is assigned a number from 0 to 100 indicating the degree of similarity between the concept and the top concept 410.

Similarity Presentation Process 391

Figure 37:
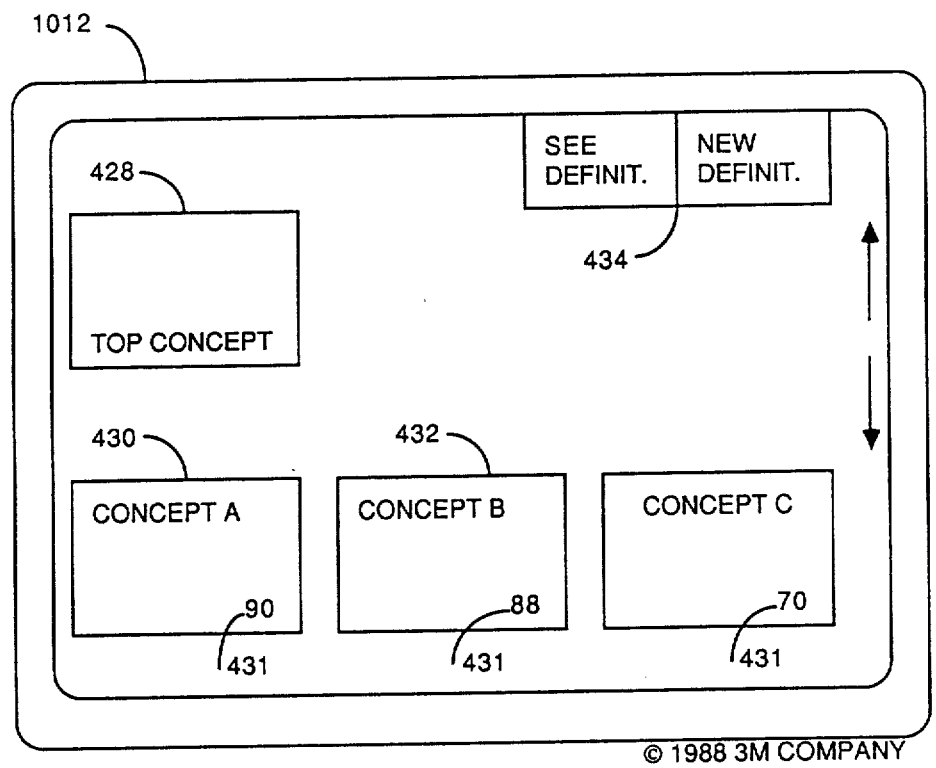
FIG. 37 illustrates a preferred Nearest Neighbor system user interface.
Figure 38:
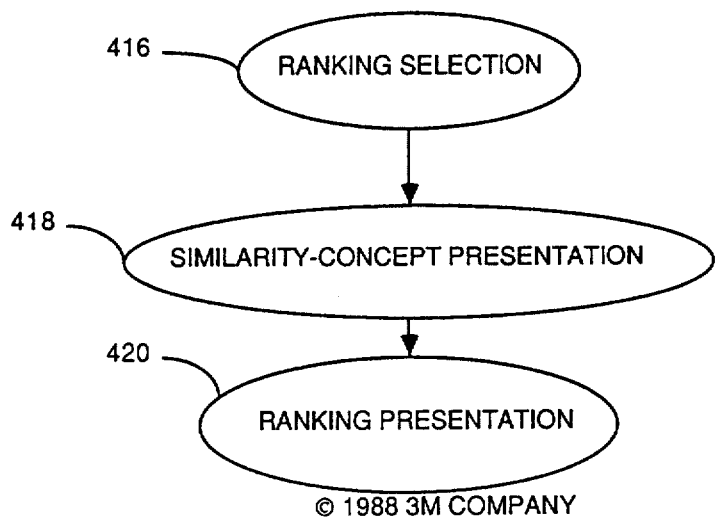
FIG. 38 illustrates similarity presentation processes.

FIG. 37 illustrates a typical user display 1012 resulting from a call to the preferred Nearest Neighbor system. Generally, in the preferred embodiment, a top concept 410 is displayed (428), several concepts 1016 from the similarity-presentation list of similarity-concepts 404 are displayed (430) and rankings 431 for concepts are displayed. In the preferred embodiment, the first step is ranking selection process 416 (see FIG. 38) during which a user or the Nearest Neighbor system selects a ranking cutoff comprising a minimum ranking a concept 1016 must have in order to be presented to a user. For example, a user 1014 may decide that any concept 1016 below a 50% similarity ranking is not of interest. In other cases, all concepts 1016 may be of interest.

The second step of the preferred embodiment is similarity-concept presentation process 418 during which a top concept 410 and the similarity-concepts which exceed the ranking cutoff are presented to a user 1014 with a layout similar to that in FIG. 37. In the preferred embodiment, only concepts 1016 which exceed the ranking cutoff will be presented, concepts will be presented in order of their ranking and only the number of concepts which can be presented in a readable form on the screen will be presented at one time. The number of concepts 1016 which can fit will be a function of the hardware used in the specific implementation. Typically, access to remaining concepts 1016 is provided with a scrolling option. Preferred ranking presentation process 420 is used to present the selected similarity definition and the rank orderings for the similarity-concepts; a typical display is illustrated in FIG. 37.

Navigation Similarity Process 393

Figure 39:
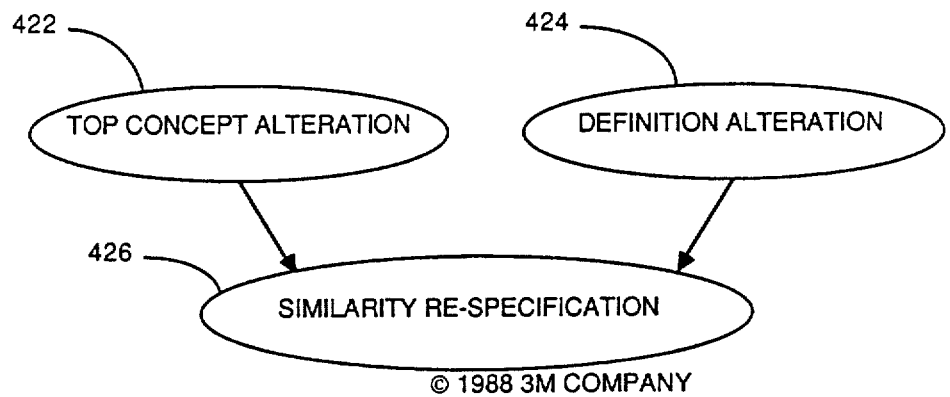
FIG. 39 illustrates navigation-similarity processes.

In the preferred embodiment, there are two ways in which a user may navigate through a set of similarity concepts, by allowing a user to select a new top concept (top concept alteration process 422) and by allowing a user to select a new similarity definition 398 (definition alteration process 424). These are illustrated in FIG. 39. A user preferably may select a new top concept 410 by choosing a concept 1016 currently on display and requesting that it be the new top concept 410 or by choosing to select a new top concept 410 from among the similarity-presentation list of similarity-concepts 404. In the latter case, the process may be the same as that described in user top selection process 408. As previously indicated, a second way of navigating through concepts 1016 in the preferred embodiment is by selecting a new similarity definition 398. As shown in FIG. 37 part 434, a user display 1012 preferably includes a menu option to see the current definition and a second option to select a new definition (434 on FIG. 37). If "new definition" is selected, preferably similiarity selection process 392 is activated. In the preferred embodiment, following either top concept alteration process 422 or definition alteration process 424, similarity re-specification process 426 is activated to re-organize and re-display the concepts 1016 using procedures equivalent to similarity organization process 389 and similarity presentation process 391 to generate a new rank-ordering of similarity-concepts following selection of the new top concept or the new similiarity definition. Typically, navigation can then re-occur using navigation-similarity process 393.

General Description and Data Structures for Focus

Figure 40:
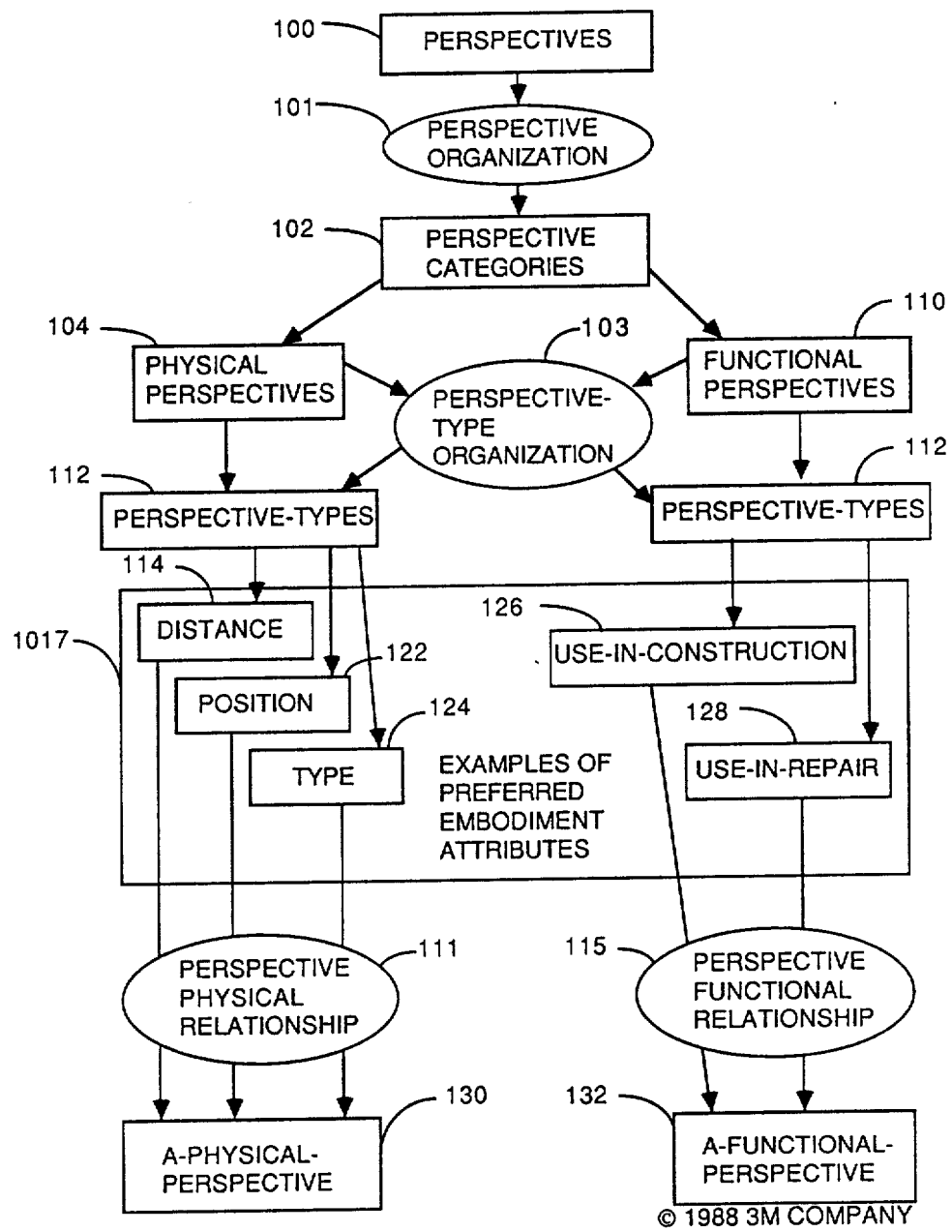
FIG. 40 illustrates perspective description and perspective organization data structures and processes.

The Focus system allows a user 1014 to view a real world object from a number of different perspectives 100 (see FIG. 40). For example, the user might want to view a car from a number of positions and distances; the Focus system would make it easy for a user to select and change the position and distance. An important part of the preferred embodiment of the Focus system is the flexibility provided in selection of real world object characteristics and values which are of interest in a particular situation and which provide access to a set of perspectives. A dynamic aspect of the Focus system is the ability to change the structure of viewing perspectives contemporaneously with system access and without the need for system reprogramming. For example, the user might decide to organize information by distance and position at one moment in time and to re-organize by position and functional use at another moment in time. The data structures which are used in the preferred embodiment to provide this flexibility and dynamic character are illustrated in FIG. 40.

In the current embodiment, preferred perspective organization process 101 organizes perspectives 100 into a number of perspective categories 102 such as physical perspectives 104 (perspectives which are organized by physical relationships), and functional perspectives 110 (perspectives which are organized by functional relationships). Typically, perspective categories 102 are sub-classes of the class of perspectives. Preferred perspective-type organization process 103 organizes a perspective category 102 into a number of perspective-types 112 within the category. For example, physical perspectives 104 might include perspective-types 112 such as distance 114, position 122 and type (nature of display such as graphic or picture) 124, while functional perspectives 110 might include perspective-types 112 such as use-in-construction 126 and use-in-repair 128. In the current embodiment, perspective-types 112 correspond to attributes 1017 and have a set of allowable attribute-values 1018 (FIG. 41).

Figure 41:
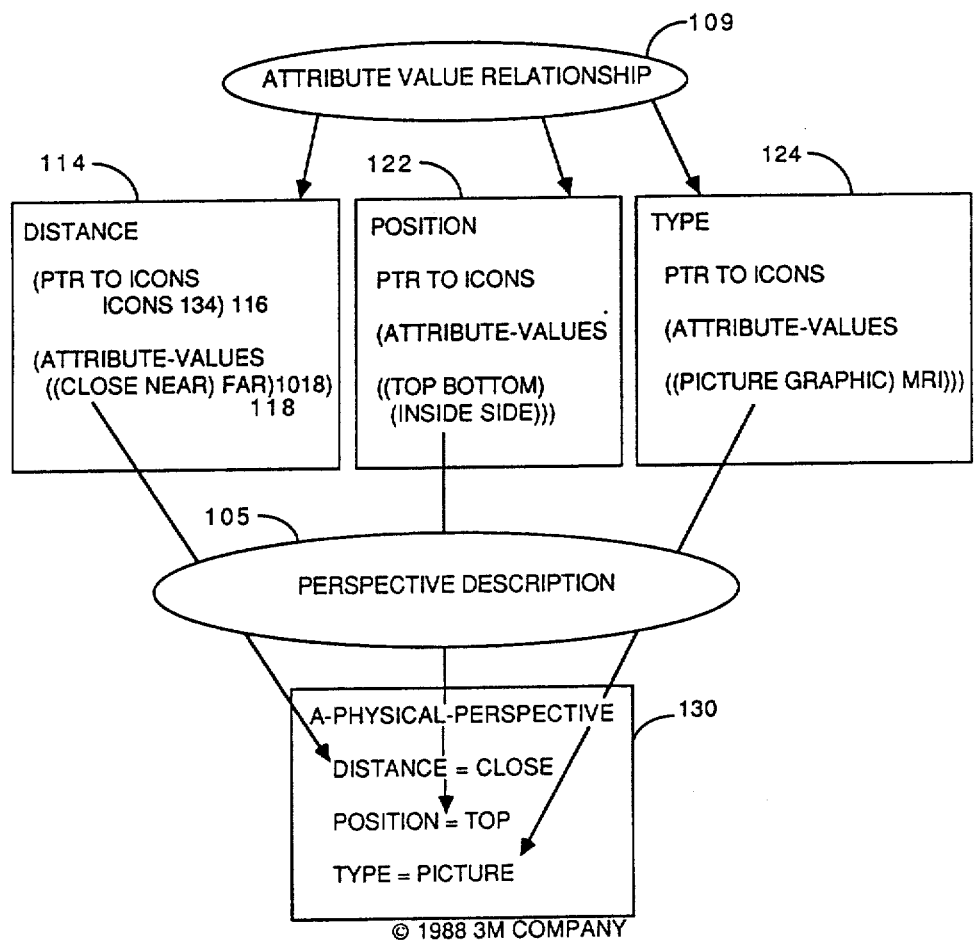
FIG. 41 illustrates perspective-concept data structures.
Figure 42:
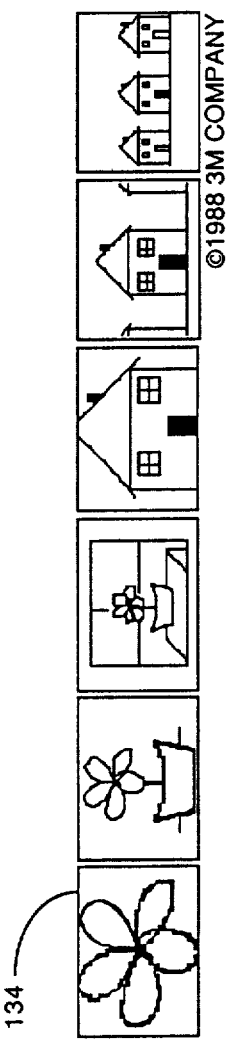
FIG. 42 illustrates preferred Focus system user interface icons.

As indicated in FIGS. 41 and 42, a perspective-type such as distance 114 also may have a pointer to a set of icons 134 (stored in slot 116) corresponding to its allowable attribute-values. Such icons 134 are preferably images which appear on a user interface screen and which correspond to values or operations. For example, perspective-type distance 114 may be considered an attribute 1017 which has an attribute-values slot 118, allowable attribute-values 1018 'close', 'near', and 'far' and a ptr to icons slot 116 which points to a set of icons 134 in FIG. 42, with each icon in icon set 134 preferably corresponding to an allowable attribute value 1018. Icons may be used during concept display to allow a user easy access to information 184 about current attribute-values 118 and additional available attribute values. This allows the user 1014 to see where he/she is in the space of available perspectives and to see options for movement.

In the present system as implemented, perspective description process 105 (see FIG. 41) allows a particular instance of a perspective to be defined as a conjunction of attribute-values 1018 where there is one attribute value for each attribute 1017 or perspective-type 112 in a corresponding perspective category 102. For example, a perspective instance such as 'a-physical-perspective' 130 may have a name 'close-top-picture' since it has the attribute-value 'close' for the perspective-type distance 114, the attribute-value 'top' for the perspective-type position 122, and the attribute-value 'picture' for the perspective-type type 124.

A typical Focus system structure such as that in FIG. 40 includes information about relationships among perspective-types such as distance 114, position 122 and type 124, and among their attribute-values 1018. In the preferred embodiment, relationships among perspective-types 112 and among attribute-values 1018 may be determined in part by a corresponding perspective category 102. For example, physical perspectives 104 may be described as a conjunction of attribute physical relationships among perspective-types 112 (such as distance 114 and position 122) and attribute-value physical relationships for these perspective-types using perspective physical relationship process 111 while functional perspectives 110 may be described as a conjunction of attribute functional relationships among perspective-types 112 (such as use-in-construction 126 and use-in-repair 128) and attribute-value functional relationships for these perspective-types using perspective functional relationship process 115.

Figure 43:
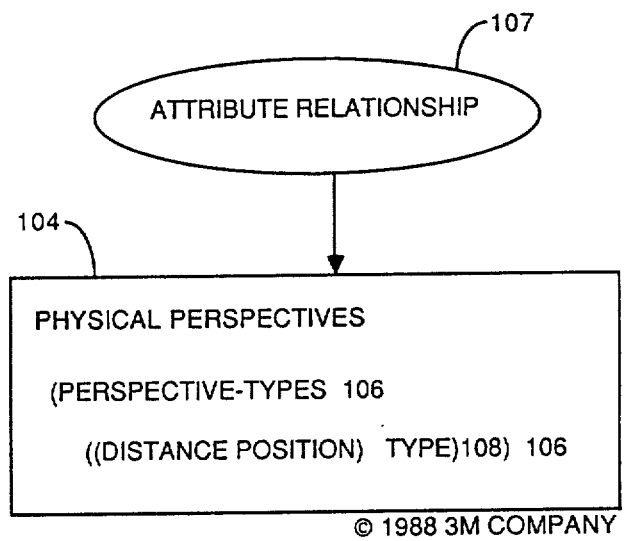
FIG. 43 illustrates attribute relationship processes and data structures.

FIG. 43 illustrates one way of describing relationships among attributes or perspective-types 112 using attribute relationship process 107. As mentioned above, in the current embodiment, there is a one-to-one relationship between attributes 1017 and perspective-types 112. For example, 'distance' may be both a perspective-type 112 and an attribute 1017. This need not be the case in general. For example, it would be possible to define a perspective-type 'view' which includes attributes 'distance' and 'position'. However, in the present example shown in FIG. 43, perspective-types 112 and attributes 1017 may be considered to be equivalent. Accordingly, in the current example, physical perspectives 104 has a perspective-types slot 106 with a slot value 108 of ((distance position) type). One way of interpreting slot value 108 is that perspective-types 'distance', 'type', and 'position' are physically related to each other and that 'distance' and 'position' are more similar to each other than they are to 'type'.

Figure 44:
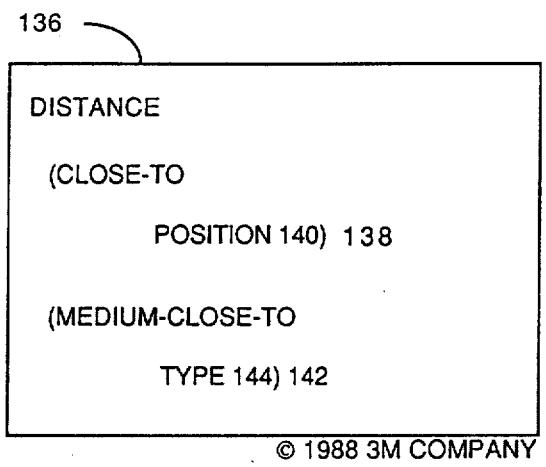
FIG. 44 illustrates attribute-value data structures.

One can represent relationships among attribute-values 1018 in a similar fashion using attribute value relationship process 109 (see FIG. 41). For example, perspective-type distance 114 may have an attribute-value slot 118 with a slot value 1018 of ((close near) far). One interpretation of slot value 1018 is that attribute-values 'close', 'near', and 'far' are physically related to each other and that 'close' and 'near' are more similar to each other than they are to 'far'. An alternative representation of relationships among perspective-types 112 is illustrated in FIG. 44. In this example, a perspective-type distance 136 has a close-to slot 138 with a slot value 140 of 'position' indicating that perspective-type 'distance' is similar to perspective-type position, while a medium-close-to slot 142 has a slot value 144 of 'type' indicating that perspective-type 'distance' is moderately similar to perspective-type 'type'.

Figure 45:
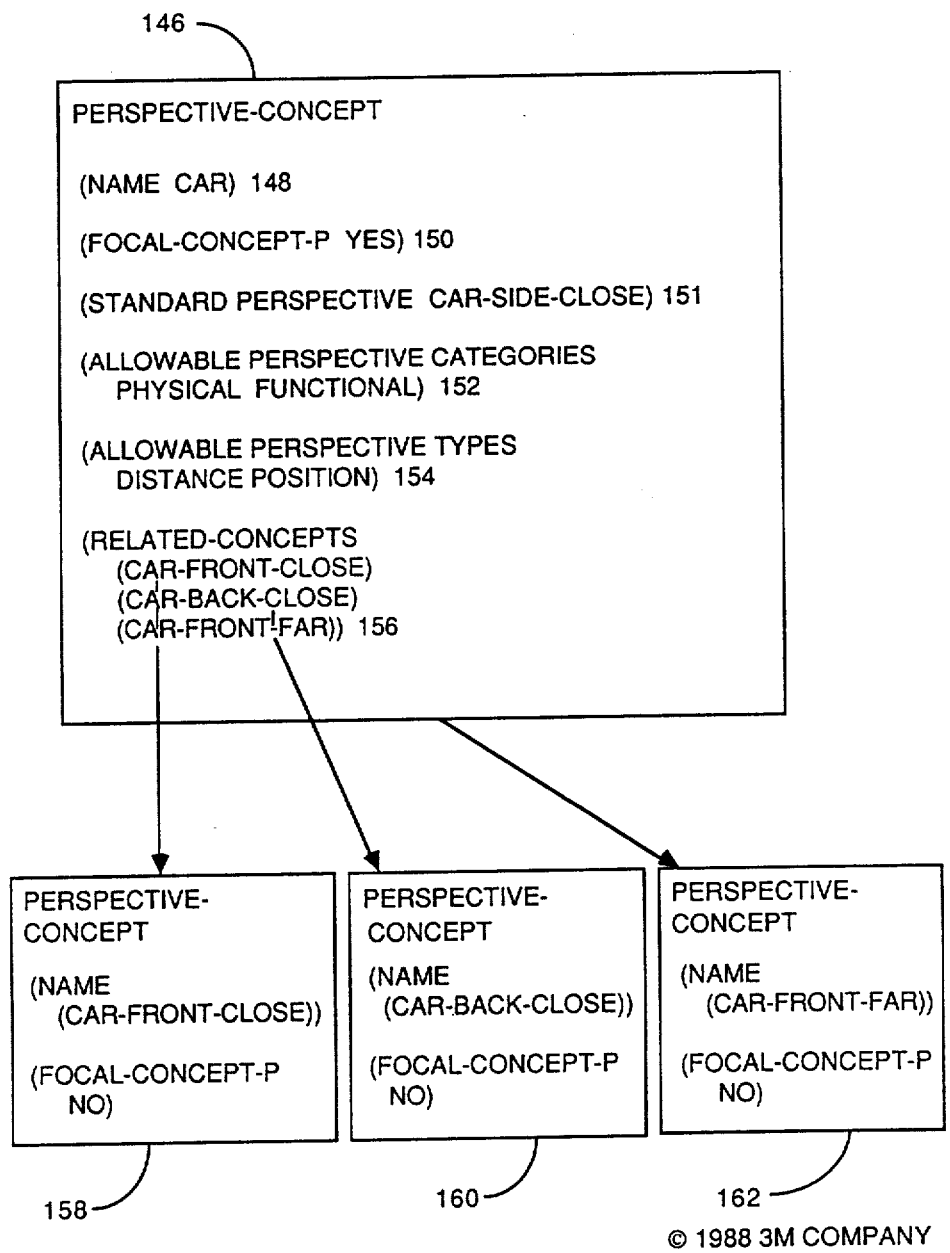
FIG. 45 illustrates perspective-concept data structures in detail.

In the preferred embodiment of the Focus system, all concepts 1016 are perspective-concepts such as perspective-concepts 146, 158, 160, and 162 in FIG. 45. In the current embodiment, some perspective-concepts such as 146 are focal concepts, that is, concepts 1016 which define a general category of real world objects which have a number of perspectives and are of interest in a particular situation; others are related concepts such as 158, 160, and 162 and represent different perspectives of a focal concept. In the preferred embodiment, the Focus system typically has knowledge about which perspective-concepts 146, 158, 160, 162 have the potential of being selected as focal concepts 146. For example, a focal concept may be 'car' or 'heart'. There are at least two ways of representing focal concept information. One way is illustrated in FIG. 45. If there are many potential focal concepts, it may be preferable to have a focal-concept-p slot 150 in a perspective-concept 146 which indicates whether the perspective-concept has the potential to be a focal concept. Alternatively, there may be a global variable which holds pointers to potential focal concepts. This alternative may be preferable when the percentage of perspective-concepts which may be focal concepts is low.

Typically, a focal concept 146 has knowledge about its related concepts 158, 160, 162. If the number of related concepts is small, it may be preferable to store pointers to the related concepts in a slot in the focal concept, such as related-concepts slot 156, because access then will be rapid. If the number of related concepts is large, it may be better to represent related concepts as sub-classes of the focal concept, particularly if there are frequent updates to the system.

A focal concept 146 may also contain information 184 about perspective categories 102 and perspective-types 104, 110 which are appropriate for the focal concept. This information may be represented as slots such as allowable perspective categories slot 152 and allowable perspective types slot 154 in FIG. 45.

Focus Process Description

Figure 46:
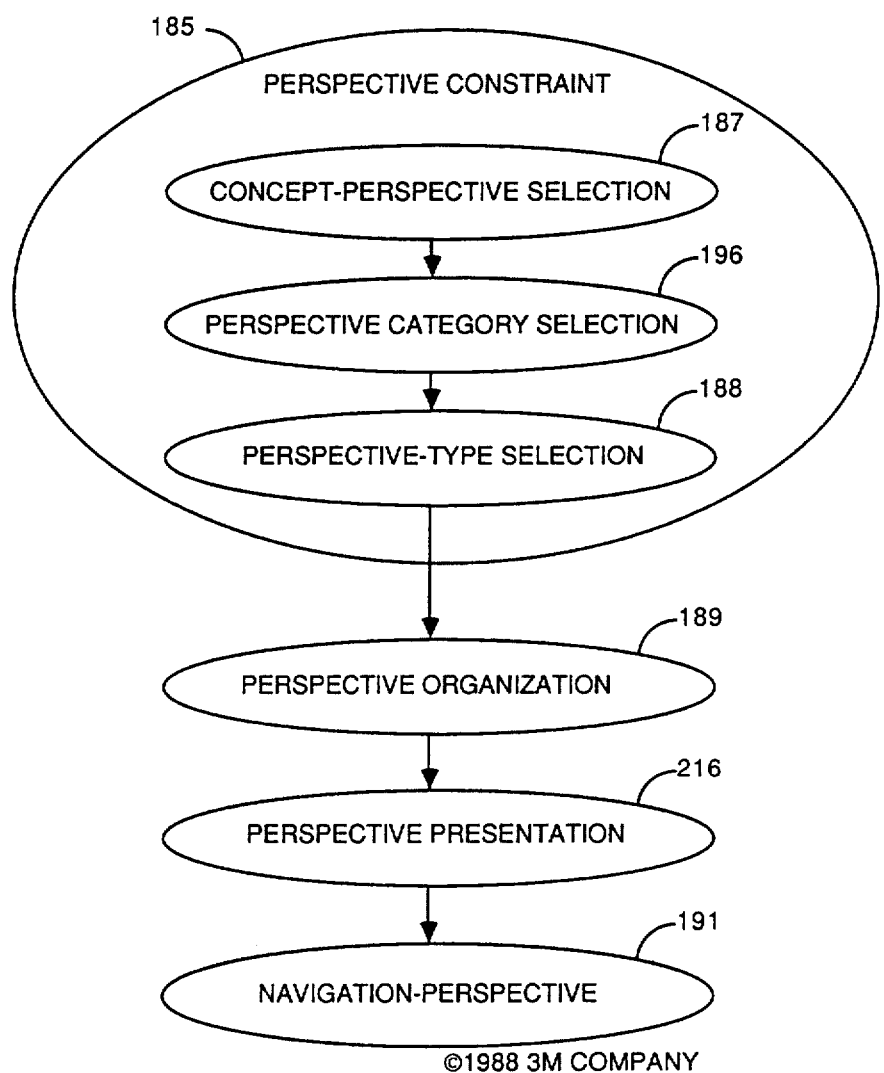
FIG. 46 illustrates general processes for the preferred Focus system.

The preferred Focus system follows the same general processes described above for the ION system and illustrated in FIG. 2 (concept constraint process 168, category organization process 172, concept display process 174 and navigation process 176). However, in the preferred Focus system, these processes are specialized for organizing concepts according to perspectives. These specialized processes include perspective constraint process 185, perspective organization process 189, perspective presentation process 216 and navigation-perspective process 191 (see FIG. 46). In the current embodiment, a focal concept 146 is selected and perspective-concepts related to the focal concept are accessed during perspective constraint process 185, concepts 1016 related to the focal concept are organized during perspective organization process 189, a perspective of the focal concept is displayed during perspective presentation process 216, and the user 1014 is given the option to navigate through related perspectives during navigation-perspective process 191. For example, a focal concept might be that of a copying machine. A view from the front might be displayed initially with a menu which allows the user to change the position or distance from the machine. These system components will be described below.

Perspective Constraint Process 185

In the preferred embodiment, the purpose of perspective constraint process 185 is to generate a perspective list of perspective concepts 202 for display. Preferred process 185 is sub-divided into concept-perspective selection process 187 which is used to generate a perspective list of perspective-concepts which represents different perspectives of a focal concept, perspective category selection process 196 which is used to select a perspective category, and perspective-type selection process 188 which is used to generate a list of perspective-types by selecting one or more perspective-types from the perspective category.

Figure 47:
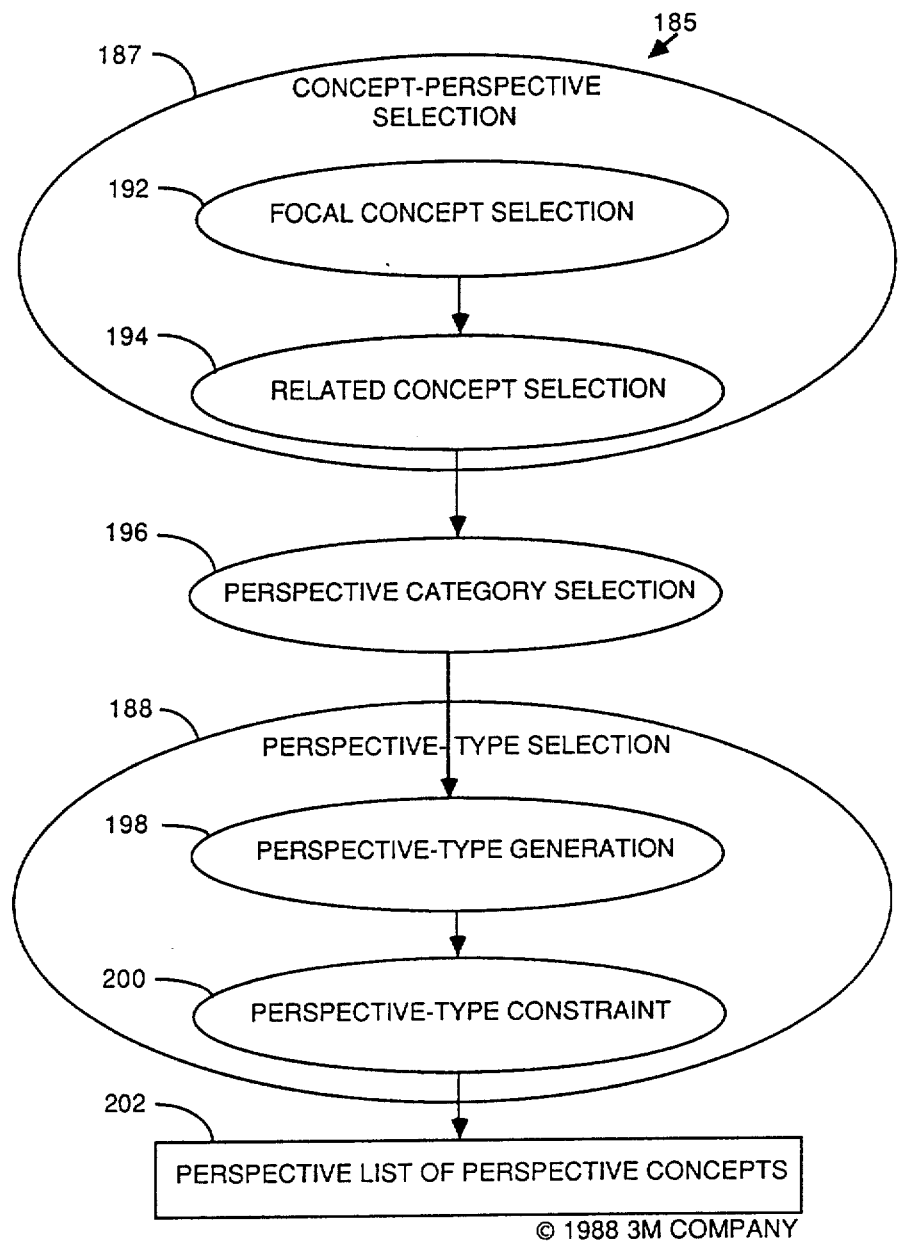
FIG. 47 illustrates perspective constraint processes.

Basic perspective constraint process 185 for the current embodiment is illustrated in FIG. 47. Within preferred concept-perspective selection process 187, a focal concept is selected (process 192) and a list of related concepts which are related to the focal concept is generated (process 194). In preferred perspective category selection process 196, a perspective category is selected. In preferred perspective-type selection process 188, a list of allowable perspective-types which map onto the focal concept is generated for the perspective category by selecting one or more perspective-types from the perspective category (process 198), the perspective-types are constrained by either the Focus system or the user (process 200) and concepts 1016 which are not related to the remaining perspective-types are removed from the list of related concepts to create the perspective list of perspective concepts 202. In the current embodiment, the output of perspective constraint process 185 is a perspective list of perspective concepts 202.

Focal Concept Selection Process 192

In the current embodiment, the purpose of focal concept selection process 192 is to select a real world object which has a number of perspectives and is of interest to the user. In the current embodiment, there are three methods of focal concept selection. First, the user could request a Focus system session on a real world object directly. For example, when the user completes an activity, a menu may be provided which indicates all available activities. This menu may include one or more calls to the Focus system as options, such as 'explore the aorta'. The Focus system may generate the list of focal concept options by either accessing a global variable containing pointers to potential focal concepts or by searching through perspective concepts and selecting those which have a value of 'yes' in their focal-concept-p slot 150.

Second, a system itself may make a call to the Focus system. For example, if, in the middle of a tutorial session, the user misses a question about the parts of a car, the tutorial system can call the Focus system. There is preferably a set of rules which indicates when the Focus system can and should be called (see section on Presentation Mode Selection) and a list of potential focal concepts. When an error is encountered, the rules and list of potential focal concepts may be consulted to determine whether to make a call to the Focus system.

Third, a related system preferably provides access to the Focus system from other activities. If the user requests the Focus system, the requesting system preferably looks at the current activity and determines whether there is a real world object involved in the current activity which is in the list of potential focal concepts. If there is an object, it can be selected as the focal concept. If not, the user may select an object from the list of suitable objects, or the Focus system may select a default object.

Related Concept Selection Process 194

Typically, once a focal concept has been selected, the Focus system generates a list of related concepts which represent perspectives of the focal concept which could be made available to the user. If the focal concept has a related-concepts slot such as related-concept slot 156 in FIG. 45, it may be accessed to generate a list of related concepts. An alternative method of generating a list may be used if the focal concept has links to sub-classes of related concepts. In this case, the links may be followed to generate a list of related concepts. For example, a 'heart' focal concept may have 'heart-type' links to perspective concepts 'adult-heart', and 'child-heart', which, in turn, have 'views' links to perspective concepts 'adult-heart-front-view', 'adult-heart-side-view', and so on. Typically, the 'leaves' of the hierarchy would be collected and placed in the list of related concepts. In the example above, 'adult-heart-front-view' might be included in the list, but 'adult-heart' might not because it is not a leaf node.

Perspective Category Selection Process 196

In the current embodiment, the list of related concepts generated by related concept selection process 194 contains all perspective concepts which are related to a focal concept. It is possible that some of the perspective concepts may not be of interest or may not be appropriate in a particular context. In the preferred embodiment, perspective category selection process 196 begins the process of removing perspective concepts which are not desired. Typically, the first step is to restrict the perspective concepts to those belonging to a particular perspective category such as 104. If there is a user model 1080 of the user, the model can be checked to see whether there is a preference for a particular perspective category such as 104. If there is a preference, it can be used. If nothing is known about the user, the Focus system may check the focal concept to see if there is a default perspective category and use the default. It is possible that there is not a default perspective category but that there is a standard perspective for the focal concept. In this case, the standard perspective may be accessed. Because typically a perspective instance such as 130 comes from only one perspective category 104, it may be used to select the perspective category 104.

Perspective-Type Generation Process 198

The purpose of preferred perspective-type generation process 198 is to generate a list of allowable perspective-types which map onto the focal concept where allowable perspective-types are constrained by the perspective category 104. Typically, a perspective category 104 has a number of allowable perspective-types such as 114, 122, 124, not all of which are desired in a particular context. In the preferred embodiment, once a perspective category 104 has been selected, allowable perspective-types 112 are accessed via perspective-type generation process 198 and then constrained via perspective-type constraint process 200. As illustrated in FIGS. 40 and 43, a perspective category 102 such as physical perspectives 104 may have a perspective-types slot 106 which contains a list of allowable perspective-types for the perspective-category 108. In this case, the list may be accessed directly. Physical perspectives 104 may also have perspective-types links to its perspective-types 112 which may be followed to generate a list of perspective-types 112.

Perspective-Type Constraint Process 200

In the preferred embodiment, the purpose of perspective-type constraint process 200 is to generate a list of desired perspective-types by selecting one or more perspective-types from the list of allowable perspective-types. Typically, following perspective-type generation process 198, there is a list of perspective-types. Using perspective-type constraint process 200, there are several potential methods of determining whether it is desirable to remove items from the list. If there is a user model 1080, it may be consulted to determine whether there is a preference for certain perspective-types 112. If there is a preference, it may be used to constrain perspective-types 112. If there is no user model 1080, it would be possible to allow the user to select perspective-types 112 directly or to include all perspective-types 112 rather than constraining them. Once a constrained list of perspective-types has been obtained, it typically is compared with the list of related concepts generated by related concept selection process 194 to remove any perspective concepts which do not fit into the remaining perspective-types 112. In the preferred embodiment, the comparison typically is made in the following way:

```
[define CONSTRAIN-CONCEPTS 123
(* remove concepts 1016 which have no counterpart in the perspective-type attribute
list)
let attribute-list be the list of attributes 1017 corresponding to the perspective-types 112
in the constrained list of perspective-types 112
let perspective list of perspective concepts 202 be empty
for concept in the list of related concepts
let concept-attribite be the list of attributes for which the concept has attribute-
values 1018
If there is an attribute in concept-attribute which is also in attribute-list
add the concept to perspective list of perspective concepts 202]
```

In the preferred embodiment, a list of attributes 1017 corresponding to perspective-types 112 in the constrained list of perspective-types is constructed, a list of attributes which have attribute-values 1018 in a perspective concept is generated, and, if any of the concept attributes is in the list of attributes for perspective-types, the perspective concept is placed in a perspective list of perspective concepts 202.

Perspective Organization Process 189

Figure 48:
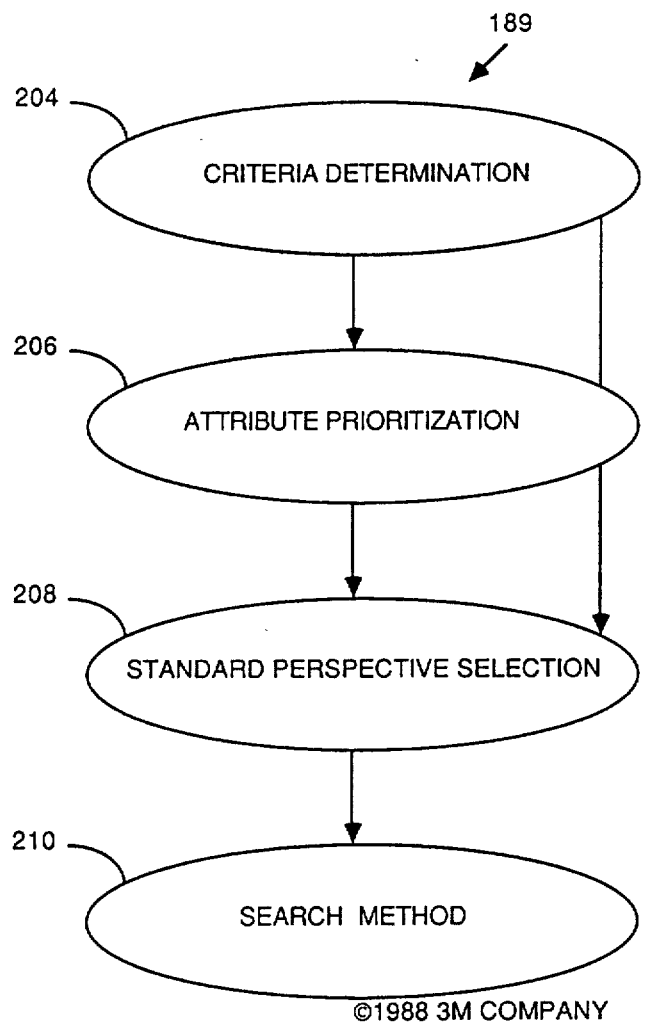
FIG. 48 illustrates perspective organization processes.

The general purpose of preferred perspective organization process 189 is to organize the perspective list of perspective-concepts according to the selected perspective-types (see FIG. 48). In the present system, prior to perspective organization, a perspective category 102 and a number of perspective-types 112 have been selected, and a perspective list of perspective concepts 202 has been generated. The specific purpose of perspective organization process 189 in the present system is to generate a list of attributes 1017 and attribute values 1018 using the perspective category 102 and perspective-types 112, organize the attributes and attribute values, and use the organization to select for display a perspective concept from the perspective list of perspective concepts 202. Typically, a list of allowable attributes 1017 and attribute values 1018 for the selected perspective-types is generated using the knowledge of mappings (criteria determination process 204), the knowledge of mappings is used to generate a prioritized list of attributes and attribute values from the list of allowable attributes and attribute values (attribute prioritization process 206), a standard perspective is selected for the selected perspective-types (standard perspective selection process 208) and a concept 1016 matching the standard perspective is retrieved using the prioritized list of attributes and attribute values (search method process 210).

Criteria Determination Process 204

In the current embodiment, the purpose of criteria determination process 204 is to generate a list of attributes 1017 and a list of attribute-values 1018 for use in selection of a perspective concept for display. Generally, the input to perspective organization process 189 is a list of perspective-types 112 which is output by perspective-type generation process 198. In the current embodiment, there is a one-to-one correspondence between perspective-types 112 and attributes 1017, so a list of allowable attributes may be generated directly from a list of perspective-types 112. As indicated in FIG. 40, a perspective-type such as distance 114 typically has a set of allowable attribute-values 1018 which can be accessed once the perspective-type 112 is known. Generally, this is the process used to generate a list of allowable attribute-values.

Attribute Prioritization Process 206

In this stage of the preferred process, the list of allowable attributes 1017 and attribute values 1018 generated by criteria determination process 204 is prioritized to help in the selection of a perspective concept. The prioritization can be pre-stored or generated dynamically. A pre-stored prioritization might be stored as a set of similarity relationships among attributes and among attribute values as described above in the 'General Description and Data Structures' section and illustrated in FIG. 40. It also would be possible to generate a prioritization dynamically. The user could be presented with a list of attributes 1017 and asked to place them into categories based on similarity. The same could be done for attribute values 1018. The individualized similarity rankings could be stored in an individual's user model 1080 and accessed whenever the user 1014 called the Focus system on the same focal concept.

Standard Perspective Selection Process 208

When the Focus system is called on a particular focal concept 146, it is necessary in the preferred system to select a perspective such as 130 for the initial display. There are several ways of doing this. A standard perspective 151 may be stored with a focal concept 146 and accessed directly. If a user model 1080 is available, the model can be checked to see if there is a preference for a perspective 130, and the preference can be used to determine the standard perspective 151. If the Focus system is called from a current activity, the system in control checks to see if there is a perspective 130 which matches the concept 1016 involved in the current activity. This process will be described further in presentation mode selection process 164.

Search Method 210

In the preferred embodiment, a standard perspective 151 is selected by standard perspective selection process 208. Typically, a standard perspective 151 is defined as a conjunction of attribute-values 1018, one for each applicable attribute 1017. Generally, once a standard perspective 151 has been selected, search method 210 searches the perspective list of perspective concepts 202 for a perspective concept which matches the standard perspective's attribute-values. In the Focus system as implemented, if there is a perspective concept 146 with all attribute-values 1018 matching, it is selected and attribute prioritization process 206 is skipped; if there is not a direct match, the prioritization described in attribute prioritization process 206 is used to gradually relax constraints until a match is found. There are at least two ways of relaxing constraints. The first way is more general and might be used when the percent of perspectives 130 which have matching perspective concepts 146 is high (that is, when the space of perspective concepts 146 is dense). With this method, a prioritization scheme such as that mentioned above can be combined with a method to generate a match. An example of a method is the following

```
[define FIND-MATCH 212
(* find a concept 1016 to match a perspective)
repeat until match is found
let hp-attribute be the highest priority unused attribute 1017 from standard
perspective 151
find the highest priority attribute value for hp-attribute
mark hp-attibute as used
let other attributes be the attributes from standard perspective 151, excluding hp-
attribute
select highest priority attribute value 1018 for each member of other-attributes
if conjunction of all attribute values does not match a concept in perspective list of
perspective concepts 202
gradually select lower priority attributes values for the other-attributes starting
with the lowest priority attribute
until a match is found or there are no unused attribute values left]
```

If the space of concepts 1016 is sparse for a particular focal concept 146, that is, if there are many potential perspectives 130 for which there are no matches, it might be preferable to search for a perspective 130 using an algorithm which has been specialized for the focal concept 146. For example, suppose that one wants to view the aorta from a number of vantage points, altering distance, position and type of view (picture, MRI, graphic). If there are 6 potential distances, 6 potential positions and 3 potential types of view, there would be 6×6×3, or 108 potential perspectives 130. It might be the case, however, that only 12 of those perspectives 130 are available in the Focus system. In this case, a general search through the perspective concepts 146 may be less efficient than an algorithm which moves more directly to the closest perspective concept 146. An example of such an algorithm appears below:

```
[define ALGORITHM-FIND-MATCH 214
(* find closest match using algorithmic approach)
if position value of standard picture equals inside
match is inside-graphic-near
(* there is only one concept 1016 which has a value of inside for position 122)
if type value of standard picture equals motion-sequence
match is back-motion-far
(* there is only one concept which has a value of motion for type 124)
if position value of standard picture equals front or top or bottom
hold position constant and find closest type
if no match can be found by varying type
hold position constant and vary type and distance 114 until closest match is found
(* position is a higher priority than type or distance, distance is higher than
type-so keep position constant and try to keep distance constant while type is
varying, if no match is found, vary both type and distance)]
```

If this second approach is desired, a searching algorithm can be stored with the focal concept 146 and accessed when needed.

Perspective Presentation Process 216

Figure 49:
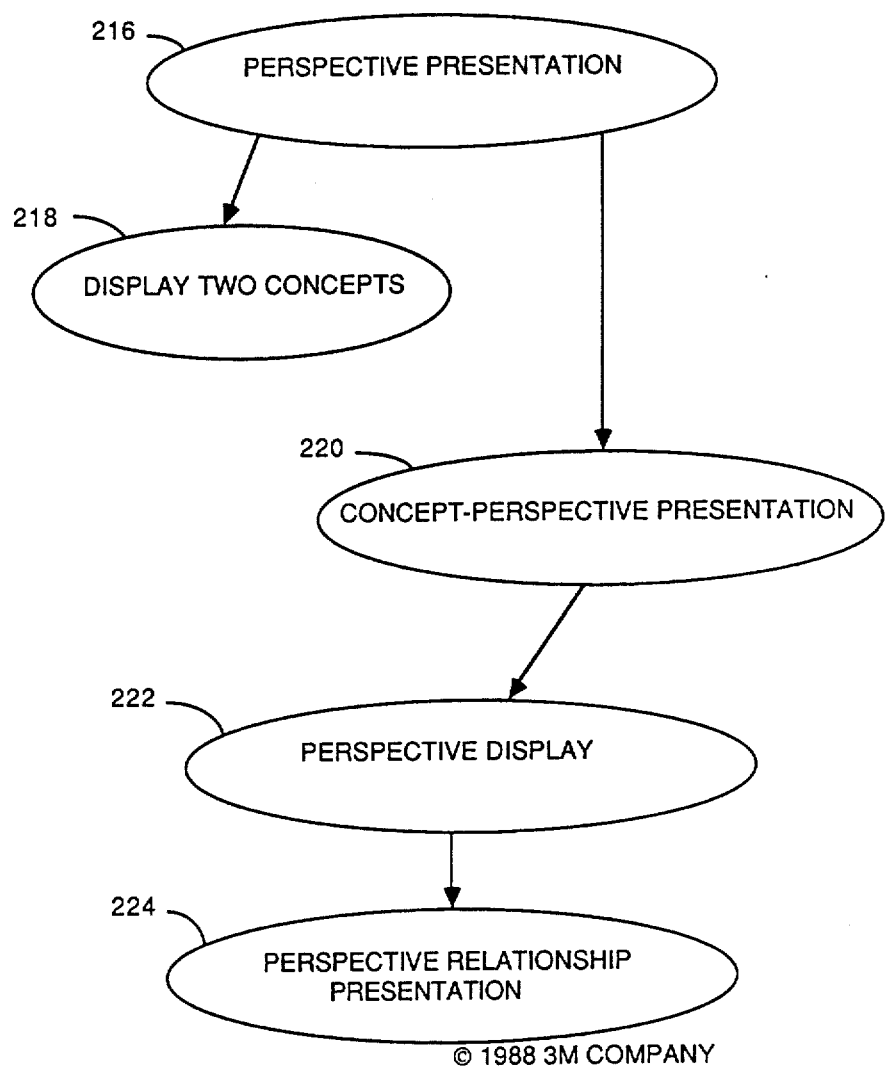
FIG. 49 illustrates perspective presentation processes.

In the preferred embodiment, the purpose of perspective presentation process 216 (see FIG. 46) is to display to a user one or more perspective concepts 146 and their perspectives 130 organized by perspective-type. A perspective concept 146 typically is displayed as a picture or a graphic drawing while a perspective 130 typically is displayed as a set of labels or icons representing a conjunction of attribute-values 1018 such as "close-top-picture". A process of perspective presentation 216 for the preferred embodiment is depicted in FIG. 49. In the current embodiment, perspective presentation process 216 can result in a display of two perspective concepts 146 simultaneously using display two concepts process 218, or one perspective concept 146 representing a perspective, its perspective 130 displayed as a conjunction of attribute values, and relationships between the selected perspective-types, using concept-perspective presentation process 220, perspective display process 222, and perspective relationship presentation process 224 respectively.

Figure 50:
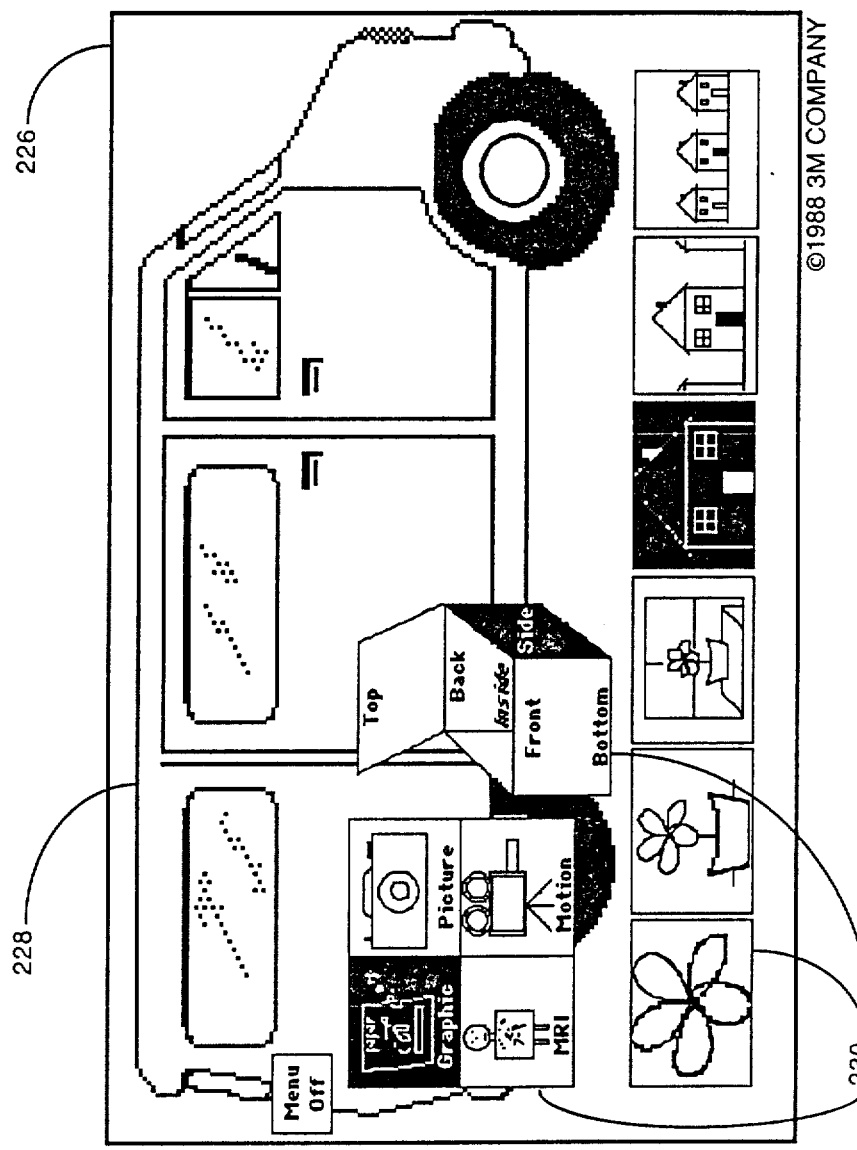
FIG. 50 illustrates a preferred Focus system user interface for physical perspectives.

FIG. 50 illustrates a display of a single perspective 130. Typically, in the display of a single perspective 130, a user can see the perspective concept 228 itself, the perspective 230 (conjunction of attribute-values 1018) of the perspective concept 228, and the relationship of the current attribute-values 1018 to the other attribute-values 1018 available for the perspective category 102 and perspective-types 112. There are several methods which could be used to display the perspective 130 and perspective relationships. In the current embodiment, a mixture of icons and text is used to present a menu for each perspective-type 112 and its attribute-values 1018, and the values representing the perspective 130 on display are highlighted (see FIG. 50). In this example, the perspective-types 112 are position, distance and representation type. Alternatively, one could display the perspective 130 by only providing labels for the attribute-values 1018 of the perspective 130 itself or by providing menus of all attribute-values 1018 consisting of text only, with text for the perspective's 130 attribute-values 1018 highlighted.

Figure 51:
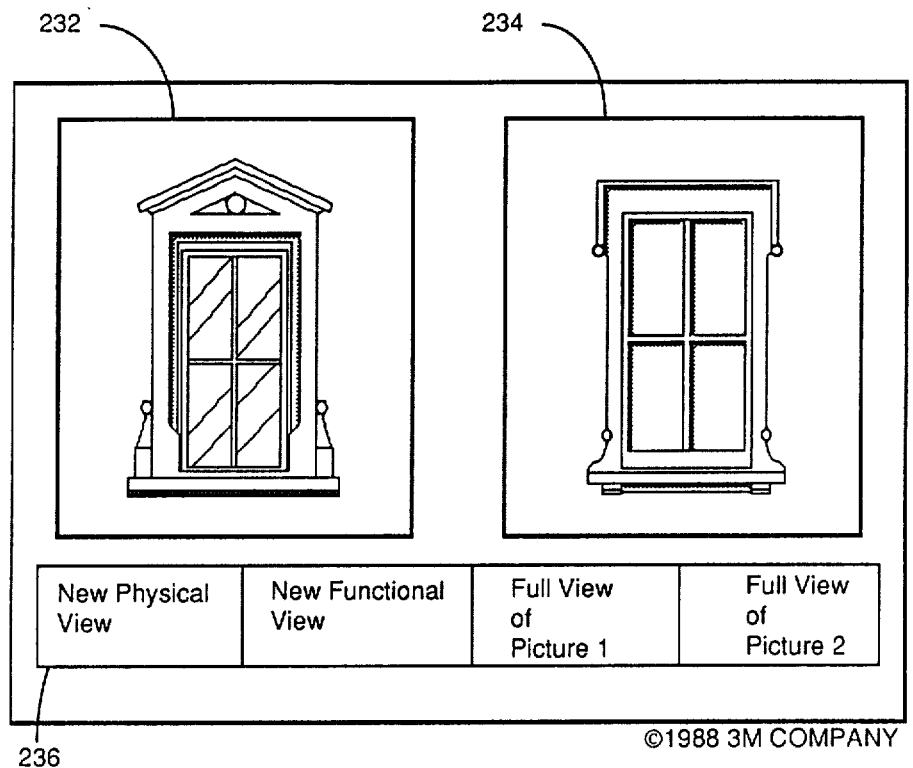
FIG. 51 illustrates a preferred Focus system user interface for the preferred display-two-concepts process.

In the present system, there is a second display option for situations in which a user wishes to view more than one perspective-concept 146 simultaneously. An example of this option is in FIG. 51. In this situation, only the perspective-concepts 232, 234 are displayed. However, a user may access further information 184 about any perspective-concept such as 232 or 234, including its perspective 130, by requesting the information on an available menu 236.

Navigation-Perspective Process 191

Figure 52:
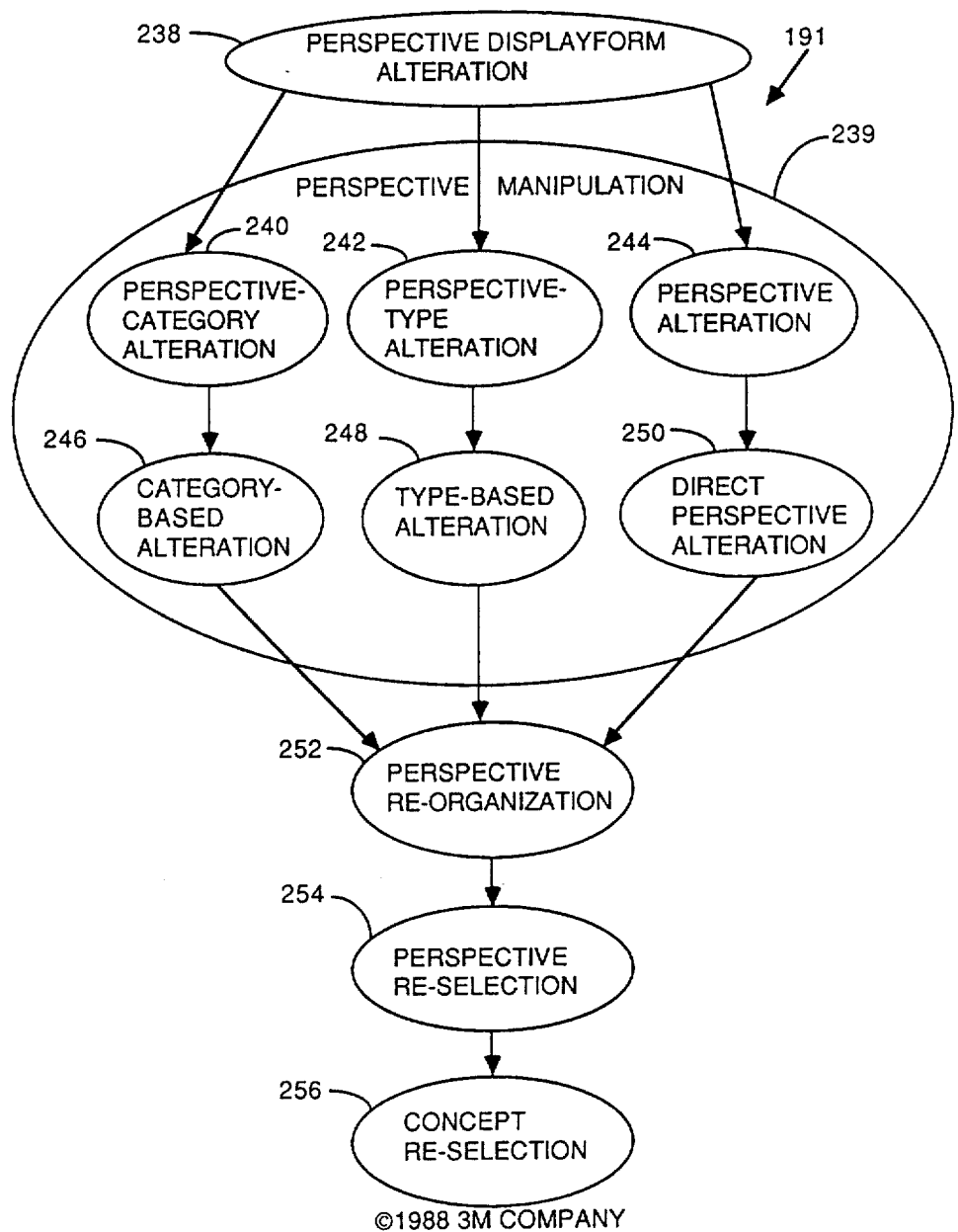
FIG. 52 illustrates navigation-perspective processes.

As a result of perspective presentation process 216, a user 1014 typically is able to view one or two perspective concepts 146. In the preferred embodiment, the purpose of navigation-perspective process 191 is to allow a user to select and view additional perspective concepts 146 by presenting the user with a technique of navigating through the perspectives. Preferred navigation-perspective process 191 is illustrated in FIG. 52. One method of navigation is provided by preferred perspective displayform alteration process 238 which allows navigation by changing displayform 1082 by, for example, allowing the user to determine whether one or more concepts will be displayed simultaneously.

There are three additional methods of navigation which constitute preferred perspective manipulation process 239; these include perspective-category alteration process 240 which allows the user or the system to change the perspective-category 102, perspective-type alteration process 242 which allows the user or the system to generate a new list of perspective-types 112, and perspective alteration process 244 which allows navigation by changing perspective 130. In the preferred embodiment, perspective manipulation process 239 also includes category-based alteration process 246 which allows selection of a new perspective to match a change in perspective-category within a particular context, type-based alteration process 248 which allows selection of a new perspective to match a change in perspective-type within a particular context, and direct perspective alteration process 250 which allows the user or the system to select a new perspective by selecting a new attribute value. These processes will be described further below.

Perspective Category Alteration Process 240

In the current embodiment, a Focus system display includes a menu allowing a user to change perspective categories 102. In this implementation, if a new perspective category 102 is selected, the preferred Focus system keeps the same focal concept 146 and related concept list but uses processes equivalent to the remainder of perspective constraint process 185 described above (type-based alteration process 248) to generate a new list of perspective-types for the new perspective category 102. A new perspective 130 and a new perspective-concept 146 then can be selected using processes equivalent to the perspective organization process 189 described above (perspective re-organization process 252 which allows dynamic re-organization of the perspective list of perspective-concepts following a change in the perspective-category, perspective-types or perspective, perspective re-selection process 254 which allows selection of a new perspective to match the dynamically re-organized perspective list, and concept re-selection process 256 which allows selection of a concept to match the new perspective). Typically, the perspective concept 146 then is displayed using the perspective presentation process 216.

Perspective-Type Alteration Process 242

In the current embodiment, a Focus system display typically includes a menu allowing a user 1014 to change perspective-types 112. If a user 1014 asks to change perspective-types 112, a menu of available perspective-types for the current perspective category 102 generally is presented. Typically, after new perspective-types 112 have been selected using type-based alteration process 248, processes equivalent to those described above are used to generate a new prioritized list of attributes 1017 and attribute-values 1018 (perspective re-organization process 252), select a standard perspective (perspective re-selection process 254), search for a new perspective concept (concept re-selection process 256) and display the perspective concept using perspective presentation process 216.

Perspective Alteration Process 244

As seen in FIG. 50, in the preferred embodiment, a typical Focus system display includes a menu of available attributes 1017 and attribute-values 1018 for a perspective category 102. Generally, a user 1014 can change the perspective 130 by selecting a new attribute-value 1018 for any attribute 1017. In the present Focus system, if a new perspective 130 is selected using direct perspective alteration process 250, the Focus system searches for a new perspective concept 146 using a process equivalent to search method process 210 (concept re-selection process 256) and displays the perspective concept 146 using perspective presentation process 216.

Perspective Displayform Alteration Process 238

In the current embodiment, a Focus system display typically includes a menu selection to allow a user to change displayform 1082. One type of displayform 1082 might be a form in which one perspective concept 146 is viewed at a time. Another displayform 1082 might be a form in which more than one perspective concept 146 can be viewed at one time. If a current displayform 1082 is that for display of a single perspective concept, a user 1014 preferably can choose to view more than one perspective concept 146 simultaneously. In the preferred system, if this option is selected, a pointer to the current perspective concept is stored in a global variable temporarily and considered to be item one.

Typically, a user then is given standard menus such as those depicted in FIG. 50 to change perspective category 102, perspective-type 112 and perspective 130. Generally, a user 1014 has the option to change perspectives using the menus as often as desired. When a second perspective concept 146 has been displayed which is of interest, a user 1014 of the preferred system can indicate that the second perspective concept 146 is of interest, and a pointer to it is stored dynamically in a global variable. The process can continue until all perspectives 130 have been selected. Generally, the appropriate perspective concepts then will be displayed simultaneously using display two concepts process 218.

If a multiple display is current, a user preferably can choose to view any item on the multiple display using the single display format by simply selecting the item and invoking perspective presentation process 216.

General Description and Data Structures for Dynamic Image Scanner

Figure 53:
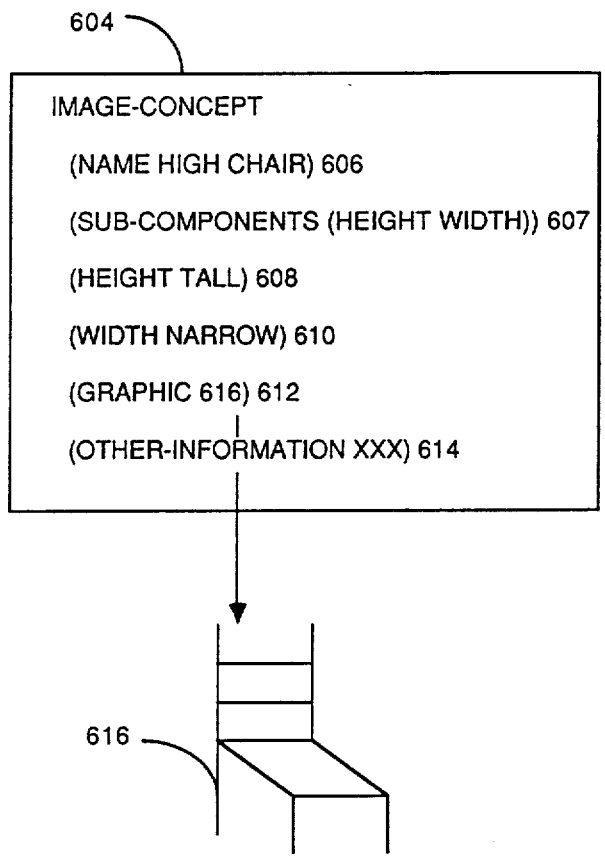
FIG. 53 illustrates an image-concept data structure.

The preferred Dynamic Image Scanner system allows a user to navigate through a plurality of image-concepts 604 (see FIG. 53) by manipulating graphical representations 616 of image-concepts 604. The present Dynamic Image Scanner system is dynamic, i.e., contemporaneously with the user's browsing through information, the user may manipulate graphical representations of information, and the system uses these graphical changes to restructure information within the system and to present the restructured data to the user for viewing. For example, a user who is interested in "chairs" might be presented with a graphical representation 616 of a "standard chair". The user might manipulate the image graphically to indicate a chair of a greater width. The preferred Dynamic Image Scanner system might interpret the manipulation and use it to access information 184 about a chair which matches the new graphical representation 616; perhaps the new chair might be a love seat. In the preferred embodiment, the Dynamic Image Scanner system interprets changes in graphical representations 616 and uses the interpretation to access information 184 about an image-concept 604 which matches the new graphical representation 616.

The preferred data structure for image-concepts 604 (see FIG. 53) includes information 184 about the name 606, sub-components 607 which represent portions of the graphical representation 616 which may be manipulated by a user 1014 (in the "chair" example, sub-components 607 might include "height" and "width"), values 608, 610 for sub-components 607, a pointer 612 to a graphical representation 616 of the image-concept 604, and other-information 614 which may be available about the image-concept 604. For example, other-information 614 might include information about price, location of a picture of the item, and typical use for the item.

Figure 54:
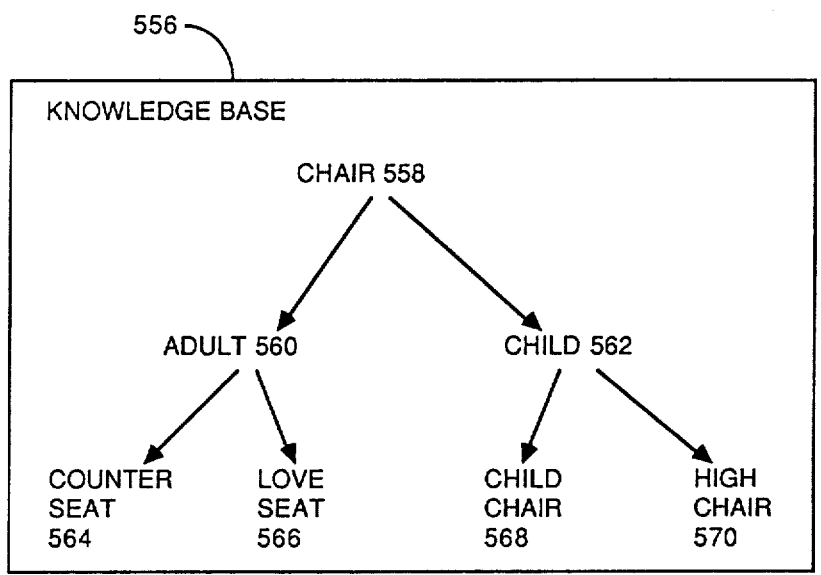
FIG. 54 illustrates a preferred Dynamic Image Scanner system knowledge base.
Figure 55:
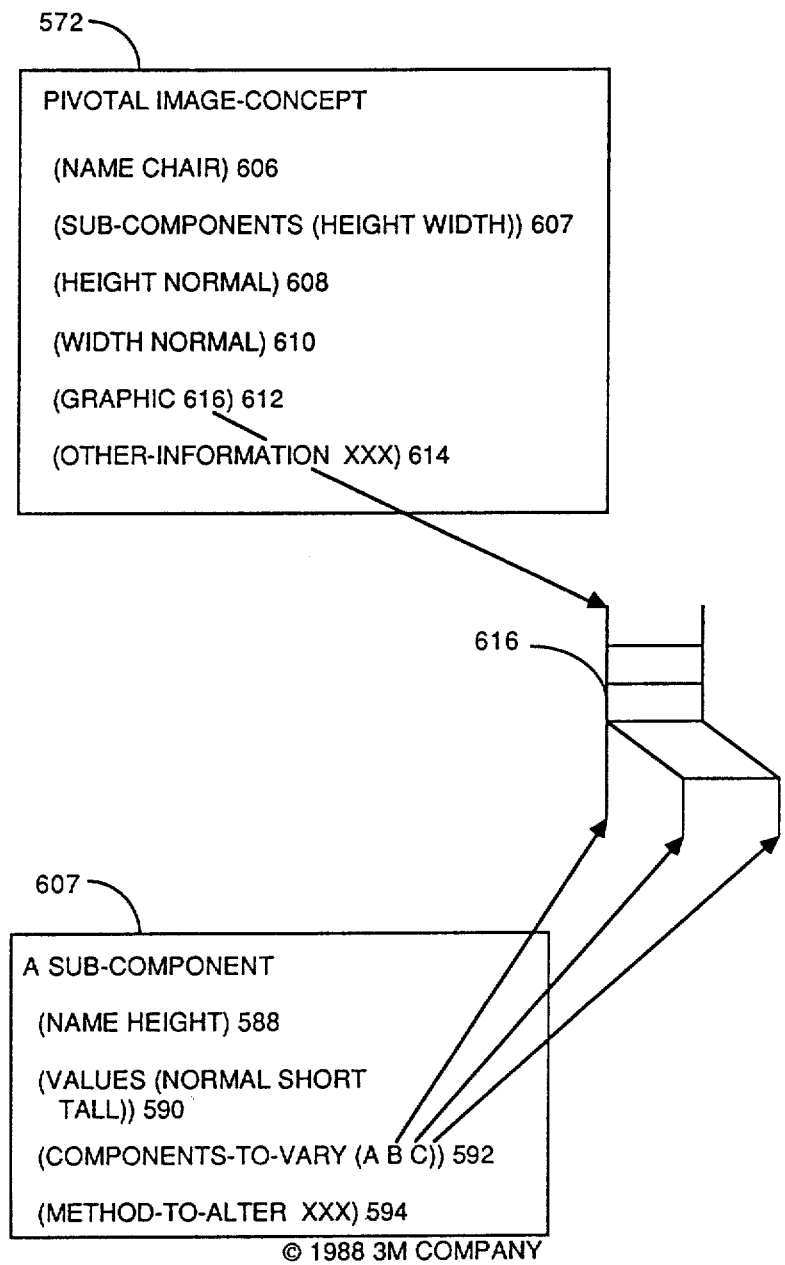
FIG. 55 illustrates pivotal image-concept data structures.

Image-concepts 604 in the current embodiment typically are organized into a knowledge base 556 as illustrated in FIG. 54. The top of the hierarchy 558 typically includes an image-concept 604 which depicts a general topic such as "chairs", and the leaves such as 564 and 566 are particular image-concepts 604 which fall under the general topic. At any particular point in time, in the preferred embodiment one image-concept 604 is selected to be a pivotal image-concept 572 (see FIG. 55). Preferably, there are several pieces of information 184 available about a pivotal image-concept 572. For example, sub-components 607 of the preferred embodiment include information about potential values 590, components of a graphical representation 616 which may vary (components-to-vary 592), and methods which may be used to alter a component graphically (method-to-alter 594).

Figure 56:
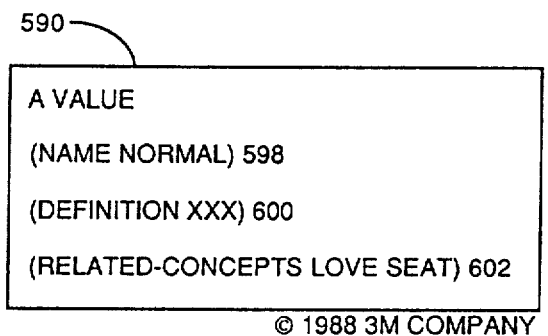
FIG. 56 illustrates a pivotal-concept value data structure.
Figure 57:
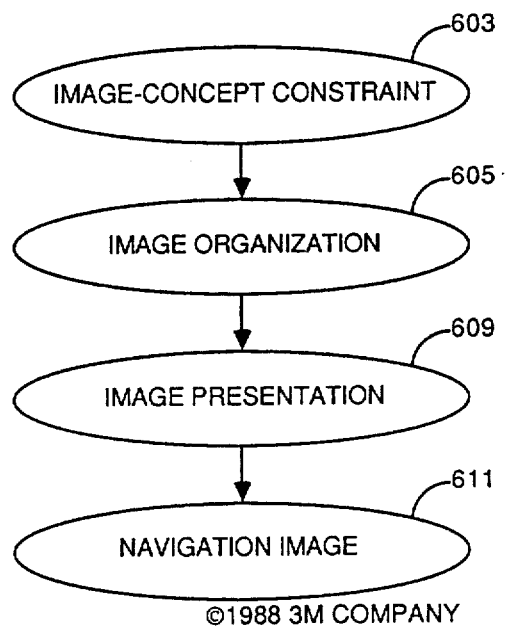
FIG. 57 illustrates general processes for the preferred Dynamic Image Scanner system.

In the preferred Dynamic Image Scanner system, individual values 590 for a sub-component 607 include information on the value's definition 600 and related-concepts 602 (see FIG. 56). In the preferred embodiment, definition 600 is used to provide an indication of a range of values or items which may be included in a category for a value 590. For example, "normal height" might include heights ranging from 2 to 4 mm on a display screen, although any type of definition 600 can be included (it need not be numeric). Related-concepts 602 is optional in the preferred embodiment; if desired, it includes pointers to image-concepts 604 which fall within a definition 600 for a value 590. For example, "tall height" might include related concepts "high chair" and "counter seat". Since the data structure for image-concepts 604 in the preferred embodiment includes values 608, 610 for sub-components 607 (see FIG. 53), this information need not be stored separately in a values 590 data structure; however, one may choose to do so to increase speed of response of the system during run time.

Dynamic Image Scanner Process Description

In the preferred embodiment, a major task involves generating and storing graphical representations 616 of image-concepts 604. Once this task is complete, the preferred Dynamic Image Scanner system follows the same general processes described above for the ION system and illustrated in FIG. 2 (concept constraint process 168, category organization process 172, concept display process 174 and navigation process 176). However, in the preferred Dynamic Image Scanner system, these processes are specialized for organizing concepts according to graphical representations. In the preferred embodiment, these processes include image-concept constraint process 603 which is used to generate an image-presentation list of image-concepts 640 which may be presented, and to select a pivotal image-concept 572, image organization process 605 which is used to generate an organization among the image-concepts 604 based on relationships among the image-concepts' 604 graphical representations, image presentation process 609 during which a pivotal image-concept 604 and its graphic representation 616 are displayed to a user, and navigation image process 611 which is used to present the user with a technique of navigating through the image-concepts 604 by allowing a user to manipulate a graphical representation 616 in order to access a new image-concept 604.

Initial Preparation of Pivotal Image-Concepts 572

Figure 58:
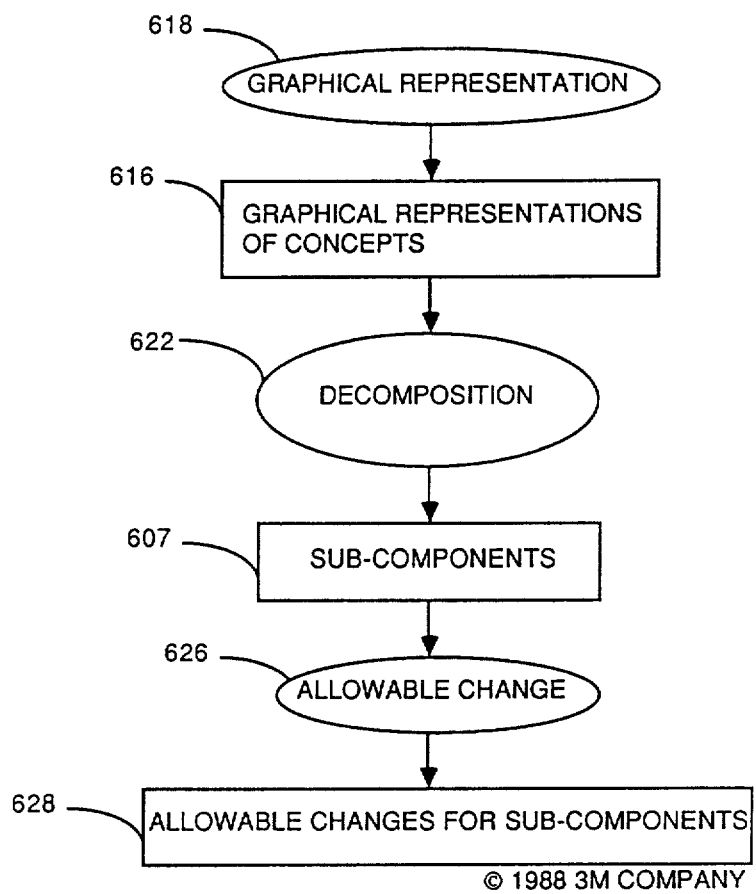
FIG. 58 illustrates processes for generation and storage of graphical representations.

As previously indicated, the preferred system has been implemented so that a pivotal image-concept 572 is stored with information on its sub-components 607, sub-components 607 include information on values 590, components-to-vary 592, and method-to-alter 594, and values 590 include information on definition 600. In the preferred embodiment, this information must be input to the Dynamic Image Scanner system by a system developer. FIG. 58 illustrates the process involved.

In the preferred first step (graphical representation process 618), graphical representations 616 for image-concepts 604 are generated and stored using any standard graphical interface. Preferably, the second step is decomposition of a graphical representation 616 into a series of sub-components 607 which may be manipulated by a user (decomposition process 622). Typically, this step requires knowledge of image-concepts 604 and the parts of an image-concept 604 which are both important conceptually and easy to manipulate. Typically, the particular graphic interface used will dictate the nature of the interaction between a system developer and the system as a system developer labels sub-components 607 on a graphical representation 616. The preferred last step is allowable change process 626 which is used to generate a list of allowable changes for sub-components 628 comprising changes which the user may make to the sub-component in a particular context. Preferably, this includes information about the nature of a manipulation which may be made by a user (which is stored in components-to-vary 592) and a method to allow a user to make such a change (which preferably is stored in method-to-alter 594). Any standard graphical manipulation technique may be utilized in allowable changes process 626.

Image Concept Constraint Process 603

Figure 59:
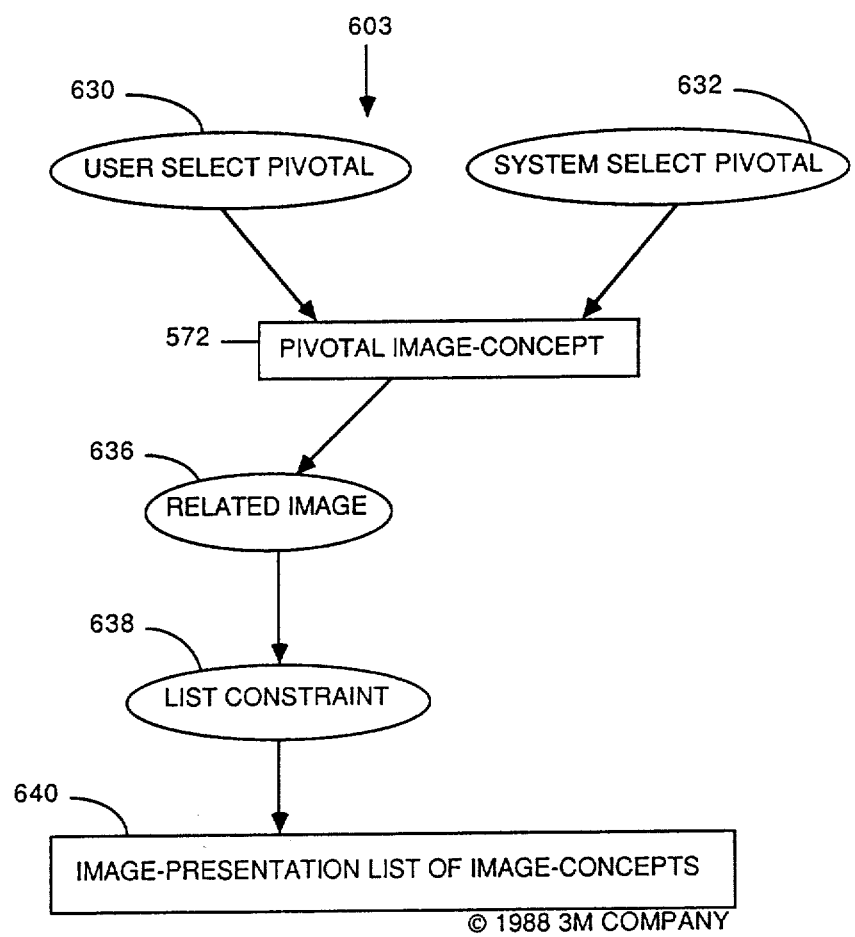
FIG. 59 illustrates image-concept constraint processes.

FIG. 59 illustrates preferred image constraint process 603. The preferable first step is selection of a pivotal image concept 572 by either a user (user select pivotal process 630) or the system (system select pivotal process 632) in which the system uses the knowledge of mappings and a particular context to make a selection. In the preferred Dynamic Image Scanner system, a pivotal image-concept 604 corresponds to a real world object which may be represented graphically. Preferably a user can request a Dynamic Image Scanner system session on a real world object directly. For example, when the user completes an activity, a menu may be provided which indicates all available activities. This menu may include one or more calls to the Dynamic Image Scanner system as options. The Dynamic Image Scanner system may generate the list of options by selecting a head node in each Dynamic Image Scanner system knowledge base 556.

A system itself may make a call to the Dynamic Image Scanner system. For example, if, in the middle of a tutorial session, a user misses a question about the difference in the amount of curvature in the roofs of two cars, the tutorial system can call the Dynamic Image Scanner system on "cars" and ask the user to explore car differences graphically. There is preferably a set of rules which indicates when the Dynamic Image Scanner system can and should be called (see section on Presentation Mode Selection) and a list of potential pivotal image-concepts 572. The rules and list of potential pivotal image-concepts 572 typically may be consulted to determine whether to make a call to the Dynamic Image Scanner system.

After selection of a pivotal image-concept 572, the preferred next step is related image process 636, which generates a list of related concepts which bear a graphical relationship to the pivotal image concept 572. Typically, a pivotal image-concept 572 is the top of a knowledge base 556 (see FIG. 54), and a list may be generated by collecting the leaves of the tree such as 564, 566 and 568. If the pivotal image-concept 572 is a leaf of a tree in a knowledge base 556, the preferred related image process is to include all leaves except the leaf which is the pivotal image-concept 572.

In the preferred system, the next step is list constraint process 638, during which an image-presentation list is generated by removing image-concepts 604 that do not match a user model 1080 from candidates for the image-presentation list of image-concepts 640 (the list of related concepts). If there is no user model 1080, this step may be excluded. If a model does exist, it may be used to constrain the candidates. For example, if the Dynamic Image Scanner system is called from a tutorial in which a user 1014 was studying "Fords", it may be preferable to exclude image-concepts 604 which are not "Fords". Often, this may be done by examining a knowledge base 556. In the chair example, "adult chairs" may be eliminated by selecting only leaves emanating from child 562. In the preferred embodiment, an image-presentation list of image-concepts 640 is generated as a result of list constraint process 638.

Image Organization Process 605

Figure 60:
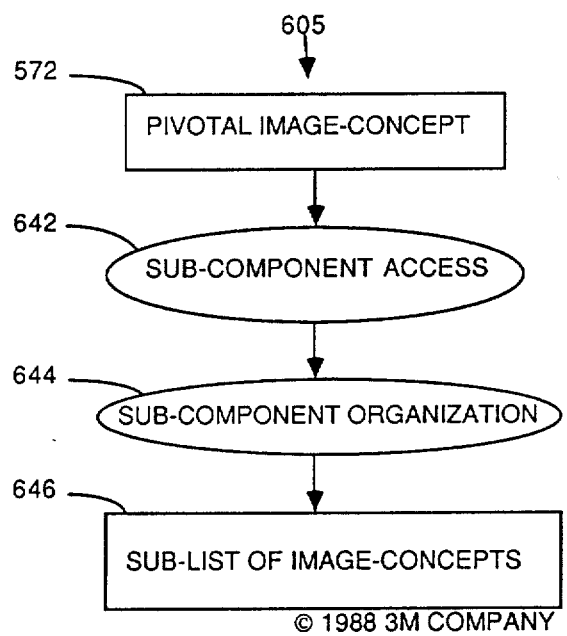
FIG. 60 illustrates image organization processes.

The purpose of preferred image organization process 605 is to organize the image-presentation list of image-concepts 640 based on relationships among the image concepts' graphical representations 616. The preferred process is illustrated in FIG. 60. In the preferred embodiment, the basis of organization is comparison of values 590 of each image-concept 604 sub-components 607. Preferably, input to the process includes a pivotal image-concept 572, and a first step is to generate a list of pivotal image-concept 572 sub-components 607 (sub-component access process 642). As indicated above, sub-components 607 preferably are stored in a data structure for a pivotal image-concept 572. Therefore, in the preferred embodiment, sub-components 607 may be accessed directly.

The next step of the preferred embodiment is sub-component organization process 644 during which a sub-list of image-concepts 646 is generated for each sub-component 607, the sub-list comprising the image-concepts which relate to the pivotal-concept sub-component; in this process, each member of the sub-list has the same value 590 for the sub-component 607. The purpose of this step of the preferred embodiment is to reduce searching time during navigation. As indicated above, a system developer may choose to store related image-concepts in a related-concepts slot 602 in a value 590 data structure. If such previous storage has been carried out, a sub-list may be generated by simply accessing related concepts from the related-concepts slot 602 and removing image-concepts which are not in the image-presentation list of image-concepts 640. If there was no previous storage, a sub-list may be constructed by accessing sub-component 607 values 590 from an image-concept's 604 data structure.

Image Presentation Process 609

Figure 61:
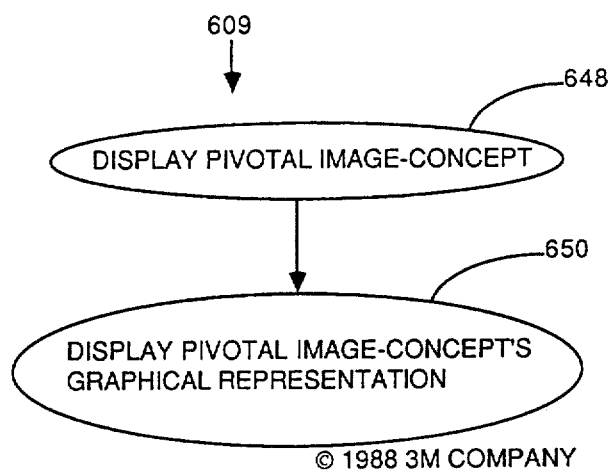
FIG. 61 illustrates image presentation processes.

During preferred image presentation process 609, a pivotal image-concept 572 and its graphical representation 616 are displayed to a user. The preferred process is illustrated in FIG. 61. Display pivotal image-concept process 648 typically displays an image-concept 604 to a user. There is a great deal of flexibility in the nature of the display. For example, the name 606 may be displayed alone, or information stored in the other-information slot 614 may be displayed. Some of the information may be displayed with access provided to additional information or all information may be displayed simultaneously. Typically, this will depend in large part on the nature of information stored in the other-information slot 614.

An image-concept's 604 graphical representation 616 is displayed during display pivotal image-concept's graphical representation process 650. As indicated above, in the preferred embodiment graphical representations 616 are stored with an image-concept 604 and may be accessed directly. Any standard graphical system may be used to display the graphical representation 616.

Navigation Image Process 611

Figure 62:
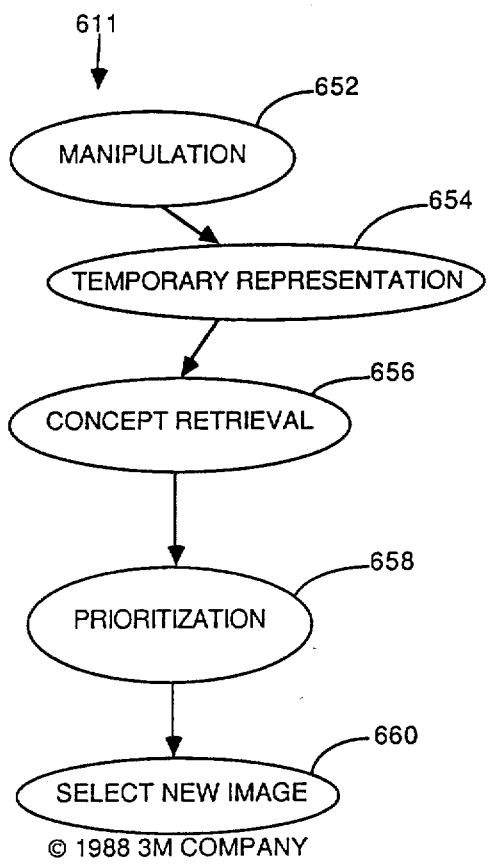
FIG. 62 illustrates navigation-image processes.

Preferred navigation image process 611 is illustrated in FIG. 62. In the preferred embodiment, a user is allowed to manipulate a sub-component of the pivotal-concept by manipulating a graphical representation 616 (manipulation process 652), a temporary graphical representation of the pivotal-concept which incorporates the manipulation of the sub-component is generated from the change in the initial graphical representation 616 (temporary representation process 654), a sub-list of image-concepts 604 for the manipulated sub-component 607 is accessed (concept retrieval process 656), a list of rankings of members of the sub-list of image-concepts based on similarity between the temporary graphical representation and the graphical representation of each member of the sub-list is generated (prioritization process 658), and an image-concept with the highest ranking in the list of rankings is selected, made into a new pivotal image-concept and displayed (select new image process 660).

The first step of the preferred embodiment is manipulation process 652 during which a user is given the option to manipulate a sub-component 607 of the pivotal image-concept 572 on display. As mentioned above, the preferred system is implemented so that a pivotal image-concept 572 has knowledge of its sub-components 607 and, for each sub-component 607, there is information about components of a graphical representation 616 which may vary (components-to-vary 592) and methods to allow manipulation (method-to-alter 594). With this information available, a user may be given the option to vary a sub-component 607 using a mouse, keyboard or touch screen. If desired, components which may vary may be highlighted to make it more apparent to a user what manipulations are available.

Following manipulation process 652 in the preferred embodiment, a temporary graphical representation 616 is constructed using temporary representation process 654. Typically, the algorithm which guides this part of the preferred process is included in information stored in method-to-alter 594. The output of the preferred embodiment is a graphical representation 616 which incorporates the manipulated change and which is displayed, and an indication of the sub-component 607 which was manipulated and the degree of change. For example, there may be an indication that "height" was varied by increasing the length of "leg 1" of a chair to a length of 2 mm. If desired, the algorithm stored in method-to-alter 594 may include in the temporary graphical representation 616, changes both to "leg 1" and to other components which may be altered as a result, such as "legs 2, 3, and 4".

In the preferred system, the next step is concept retrieval process 656. During the process, the manipulation which was made is categorized using definitions 600 for the sub-component 607 which was altered to determine the value 590 for the sub-component 607 in the temporary graphical representation 616. For example, it will be determined whether the "height" based on the new "leg length" is "normal", "short", or "tall". Preferably, once a new value 590 has been selected, the image-concepts 604 which have the same value 590 on the sub-component 616 are retrieved. As mentioned above, in the preferred system they will have been stored with the value 590 data structure either prior to run time or during image organization process 605.

The image-concepts 604 which are collected in concept retrieval process 656 are prioritized during preferred prioritization process 658 based on similarity between the temporary graphical representation 616 and the graphical representation 616 for each image-concept 604 which was collected in concept retrieval process 656. Preferably, there is information 184 available for all graphical representations 616 (including the temporary graphical representation 616) indicating the sub-components 607 included and values 590 for each sub-component 607. In the preferred embodiment, the prioritization process is similar to that described in the Nearest Neighbor system; that is, definitions of similarity based on attributes 1017 (sub-components 607) and attribute values 1018 (values 590) are stored and used to prioritize the list of image-concepts 604.

In the final step of the preferred embodiment, a new image-concept 604 is selected during select new image process 660 by accessing the image-concept 604 with the highest priority ranking, making it the new pivotal image-concept 572 and displaying it using image presentation process 609.

General Description and Data Structures for Living Equations

Figure 63:
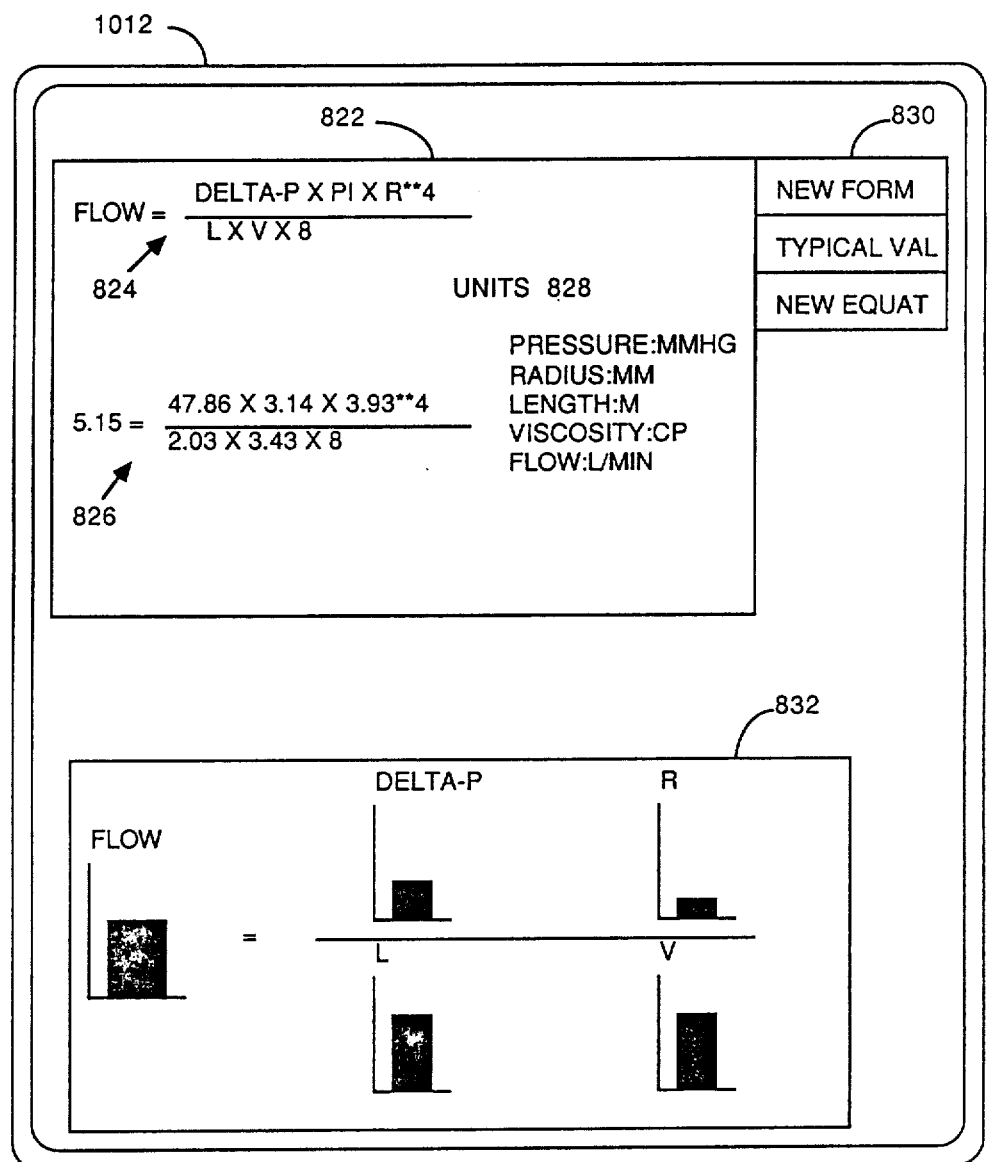
FIG. 63 illustrates a user interface for the preferred Living Equations system.

The preferred Living Equations system allows a user to examine both numerical and graphical representations of an equation, to manipulate the equation by altering the form of the equation, the values, or the units, and to examine relationships between portions of the equation and between concepts 1016 which are available in other systems such as the preferred SNETS system. A typical user display 1012 for the Living Equations system is illustrated in FIG. 63. As can be seen in the Figure, a user has access to a graphical display 832, a numerical display 826, a display of terms 824, and a display of units 828.

Figure 64:
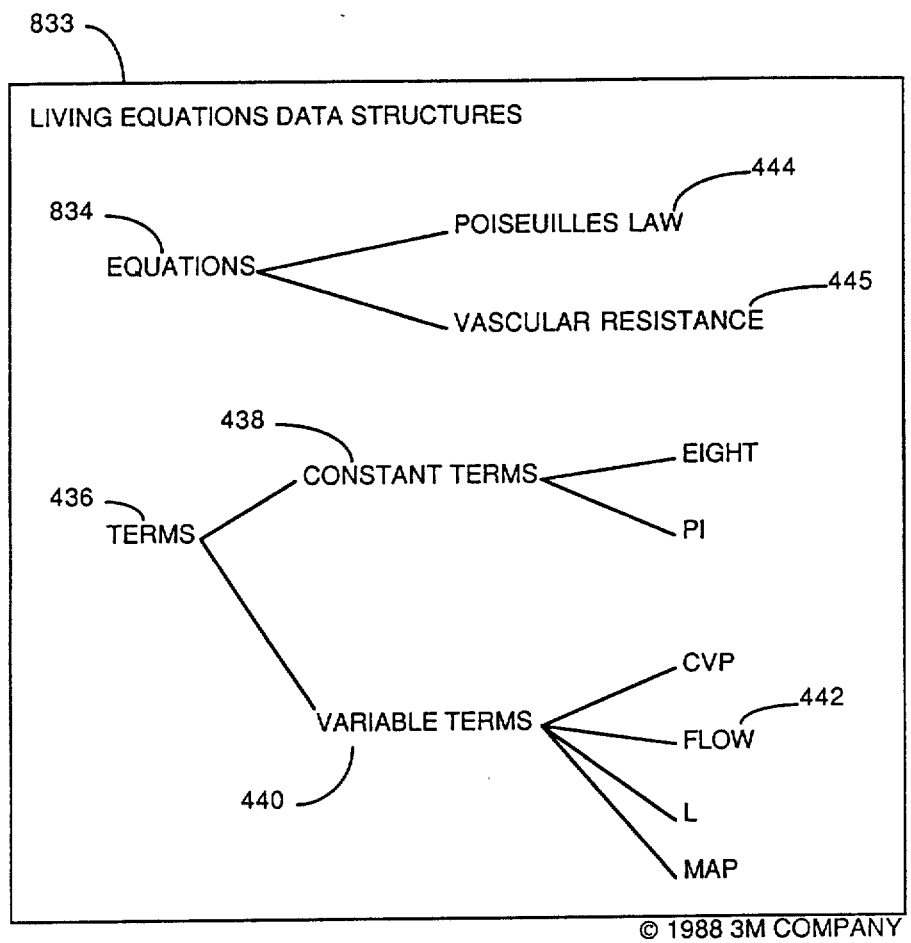
FIG. 64 illustrates data structures for the preferred Living Equations system.

The general Living Equations system data structures 833 used to support the current embodiment of the Living Equations system are illustrated in FIG. 64. In the preferred embodiment, an equations structure 834 holds pointers to particular equations which are available such as Poiseuilles law 444. There preferably are also sets of terms 436, some of which are constant terms 438 such as "pi", others of which are variable terms 440 such as flow 442. Typically, particular equations 834 and terms 436 have their own data structures in the current embodiment.

A typical equation data structure 445 is illustrated in FIG. 65. In the preferred embodiment, an equation 834 has a name slot 446, a terms slot 462 which holds all terms 436, a typical values slot 464 which holds typical values for each term 436, and a terms-in-lhs slot 460 which holds the term 436 currently on the left hand side of the equation 834. In the current embodiment, there is also a poss-arrangements-pairs slot 454 which holds printable 456 and computable 458 forms for different layouts for the equation 834; for example, there would be a different layout if term "flow" were on the left hand side than if the term "r" were on the left hand side. The purpose of this representation in the preferred embodiment is to allow manipulation of the form of the equation 834 without having to perform symbolic manipulation. If symbolic manipulation were desired, slot 454 could be eliminated. In the preferred embodiment, a curr-arrangement-pair slot 448 stores the current printable 450 and computable 452 forms of the equation 834.

A typical term data structure 437 is illustrated in FIG. 66. In the preferred embodiment, there typically is a name slot 466, a curr-val slot 468 to hold the current value of the term 436, a descriptive text slot 470 which holds a textual description of the term 436, a max val slot 476 and min val slot 480 to hold typical maximum and minimum values, a possible units slot 482 to hold all units which might be applicable, and a related concepts 484 slot which holds information about concepts 1016 which are related to the term 436. In the preferred embodiment, there are two sets of units, internal units (slot 472) which are used for all computations (a current value is stored in slot internal value 474), and physical units (slot 478) which are used for presentation to a user. The purpose for these two representations is to allow a user to see how an equation 834 looks with different units while enforcing consistency in internal computation.

Living Equations Process Description

Figure 67:
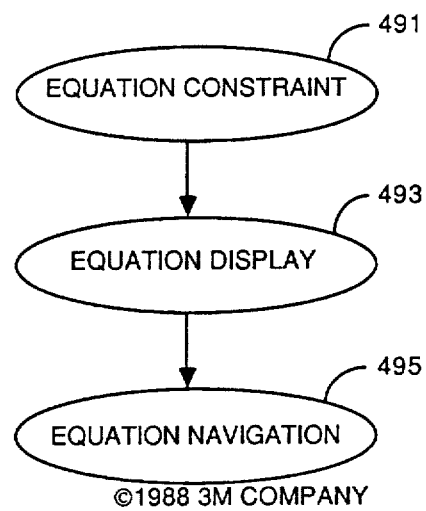
FIG. 67 illustrates general processes for the preferred Living Equations system.

The preferred Living Equations system follows some of the same general processes described above for the ION system and illustrated in FIG. 2 (concept constraint process 168, concept display process 174 and navigation process 176). However, in the preferred Living Equations system, these processes are specialized for organizing and displaying equations. In the preferred embodiment, an equation is selected and concepts related to the equation are organized into a manipulable, graphical representation of the equation during equation constraint process 491, an equation 834 is displayed to a user during equation display process 493 and may be altered during equation navigation process 495 (see FIG. 67).

Equation Constraint Process 491

Figure 68:
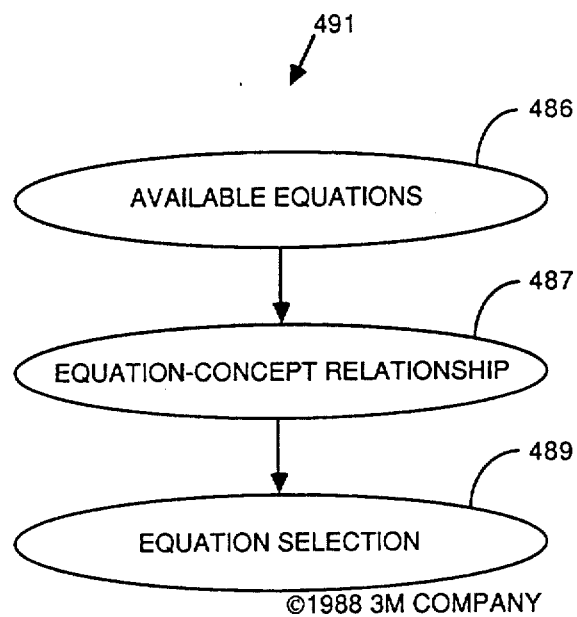
FIG. 68 illustrates equation constraint processes.
Figure 69:
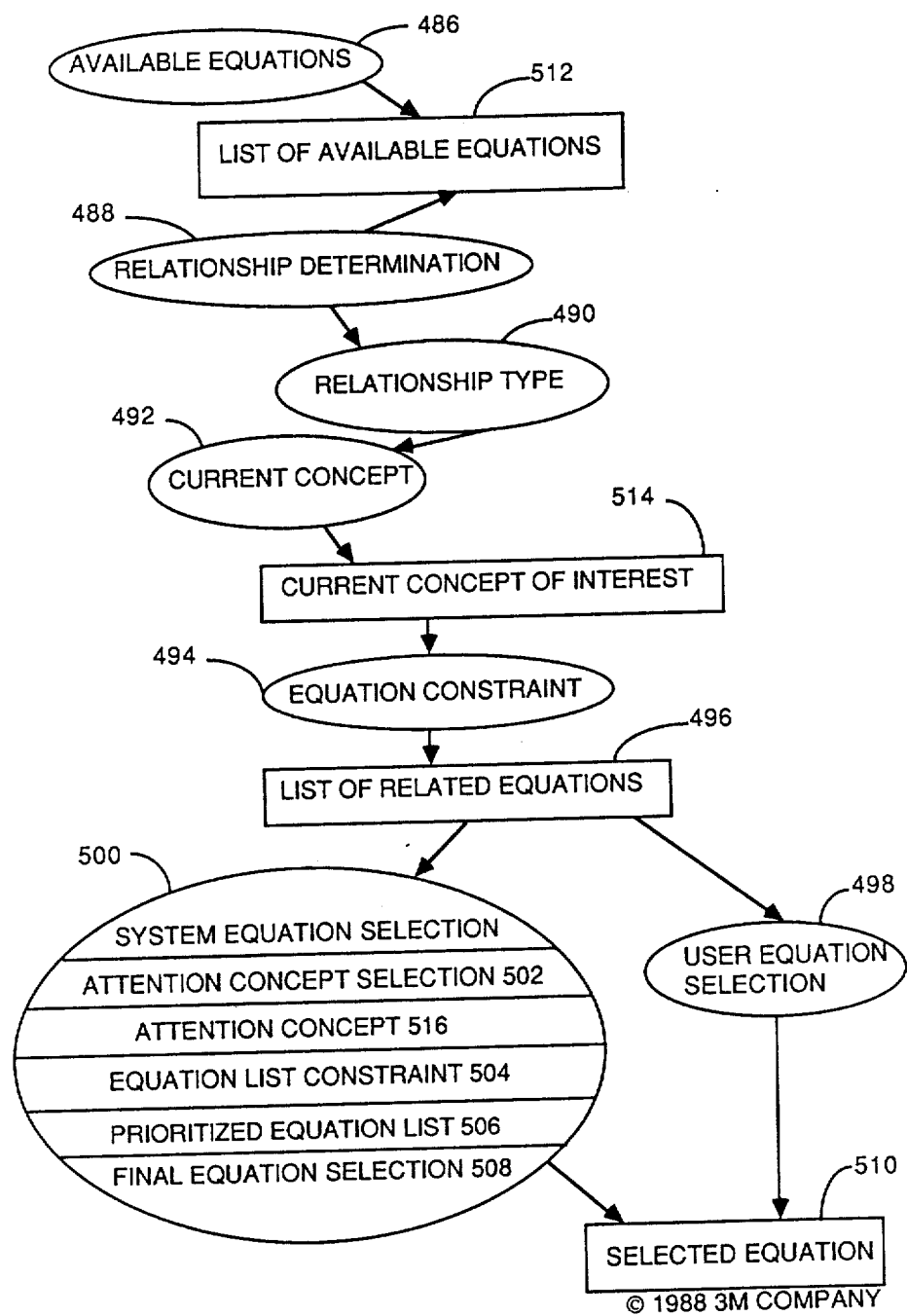
FIG. 69 illustrates equation selection processes.

The purpose of preferred equation constraint process 491 is to select an equation 510 (FIG. 69) to be presented to a user and to organize concepts related to the equation into a manipulable, graphical representation of the equation. The components of preferred equation constraint process 491 are illustrated in FIG. 68; these include available equations process 486 which is used to generate a list of available equations in which the list contains equations which are available to the system, equation-concept relationship process 487 which is used to determine relationships between equations and concepts, and equation selection process 489 which is used for selecting the equation to be displayed. Equation-concept relationship process 487 is broken down further into relationship determination process 488 and relationship type process 490 (see FIG. 69). Equation selection process 489 is further broken down into current concept process 492, equation constraint process 494, user equation selection process 498 and system equation selection process 500. These processes are illustrated in FIG. 69 and will be described further below.

The purpose of preferred equation constraint process 491 is to generate a list of available equations 834 (available equations process 486), determine whether a relationship exists between an equation 834 and concepts 1016 in any available systems such as the SNETS system or the Focus system (relationship determination process 488), determine a relationship type for any equation-concept relationships uncovered (relationship type process 490), generate a list of current concepts 1016 available in the current context (current concept process 492), generate a list of related equations 496 which are related to currently available concepts (equation constraint process 494) and ask either a user (user equation selection process 498) or the Living Equations system (system equation selection process 500) to select an equation 510 from the list of related equations 496, where the system would use a particular context to make a selection.

A preferred first step is to use available equations process 486 to generate a list of available equations 512 (equations which are available to the system), which may be accomplished by collecting the children in the equations 834 hierarchy displayed in FIG. 64 (in the figure, Poiseuille's law 444 and vascular resistance 445 are examples of children collected by available equations process 486). The next preferred step is to determine equation-concept relationships for the list of available equations 512. As indicated above, preferably there are data structures for equations 834 which include information such as terms 436 in an equation 834, and preferably there are data structures for terms 436 indicating related concepts 484 for a term 436 (see FIGS. 65 and 66).

One way of determining equation-concept relationships in the preferred embodiment is by following links from an equation 834 to its terms 436 and the terms' related concepts. Although not shown in the figures, one could also store relationships between an equation 834 and a set of concepts 1016 in the equation's data structure. It also would be possible to indicate the nature of the concept-equation relationship. For example, one could indicate that Poisueille's law related to several concepts 1016 in the SNETS system and to several additional concepts in the Focus system. This type of information could be retrieved using relationship type process 490 and could be used to determine the nature of a possible interaction between an equation 834 and concepts 1016 in several other systems. For now, we will assume that all relationships are of the Living Equations-SNETS variety, that is, all related concepts 1016 come from an SNETS system.

In the preferred embodiment, the next step in equation constraint and selection is determining current concepts of interest 514 using current concept process 492. The purpose of this step is to generate a list of concepts 1016 which are available in a current context. For example, the Living Equations system might be called from the Space Explorer system. In the preferred Space Explorer system, there is a data structure holding a list of all dimensioned-concepts which are currently active. In another example, the Living Equations system might be called from the preferred Focus system. Again, there is a data structure holding current perspective-concepts. In either case, the preferred Living Equations system can access the appropriate list and use it to generate the list of current concepts of interest 514. Equation constraint process 494 can then be used to determine which concepts 1016 in the list of current concepts of interest 514 match concepts related to equations 834 in the list of available equations 512. In the preferred embodiment, when a match is found, the appropriate equation 834 is added to the list of related equations 496.

Typically, there is more than one equation in the list of related equations 496, and a process is used to select one for display. One option is to allow a user to select an equation of interest directly from a menu of possible equations. In the preferred embodiment, this process is followed in user equation selection process 498. Another option in the preferred embodiment is to allow the preferred Living Equations system to make a selection using system equation selection process 500. The first step in this preferred process is selecting a concept 1016 from the list of current concepts of interest 514 to serve as an attention concept 516 using attention concept selection process 502 which selects the concept which has been manipulated most recently by the system or the user. As in current concept process 492, this process typically would be followed when the Living Equations system is called from another system such as the Space Explorer system.

Depending on which system makes the call, a different process may be used to select a concept 1016. For example, if the call is made from the Space Explorer system, the current center concept might be selected to be an attention concept 516. If the call is made from the Nearest Neighbor system, the current top concept might be selected to be an attention concept 516. A series of if-then statements can also be built into process 502 to handle systems which could be making a Living Equations system call in a particular system configuration.

With an attention concept 516 selected, the preferred embodiment uses the attention concept 516 to constrain the list of related equations 496 using equation list constraint process 504. In this preferred process, equations in the list of related equations 496 which have no relationship to attention concept 516 are removed from the list of related equations 496. As mentioned above, relationships between concepts 1016 and equations 834 are stored in the preferred Living Equations system data structures and can be accessed for this purpose.

The next step in the preferred embodiment is prioritizing the equations left in the list of related equations 496 using a prioritized equation list process 506. With this preferred process, a prioritized equation list is generated by rating equations in the constrained equation list using their relationship to the attention concept. One way to accomplish this step is to store in related concepts slot 484 (FIG. 66) an indication of the closeness of the relationship between a concept 1016 and an equation which could be accessed during process 506. It also would be possible to consider all relationships equal and simply select an equation in a random fashion from among the list of related equations 496. If a prioritization is carried out, the final preferred step is selecting an equation 510 by determining which equation 510 has the maximum priority rating using final equation selection process 508.

Equation Display Process 493

Figure 70:
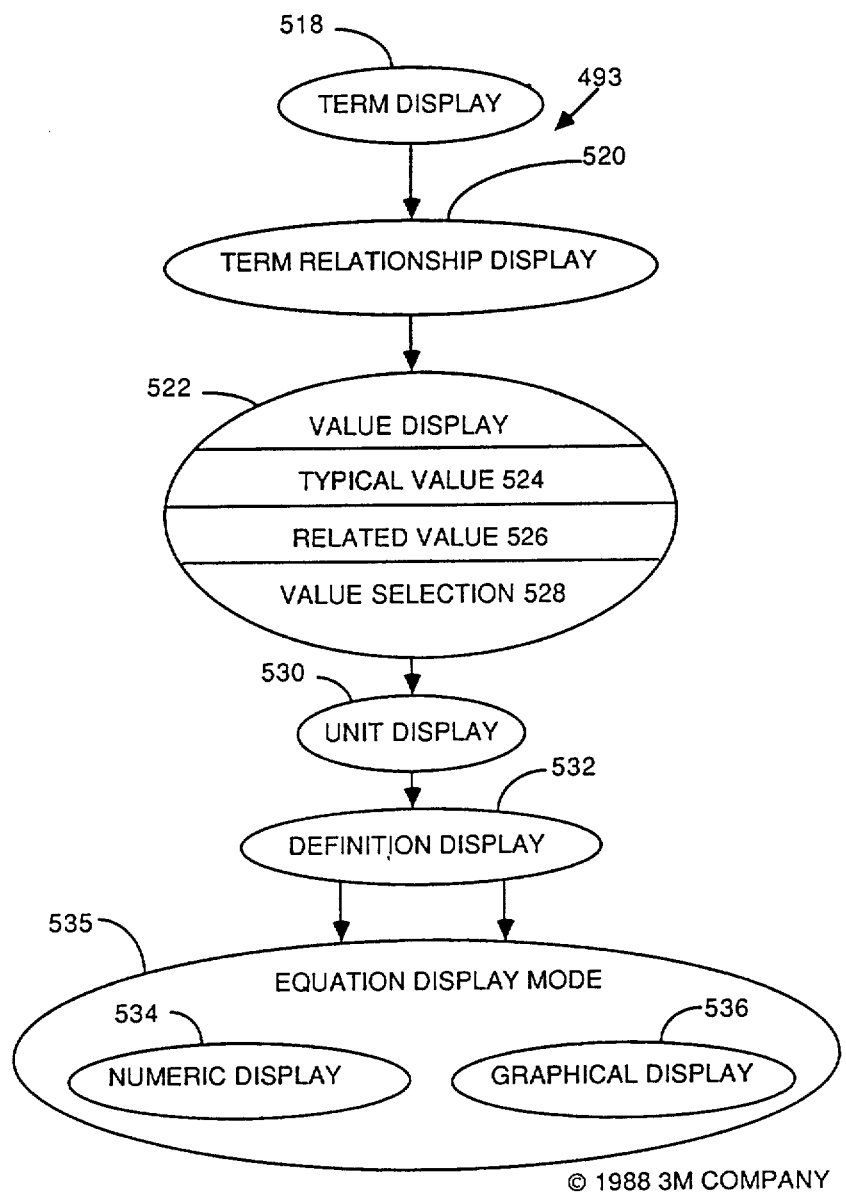
FIG. 70 illustrates equation display processes.

A typical user display 1012 for the Living Equations system is in FIG. 63, and an illustration of the preferred process is in FIG. 70. In the preferred embodiment, terms of an equation 834 are displayed as shown in portion 824 of FIG. 63 using term display process 518, and relationships among the terms are displayed using term relationship display process 520. As mentioned above, in the current embodiment terms 436 are stored with an equation 834 and can be accessed for display purposes using term display process 518. The arrangement of terms 436 can be accessed from poss-arrangement-pairs slot 454 (FIG. 65) which preferably holds information 184 about positioning of different terms 436 for different display forms using term relationship display process 520.

In the preferred embodiment, information about arrangement of terms 436 is sufficient to display the terms. Typically, values for terms 436 are also displayed using value display process 522. In some cases, it may be desirable to display typical values. In the preferred embodiment, typical value process 524 can be used to access typical values slot 464 for the equation 834 to generate a list of typical values. Another option is to select values which relate to the system which called the Living Equations system using related value process 526. Using this option, the attention concept 516 may be examined to determine whether there are values which correspond to attention concept 516. For example, a "hypertension" concept may have attached to it a value for "pressure" which indicates that, in conditions of hypertension, pressure is generally above x mm/Hg. In this case, the value may be used by the Living Equations system. In the preferred embodiment, it is up to value selection process 528 to determine whether there are related values which are stored in an equation data structure (see FIG. 65) and, if not, to use typical values 464 for the initial display.

As illustrated in portion 828 of FIG. 63, units are displayed to a user. In the preferred embodiment, unit display process 530 checks physical units slot 478 for each term 436 and uses this information to display units which are currently of interest to a user.

A user preferably can ask for a definition of a term 436; if such a request is made, definition display process 532 accesses descriptive text slot 470 for the term 436 and displays the text corresponding to definition of the terms.

Preferred equation display mode process 535 may be used to display an equation 834. Term values generated by value display process 522 in the preferred embodiment may be displayed both numerically using numeric display process 534 and graphically using graphical display process 536. In both cases, the preferred system is implemented so that values are available from value display process 522 and display form is available from the poss-arrangement-pairs slot 454 of the equation 834. Most standard graphical display packages can be used to display the values as seen in portions 826 and 832 of FIG. 63.

Equation Navigation Process 495

Figure 71:
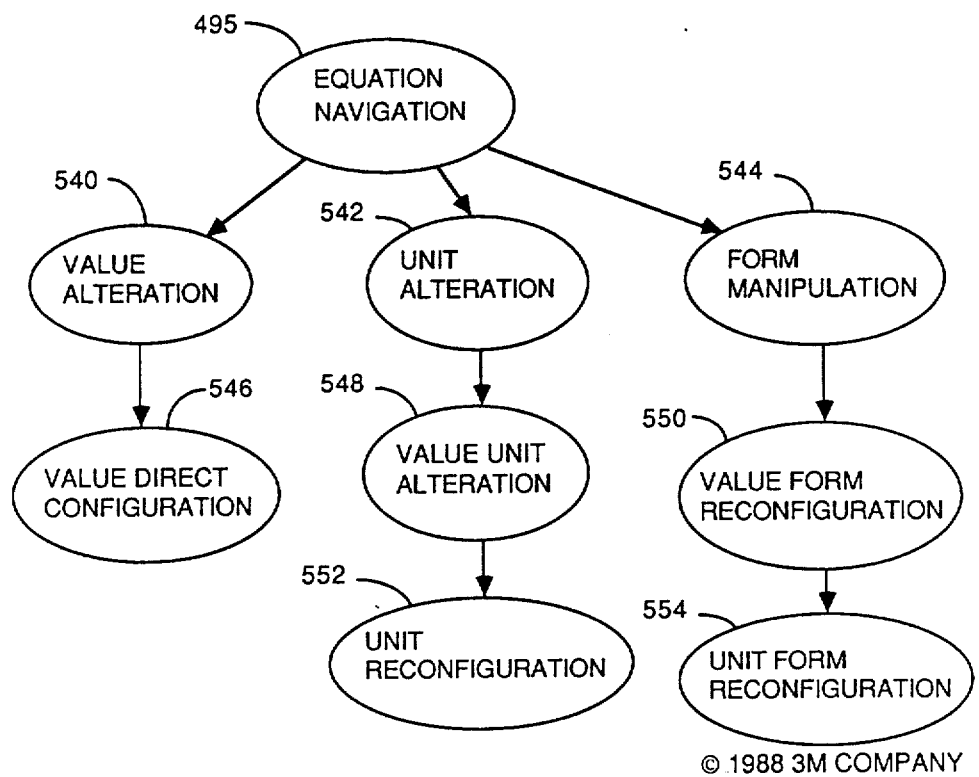
FIG. 71 illustrates equation navigation processes.

In the preferred embodiment, the purpose of equation navigation process 495 is to allow a user to manipulate an equation 834 by altering its term values, units or form. Equation navigation process 495 is illustrated in FIG. 71. Preferred value alteration process 540 allows a user to select a new term value by manipulating a term value in either graphical or numeric form. Using value alteration process 540 in the preferred embodiment, a user is given the option to alter a value by either selecting a term 436 in portion 826 of a display or selecting a term 436 in section 832 of a display (see FIG. 63). In the preferred embodiment, if portion 832 is selected, a user may move the bar graph of a term 436 up or down as desired by using a mouse or the keyboard, and if portion 826 is selected, a user is asked to input a new number via a keyboard. In either case in the preferred embodiment, if a value is selected which is above max val or below min val (see FIG. 66), a warning is issued. Following selection of a new term value, the Living Equations preferred system adjusts remaining term values using value direct configuration process 546 and an appropriate computable form from FIG. 65.

A second way of navigating in the current system is by altering units. If a user expresses a desire to use a new unit, preferred unit alteration process 542 accesses possible units 482 from FIG. 66, presents them to a user and asks for a selection. The next preferred step is value unit alteration process 548 in which term values are adjusted for the new unit using a number conversion table. The next step in the current embodiment is unit reconfiguration process 552 in which remaining units are adjusted to conform with the new unit. This step may or may not be desired in a particular situation. For example, in some situations, a user may wish to use mixed units. The preferred Living Equations system allows for this flexibility. In fact, in the current system, enforced matches are not required, and unit reconfiguration process 552 optionally may be skipped. This is possible in the preferred embodiment because system computations are based on a standard set of units and terms which is stored in internal units and internal values slots 472 and 474, and conversions are made before user preferred units are displayed.

A third preferred method of navigation is through manipulation of equation form. A user of the preferred system may ask to replace a term on the left side of the equation with a term from the right side of the equation 834 using form manipulation process 544. Process 544 typically accesses all available terms 436 and allows a user to select the term 436 which should be on the left side. The next step in the preferred embodiment is adjustment of term values after form manipulation using value form reconfiguration process 550. Typically, process 550 uses poss-arrangement-pairs slot 454 to find the form which matches the form selected by a user and uses the new form to re-configure the displays and re-calculate term values. In the current embodiment, unit form reconfiguration process 554 then adjusts units to match the new form.

General Description and Data Structures for SNETS

Figure 72:
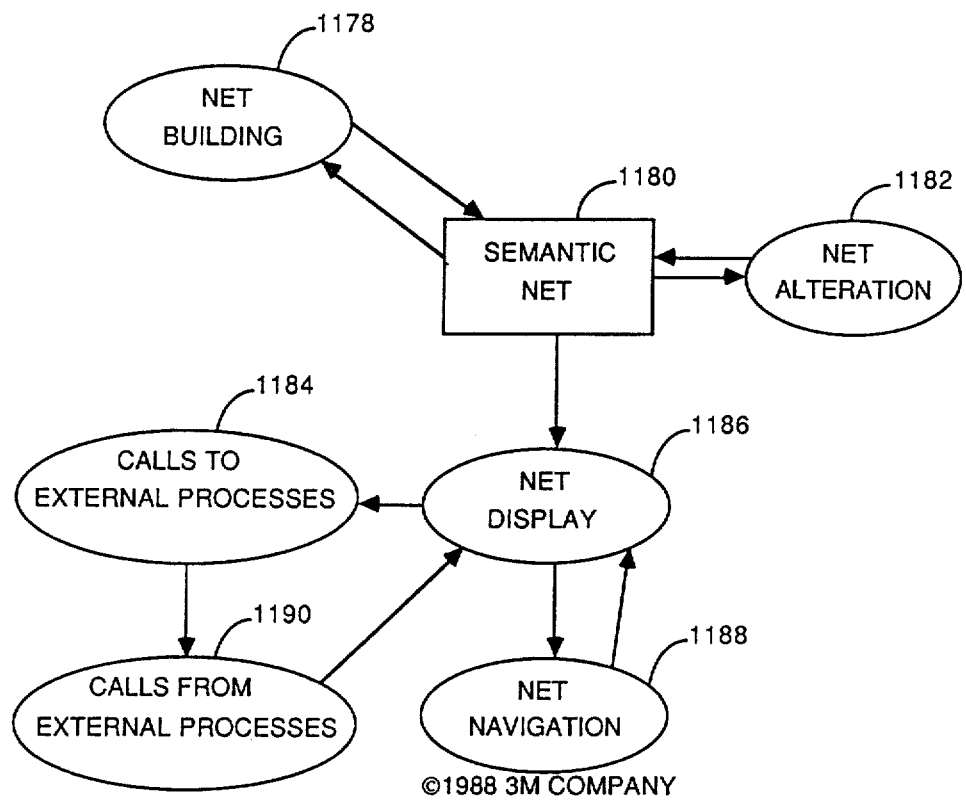
FIG. 72 illustrates general processes for the preferred SNETS system.
Figure 73:
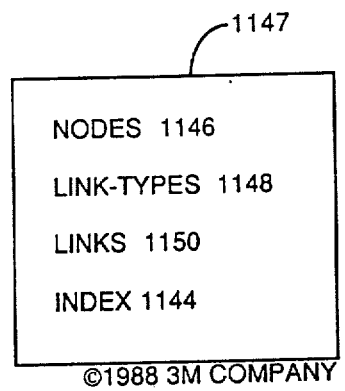
FIG. 73 illustrates a preferred SNETS system data structure.
Figure 74:
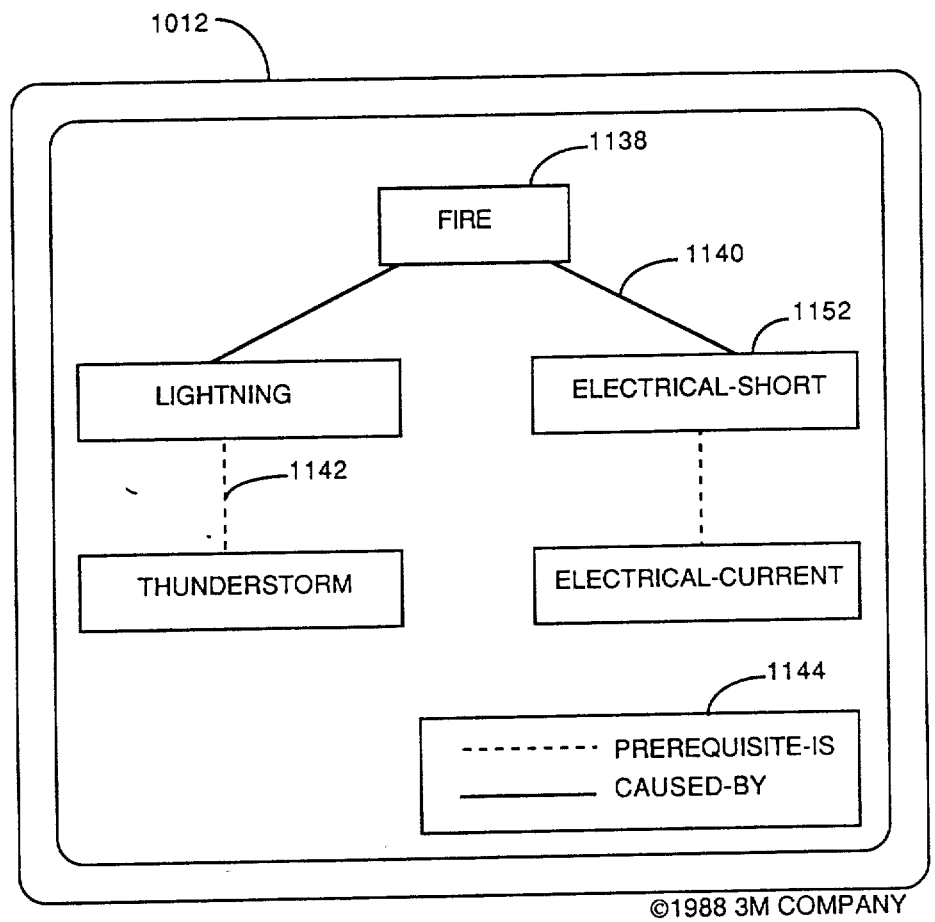
FIG. 74 illustrates a preferred SNETS system user interface.

The preferred SNETS system allows a user to create, display, edit, store, and browse through semantic nets 1180 (see FIG. 72), and to integrate semantic nets 1180 with other forms of viewing information such as those described in the Focus and Space Explorer systems. A semantic net is a knowledge representation which displays concepts and relationships between them in a graphical form; concepts are represented as nodes, and relationships are represented as links between nodes. FIG. 73 illustrates components 1147 of a typical semantic net 1180. Typical components include nodes 1146, link-types 1148, links 1150 and an index 1144. An example of a preferred SNET display 1012 of these components is illustrated in FIG. 74. The preferred SNET system includes nodes such as fire 1138 which are connected by links such as links 1140 and 1142. Typically, links such as 1140 are of a particular link-type 1148 such as "prerequisite-is". An interpretation of the display shown is that fire is caused by electrical short and lightning and that lightning has a prerequisite of thunderstorm. In the preferred embodiment, an index 1144 helps provide an interpretation of links.

A system developer can use the preferred SNETS system to build and modify semantic nets 1180. A user can view the preferred SNETS system display to gain an understanding of relationships among concepts 1016. The preferred SNETS system allows a user to view selected portions of a semantic net 1180 such as "causal links only", or "only concepts related to thunderstorms" and to request views either by menu or by a natural language interface. In the preferred embodiment, the SNETS system can be called from another system such as the Focus system and can call other systems as well. For example, while studying the semantic net 1180 in FIG. 74, a user may choose to call the Nearest Neighbor system from node electrical short 1152 to view electrical problems similar to shorts.

A preferred node data structure 1145 is illustrated in FIG. 75. Preferred slot node-label 1154 holds a label for a node name and a method to convert the label to printable form. For example, a label may be "electrical-short," and a method may convert the label to "electrical short." Preferred slot links-names-and-values 1156 holds information about links 1150 from the node to other nodes 1146; the form of the knowledge is "link-type node-pointed-to" such as "prerequisite-is electrical-current." Preferred slot points-to-me 1158 holds information about links from other nodes 1146 to the node such as "caused-by fire." Preferred slot synonyms 1160 holds synonyms for the node-label which can be used for searching and navigating through a semantic net 1180. The preferred node data structure may also hold information about relationships between the node and system modules. For example, there may be a slot such as related-equation 1162 which holds information about an equation (Ohm's law, for example) in the Living Equations system which relates to the node. These slots may be used to determine when and how to make calls from the SNETS system to other systems.

Figure 76:
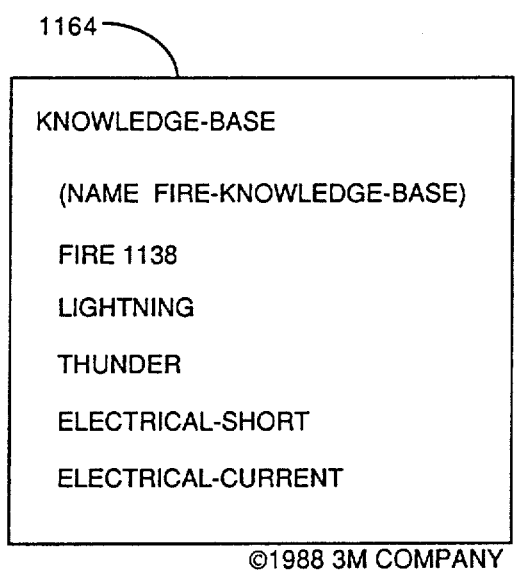
FIG. 76 illustrates a preferred SNETS system knowledge base.

In the preferred embodiment, nodes 1146 may be stored in a knowledge base (kb) 1164 to help organize the information (see FIG. 76). For example, there may be a knowledge base 1164 called "fire knowledge base" which contains most or all nodes 1146 related to fire. In the preferred embodiment, a semantic net 1180 need not be contained in one knowledge base 1164; there may be links across knowledge bases 1164.

FIG. 77 illustrates another preferred SNETS system data structure, which is called control-semantic-nets 1166 and which holds control information. In the preferred embodiment, current-links 1168 holds a list of link-types which have been defined, current-kbs 1169 holds a list of kbs currently used in semantic nets 1180, and current-query 1170 holds information on the type of view currently on display. In the current embodiment, a user may view a semantic net 1180 in several different ways. For example, a user may ask to see the portion of a semantic net 1180 which resides in a particular knowledge base 1164 or a portion of a semantic net 1180 which connects nodes x and y. Current-query 1170 preferably indicates which type of view is current such as "kb fire" which indicates that the current view is a kb view of the knowledge base fire.

Preferred slot format-modification 1172 holds information on the way in which a semantic net 1180 is displayed. In the preferred embodiment, SNETS may be built on top of any standard graphing package such as Xerox Corporation's software sold under the name "Grapher". Graphing packages typically have options for graphing such as "graph as a forest", or "graph in horizontal fashion." When such options are available, preferred slot format-modification 1172 holds information on options currently in use.

Preferred slot word-match-restricted-to-indexing 1174 holds information on indexes currently in use. In the preferred embodiment, a system developer has the option to create indexes to nodes 1146 which may be used to speed searches through a semantic net 1180, and a current index may be stored in word-match-restricted-to-indexing 1174.

Preferred slot word-match-restricted-to-kbs 1176 is used to restrict searching to nodes in a particular knowledge base 1164; it holds information on a knowledge base 1164 to which a current search should be restricted.

SNETS Process Description

The preferred SNETS system follows some of the same general processes described above for the ION system and illustrated in FIG. 2 (concept display process 174 and navigation process 176). However, in the preferred SNETS system, these processes are specialized for organizing and displaying semantic nets. The major components of the preferred SNETS system process are illustrated in FIG. 72. In the preferred process, a semantic net 1180 can be created using net building process 1178, altered using net alteration process 1182 and displayed using net display process 1186; different views of a net 1180 may be accessed using net navigation process 1188 in order to navigate through the semantic net; calls to other systems may be made using calls to external processes process 1184, and other systems may call and display a semantic net 1180 using calls from external processes process 1190.

Net Building Process 1178

Figure 78:
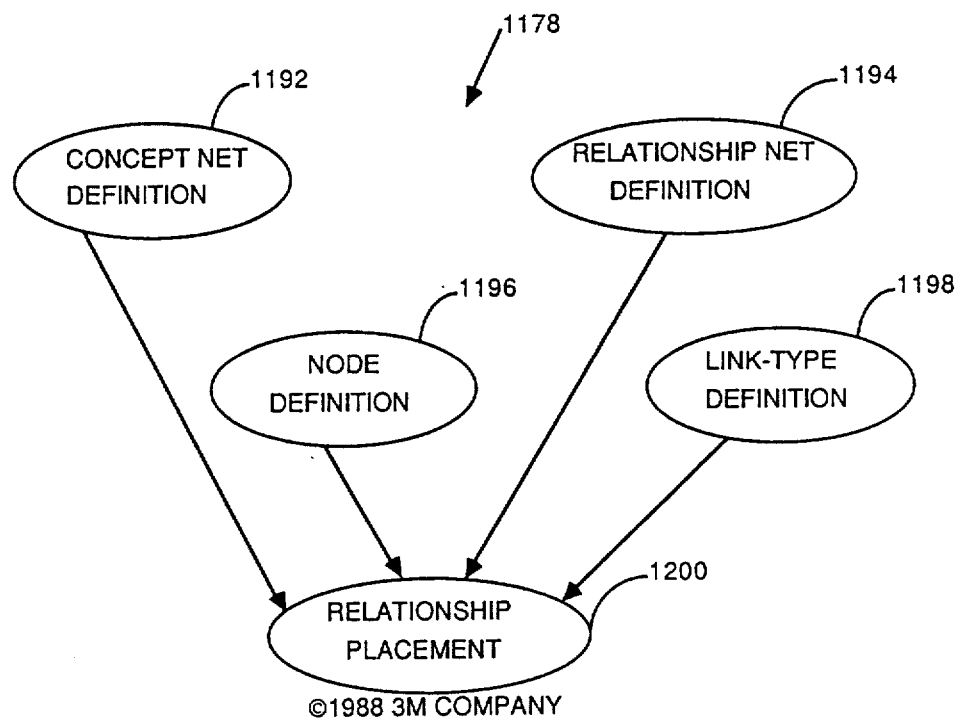
FIG. 78 illustrates net building processes.

Preferred Net Building Process 1178 is illustrated in FIG. 78. In the preferred process, a user may generate a list of net concepts to be placed in the semantic net 1180 (concept net definition process 1192), generate a list of net relationships (link-types 1148) to be used in the semantic net (relationship net definition process 1194), generate a node for each net concept (node definition process 1196), generate link-types 1148 for relationships in the list of net relationships (link-type definition process 1198) and establish links 1150 between concepts (relationship placement process 1200).

In the preferred embodiment, concepts may be selected for addition to the semantic net 1180 from inside other systems, and concept net definition process 1192 may be used for this purpose. For example, a system developer who has already created a number of perspective-concepts 146 (FIG. 45) for the Focus system may decide to include some of the perspective-concepts 146 in a semantic net 1180. Preferred concept net definition process 1192 allows the developer to select a number of perspective-concepts 146 for inclusion in a semantic net 1180. In the preferred embodiment, slots which are necessary for the node 1146 data structure are then added to each perspective-concept 146, and the perspective-concept's name 148 is placed in the concept's node-label slot 1154. Preferably a perspective-concept 146 resides in a knowledge base 1164, and the knowledge base 1164 is added to the current-kbs slot 1169.

A similar process may be followed to select link-types 1148 from other systems for inclusion in a semantic net 1180. For example, a developer may select relationships such as those illustrated in FIG. 44 (close-to 138 and medium-close-to 142) for inclusion as link-types 1148 in a semantic net 1180. Preferred relationship net definition process 1194 makes selected relationships into link-types 1148 and adds them to current-links slot 1168 (FIG. 77).

Figure 79:
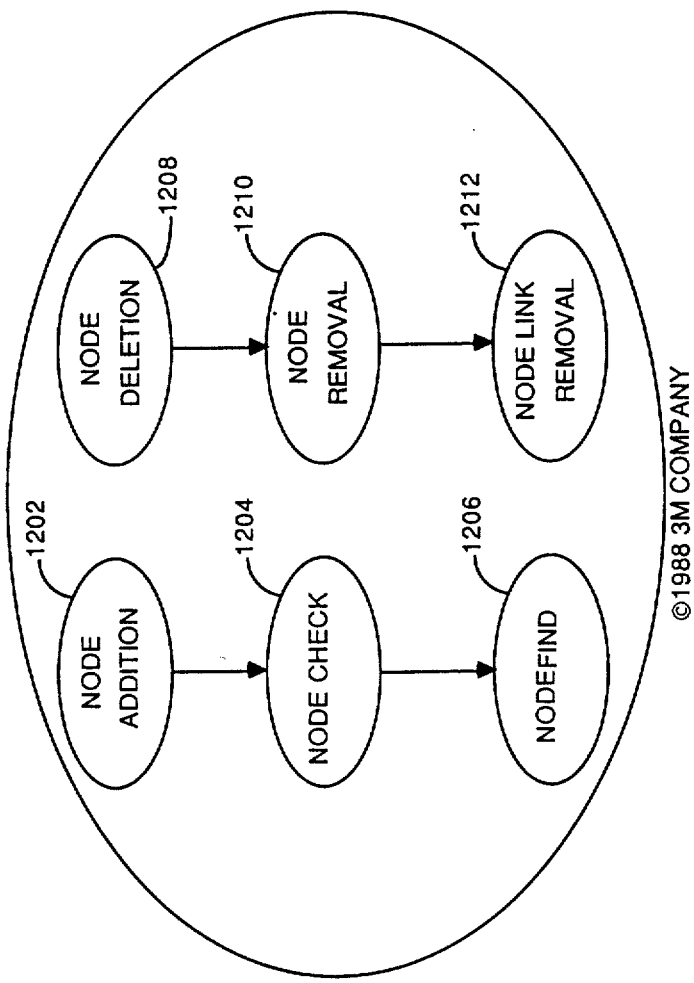
FIG. 79 illustrates node addition and deletion processes.

In the preferred embodiment, nodes 1146 and link-types 1148 may be added in a more direct fashion using node definition proces 1196 and link-type definition process 1198. Some of these processes assume that a semantic net display is available and update the display as nodes and links are added. The display process will be described below in the net display process section. For now, we will assume that a display exists. The steps involved in preferred node definition process 1196 are illustrated in FIG. 79. In the preferred embodiment, when a user indicates a desire to add new nodes 1146 to a system, node addition process 1202 adds an add node to the semantic net by checking current-kbs 1169 to determine what kbs 1164 are in use, making a list of kbs 1164 and asking the user to select a kb 1164 or name a new kb 1164 in which the new node/nodes 1146 should reside. The next step of preferred node addition process 1202 is to ask the user whether a search should be made to determine whether the new node 1146 already exists in the system. The preferred options are: restrict search to current knowledge base, restrict search to a different knowledge base, restrict search to nodes in a particular index, don't restrict at all, and don't search at all. The next preferred step is entering the new node-label 1154.

If "don't search at all" is not selected, preferred node check process 1204 next prohibits the user from adding an add node to the semantic net which already exists in the semantic net by checking to see if the new node-label 1154 exists in the search space indicated by the user (current kb, for example). Preferably, if the node 1146 does not exist, it is added to the selected kb 1164; if it does exist, preferred node find process 1206 finds and displays a portion of the semantic net 1180 containing the node 1146 to be added.

In the preferred embodiment, new link-types 1148 are added using link-type definition process 1198 by asking the user to input the name of the new link-type 1148 and adding it to current-links slot 1168.

Figure 80:
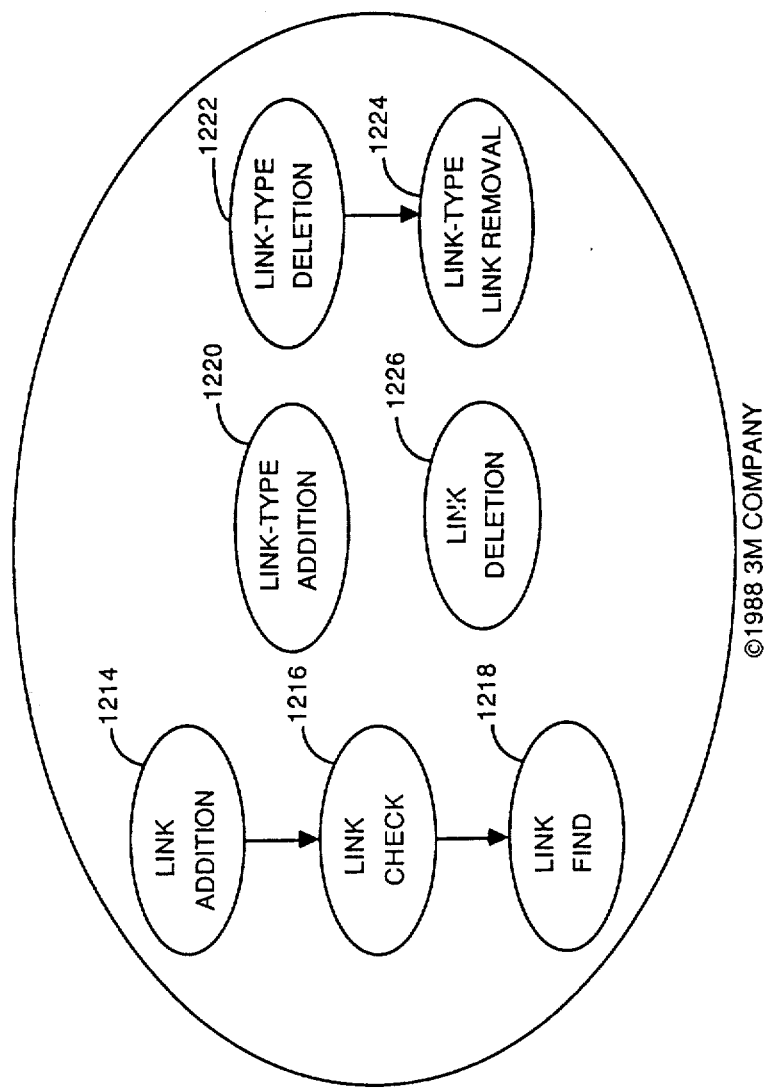
FIG. 80 illustrates link addition, link-type addition and link-type deletion processes.

In the preferred embodiment, links 1150 are placed between nodes, thereby defining a relationship between two concepts, using relationship placement process 1200. Preferred relationship placement process 1200 is illustrated in FIG. 80. Preferably, when a user indicates a desire to place a new link 1150, preferred link addition process 1214 places an add link between two nodes in the semantic net by asking the user to select an originating node 1146 (this may be entered directly or may be selected from a semantic net display), presenting a menu of current link-types 1148 and asking the user to select a link-type 1148 and to select the node/nodes which should form the other end of the link. Preferred link check process 1216 prohibits the user from adding an add link between two nodes which already exists in the semantic net by checking to see if the selected link already exists between the selected nodes; if a link does not exist, it updates linkage information in all selected node 1146 data structures and displays the new semantic net 1180 (see net display section). If it does exist, link find process 1218 finds and displays a portion of the semantic net 1180 containing the link to be added 1150.

Net Alteration Process 1182

Preferred net alteration process 1182 is illustrated in FIGS. 79 and 80. Net alteration process 1182 allows a user to add and delete nodes 1146, link-types 1148 and links 1150 and to update node information. In the preferred embodiment, adding a node to an existing semantic net 1180 follows the same process as that described in net building process 1178 with the exception that node addition process 1202 may be used to help place the new node 1146 into the semantic net 1180 by asking the user for information on link-types 1148 which should be connected to the new node 1146 and additional nodes 1146 which should be connected to the new node 1146 via selected link-types 1148.

In the preferred embodiment, a node 1146 may be deleted from a semantic net 1180 by activating node deletion process 1208 on a particular node 1146. Preferred node removal process 1210 deletes the node 1146 from the semantic net 1180, and node link removal process 1212 removes links 1150 which were previously connected to the deleted node and updates information in nodes 1146 which previously were connected to the deleted node 1146.

The procedure for adding a link 1150 to a semantic net 1180 is the same as that described in relationship placement process 1200.

Deleting a link between two nodes in the semantic net may be accomplished using preferred link deletion process 1226 which asks the user which originating node 1146 the link should be removed from, asks the user to select a link-type 1148 to be removed and asks the user to select one or more destination nodes from which the link should be removed by presenting a menu of nodes 1146 currently connected to the first node via the selected link-type 1148. Preferred link deletion process 1226 then removes the links and updates the data structures of affected nodes 1146.

In the preferred SNETS system, new link-types 1148 may be added to the semantic net at any time using link-type addition process 1220 which is essentially equivalent to link-type definition process 1198. Link-types may be removed using preferred link-type deletion process 1222 which presents a menu of current link-types and asks the user to select the link-type to be removed. Preferred link-type link removal process 1224 then removes all links of the deleted link-type from the semantic net 1180 and updates affected nodes 1146.

In the preferred embodiment, there are a number of alterations which may be made to a node 1146 by selecting the node and choosing a function from a menu of options. For example, preferred net alteration process 1182 allows a user to edit the synonyms 1160 for the node, change the node-label 1154, view a text representation of the node, view the node's data structure, view a more abstract representation of the semantic net 1180 surrounding the node by decreasing scale and removing some links so that the overall structure is more visible, view all nodes residing in the current node's knowledge base 1164 and remove, add or replace all links originating from the current node. Preferably, modifying or viewing data structures can be accomplished in a straightforward manner using the data structures described above, and modifying links may be accomplished using link-modifying code described above.

Net Display Process 1186

Figure 81:
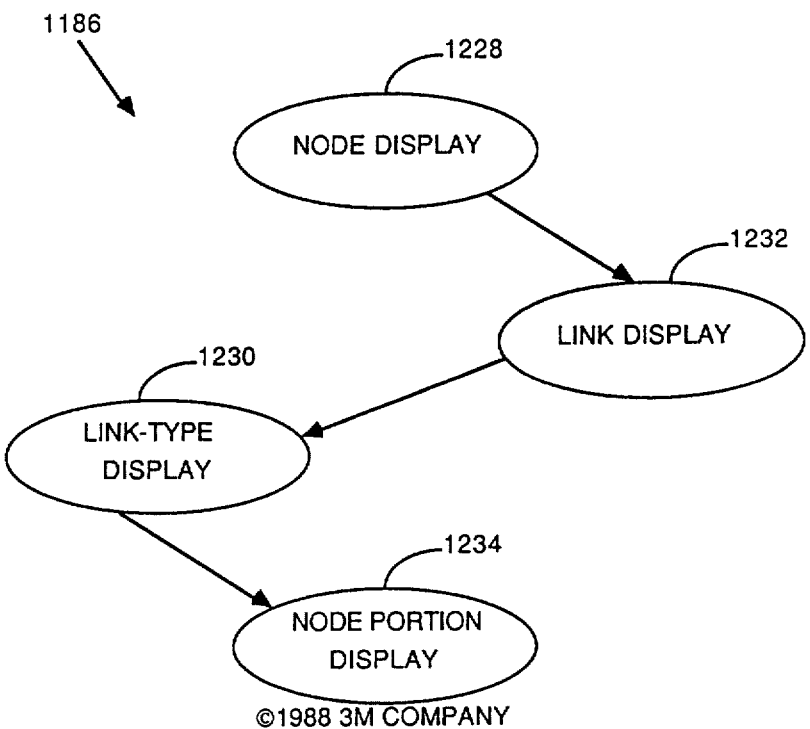
FIG. 81 illustrates net display processes.

Preferred net display process 1186 (FIG. 81) presents to a user a display of part or all of a semantic net 1180 (as controlled by node portion display process 1234) similar to that in FIG. 74, including a display of nodes 1146 (node display process 1228), links 1150 (link display process 1232), and link-types 1148 (link-type display process 1230). Preferred node display process 1228 displays nodes in the semantic net, link display process 1232 displays links between nodes in the semantic net, link-type display process 1230 displays a link-type for each link in the semantic net, and node portion display process 1234 selectively displays a center node and nodes and links which emanate from the center node.

Preferred node display process 1228 collects information on nodes 1146 which should be displayed. Typically node collection will be a function of the portion of the semantic net 1180 which is of interest. Selection of a portion of the semantic net 1180 for display will be described in the section on net navigation process 1188. Once a portion has been selected, preferred node display process 1228 may search through node data structures 1145 to gather a list of nodes 1146 for presentation. Preferred link display process 1232 may use the same information to gather links 1150 for display. Preferred link-type display process 1230 checks the list of links for display, determines which link-types 1148 are involved, and places the link-types 1148 into an index 1144. Preferred node portion display process 1234 takes information about nodes 1146, links 1150 and link-types 1148 to be displayed and places them into a format appropriate for the particular graphing package currently in use; it may also pass along information about which node 1146 should be placed in the center of the display, if such information is available.

The preferred SNETS system may be built on top of a standard graphing package such as Xerox Corporation's software sold under the name "Grapher". Such software packages often have options for display formats and these may be offered to the user of the SNETS system. For example, there may be options for node font, separation between nodes, patterns such as lattice and forest, and orientation such as horizontal and vertical. In the preferred SNETS system the user also is given the option to view information in a table format which provides a textual rather than a graphical representation.

To illustrate a typical display process, Xerox Corporation's software sold under the name "Grapher" may be used as an example. With this software, the "Grapher" system is passed a list of node records which include the fields: node.id which is a label to be displayed, tonodeid.list which includes links from the node and the nodes to which they attach along with the width and dashing of the displayed link, node.font which is a font used to display the node.label, boxes?- which is a boolean variable indicating whether a box should be included around the label, border which is the width of the line used to draw the box, a node.separation value which specifies the distance between displayed nodes, and graph format specifications such as forest or lattice.

In the preferred embodiment, once information has been passed to the underlying graphing package, the package is used to display the appropriate portion of the semantic net 1180. For example, the "Grapher" system determines the layout and will display the net in a window.

Net Navigation Process 1188

Figure 82:
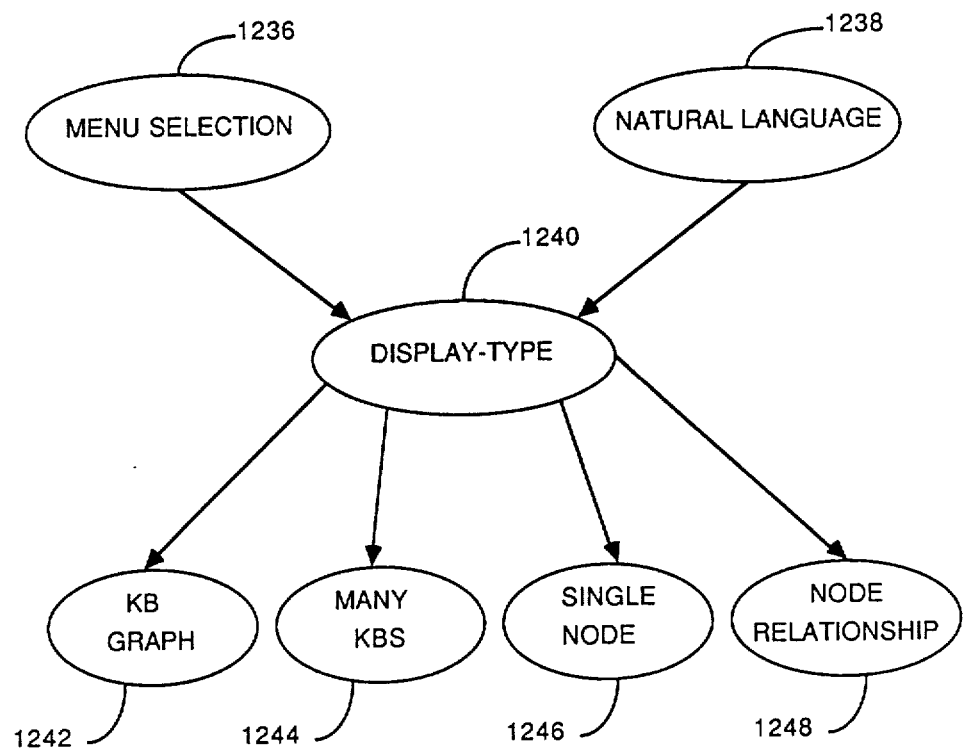
FIG. 82 illustrates net navigation processes involving menu selection and natural language processes.

Preferred net navigation process 1188 (see FIG. 82) allows a user to browse through a semantic net 1180 by, for example, selecting different views of the semantic net 1180. In the preferred embodiment, a user may make display decisions through menu selection (menu selection process 1236 which allows a user to select the center node and to filter out nodes and link-types by making selections from a menu) or a natural language interface (natural language process 1238 which allows a user to select the center node and to filter out nodes and link-types by using natural language). Preferred menu selection process 1236 may present a menu of options or allow a user to select options from a current display screen.

Preferred natural language process 1238 allows a user to enter English-like written commands to give instructions or ask questions about specific semantic nets 1180;

it works by looking at the first word of each sentence to see if it is a key word which it recognizes as a command. For example, a sentence beginning with "show" or "display" would indicate that some type of display is expected. The word "relationship" indicates a request to see connections between two nodes 1146; "tell" or "what" calls for text-based information. In the preferred embodiment, a typical process to handle natural language input is the following:

asks a user to select several kbs 1164 and displays their nodes 1146 and links 1150.

Figure 83:
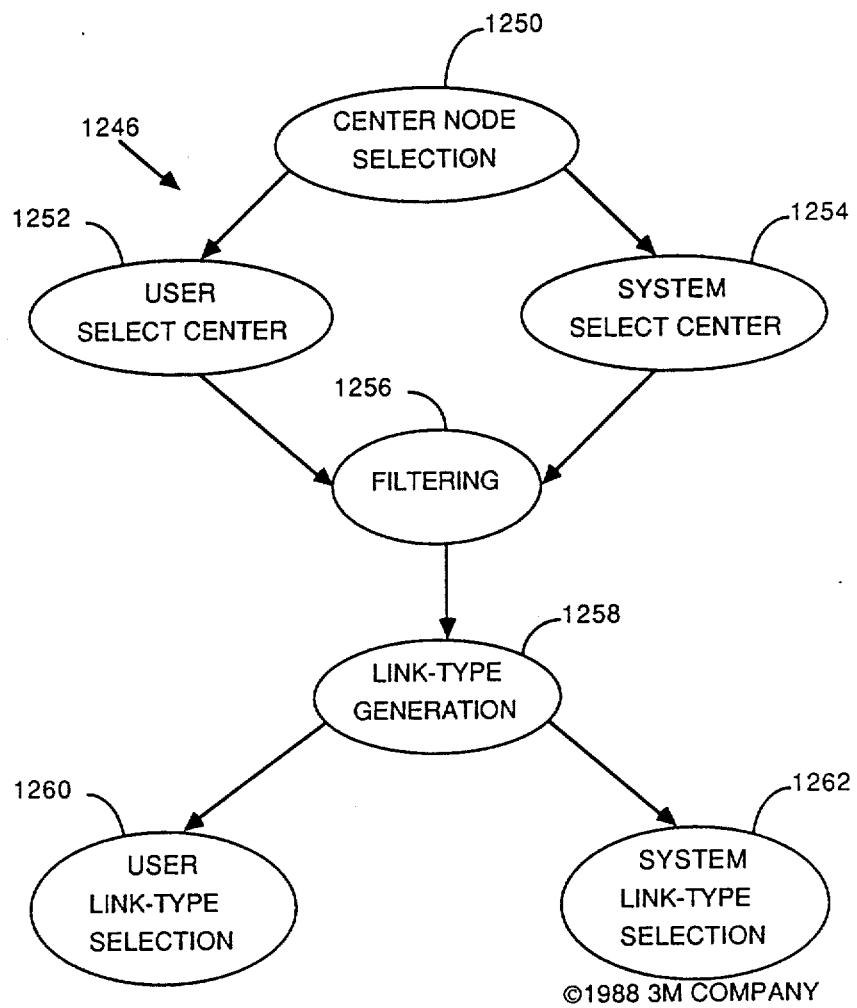
FIG. 83 illustrates net navigation processes involving filtering processes.

Preferred single node process 1246 (FIG. 83) allows a user to select a center node 1146, one or more link-types 1148 and a depth and displays that portion of the semantic net 1180 which is connected to the center node 1146 via the link-types 1148 to the selected depth.

Preferred center node selection process 1250 can select a center node for the semantic net display by

```
[define WORD-DRIVER 1263
(* use key word analysis to determine portion of semantic net 1180 to display given a
query)
If query begins with "what", "tell", "show", "display" or "describe" then
If the query starts with "what if" or "what are" then substitute "show" for "what if"
or "what are"
If there is a general ("related", "linked") or specific (eg. "caused by") relationship
specified in the query then
If the word "and" is in the query then break the query into 2 parts on either
side of the "and"
Remove any noise words (eg. "a", "an") from the query
If the query starts with "tell" or "describe" then
Identify the 2 most frequently cited nodes in the query
If a general relationship was specified in the query then
If there are any links leading away from the 2 most frequently cited nodes
then tell the user about these links
Else display the net between the 2 most frequently cited nodes in the query
Else If a specific relationship was specified in the query then tell the user about
any links of the specified type, which leave the 2 most frequently cited nodes in
the query
Else If the relationship and "and" were found in the query then
given the 2 parts on either side of the "and", find the most frequently cited node in
each part and display the portion of the net between the 2 nodes
Else If there are at least 2 nodes specified in the query then display the net between
the 2 most frequently cited nodes in the query
Else If there is at least 1 node specified in the query then display the node and the
portion of the net within 3 links of it.]
```

Another feature of preferred natural language process 1238 is the ability to recognize misspellings of typed input; if a label is entered which cannot be found in the SNETS system, it will search for similar names and ask the user if one of them is the desired label. In the preferred embodiment, a list of key words is stored in a central location and used to interpret input commands; spelling checking is accomplished by storing a list of nodes 1146 and comparing potential node names to the list. Several similarity algorithms could be used for spelling checking depending upon the complexity desired. For example, one might simply compare the number of letters which are the same in target and list words or devise an algorithm which takes into account both letter and position.

Menu and natural language input options are available in most processes described below. The remainder of the preferred processes allow a user to select portions of a semantic net 1180 for display.

Preferred display-type process 1240 allows a user to select display options including viewing all portions of a semantic net 1180 residing in a single kb 1164 (kb graph process 1242) or multiple kbs (many kbs process 1244), viewing that portion of the semantic net 1180 that is connected to a particular node 1146 (single node proces 1246), and viewing that portion of a semantic net 1180 which connects two selected nodes 1146 (node relationship process 1248).

In order to view a single kb 1164, preferred kb graph process 1242 requests the name of the kb of interest, accesses the nodes 1146 and links 1150 in the kb and feeds them to net display process 1186 for presentation. In a similar fashion, preferred many kbs process 1244 calling user select center process 1252 to allow a user to select a center node 1146. As described above, this may be done through either a menu or natural language interface. A preferred alternative method of selecting a center is through system select center process 1254 which allows the system to select the center node using the current context. Preferably, this method would be used when the SNETS system is called from another system. For example, a user browsing through information on cars in the Space Explorer system might wish to see a semantic net 1180 on car parts. In the preferred embodiment, a call to the SNETS system may be made and the particular car being examined at the time of the call may be passed to the SNETS system; if the car is a valid node 1146 it may be selected to be a center.

After selecting a center, preferred filtering process 1256 (which displays for the user a portion of the semantic net by filtering out nodes and link-types) may be used to select link-types desired for presentation. For example, a user may choose to see only the portion of a semantic net 1180 which includes causal links. Preferred link-type generation process 1258 generates a list of available link-types 1148 by accessing current-links 1168 (FIG. 77). Next, either the system (system link-type selection process 1262) or user (user link-type selection process 1260) may select link-types for inclusion in a display. Preferred system link-type selection process 1262 allows the system to generate a list of desired link-types for presentation from the list of available link-types using the current context. Preferred process 1262 typically uses information from a calling system in a manner similar to that in the car example described above where the call is made from the Space Explorer system. For example, if a user exploring cars with the Space Explorer system requests information on "car parts", system link-type selection process 1262 may search for link-types such as "is-a" and "part-of."

Preferred user link-type selection process 1260 allows the user to generate a list of desired link-types for presentation from the list of available link-types. Preferred process 1260 typically provides a menu of link-types 1148 and asks a user to select the link-types 1148 of interest.

Another preferred method of viewing information in semantic nets 1180 is allowing a user to select two nodes 1146 and to request that portion of the semantic net 1180 which connects the nodes 1146. Preferred node relationship process 1248 handles this viewing method by asking the user to select two nodes 1146. In the preferred embodiment, if both nodes 1146 reside in the same kb 1164 and the kb 1164 is small, a complete search through the kb 1164 is made, and connections between the nodes 1146 are displayed. If the kb 1164 is large, preferred node relationship process 1248 uses the indexes which are stored in control-semantic-nets 1166 (FIG. 77) to narrow the search.

Calls to External Processes Process 1184

In the preferred embodiment, a node 1146 may contain information on processes which relate to it. For example, the node 1146 illustrated in FIG. 75 has a related-equation slot 1162 indicating that it is related to a Living Equations System module on Ohm's law. When information on related modules is available, and a user selects a node 1146, preferred calls to external processes process 1184 provides the user with the option to exit the SNETS module temporarily and to explore related information via the selected presentation mode 166 (FIG. 2). For example, a user may be browsing through a sematic net 1180 on the subject of heart disease and might select a node labelled "aorta." Preferred calls to external processes process 1184 might indicate that a Focus system session on visual perspectives of the aorta is available to the user.

Calls from External Processes Process 1190

As described above, calls may be to the SNETS system from other presentation modes 166. The individual presentation modes 166 preferably interact with the User Modeling system to determine when to make SNETS system calls. Preferred calls from external processes process 1190 receives information from calling processes and uses the information to determine what portion of a semantic net 1180 to display. This was the net navigation process section 1188.

We claim:

1. A computerized information presentation system for dynamically organizing information in order to present to a user previously unrecognized relationships among portions of the information and for presenting techniques for navigation through the information comprising:
    information description means for storing information comprising a plurality of concepts, the information description means comprising means for storing for each concept knowledge of allowable attributes for the concept and one or more of attributes, attribute values, and relationships among attributes and attribute values;
    categorization knowledge means for storing knowledge of criteria for placing the concepts into categories;
    context determination means for determining a context based on system state;
    mapping knowledge means for storing knowledge of mappings between a context and the presentation of information; and
    dynamic categorization means for dynamically placing the concepts into categories for presentation using the categorization criteria, the context and the knowledge of mappings and for displaying on a user screen selected concepts and categories.

2. The system of claim 1 wherein the context determination means comprises:
    user modeling means for generating a user model of the user's state of knowledge and the user's preferences by observing and analyzing the activities and goals of the user; and
    system state means for generating a system model related to the information presentation by observing and analyzing states of the system.

3. The system of claim 2 wherein the dynamic categorization means comprises:
    presentation mode selection means for selecting a presentation mode for use in display of the concepts;
    concept constraint means for generating a presentation list of concepts to be displayed to the user and for constraining the concepts in the presentation list by the presentation mode and the context;
    category organization means for generating a concept organization of concepts in the presentation list and for constraining the concept organization by the presentation mode and a context;
    concept display means for displaying a portion of the concepts in the presentation list and the concept organization to the user and for constraining the concept display by the presentation mode and a context; and
    navigation means for allowing the user to navigate through the concepts comprising:
        navigation selection means for selecting techniques available to the user to navigate through the concepts and for constraining the techniques by a context and the presentation mode; and
        navigation use means for using a navigation technique to navigate through the concepts by dynamically re-organizing the concepts.

4. The system of claim 3 wherein the presentation mode selection means comprises:
    user mode selection means for allowing the user to select the presentation mode;
    system mode selection means for allowing the system to select the presentation mode using the knowledge of mappings and a particular context; and
    presentation mode relationship means for determining relationships between presentation modes and for determining methods of moving between presentation modes.

5. The system of claim 4 wherein the system mode selection means comprises means for selecting the presentation mode which best matches the user's goals.

6. The system of claim 3 wherein the concept display means comprises:
    information access means for allowing the user to request information which bears a relationship to a concept, the concept and the relationship being selected by the user; and information generation means for generating a list of concepts which bears the selected relationship to the selected concept.

7. The system of claim 6 wherein the concept display means further comprises information constraint means for removing concepts from the generated list of concepts which do not match the user model.

8. The system of claim 6 wherein the concept display means further comprises displayform selection means for using the user model to select a displayform for a concept which matches the user's preferences.

9. The system of claim 8 wherein the displayform selection means comprises means for selecting a displayform from a group comprising text, graphical displays, motion sequences, auditory sequences and pictures.

10. The system of claim 3 wherein the dynamic categorization means comprises means for organizing the concepts into an n-dimensional space.

11. The system of claim 10 wherein the information description means comprises:
   means for storing information on dimensions of interest;
   means for storing information on useful dimensions; and
   means for storing information on rank-ordering of dimensions.

12. The system of claim 10 wherein:
   the concept constraint means comprises dimensioned-concept constraint means for generating a dimensioned-presentation list of dimensioned-concepts to be presented in an n-dimensional space;
   the category organization means comprises dimension organization means for organizing the dimensioned-presentation list into an n-dimensional space;
   the concept display means comprises dimension presentation means for displaying for the user a plurality of concepts simultaneously including a conceptual center concept and a plurality of satellite concepts which are organized by dimensions; and
   the navigation means comprises navigation-dimension means for presenting the user with a technique of navigating through the dimensions.

13. The system of claim 12 wherein the dimensioned-concept constraint means comprises:
   generate allowable concepts means for generating a list of allowable dimensioned-concepts for the presentation mode and the current context;
   organize allowable concepts means for organizing the allowable dimensioned-concepts according to their attributes and attribute values and for generating a list of attributes and attribute values;
   user constraint means for presenting the list of attributes and attribute values and for allowing the user to remove attribute values from the list;
   system constraint means for system removal of attribute values from the list;
   attribute removal means for removing attributes which no longer have attribute values following removal of attribute values from the list;
   attribute constraint means for determining constraints which are placed on remaining attributes when one or more attributes have been removed from the list and for removing additional attributes based on the constraints;
   concept de-selection means for generating the dimensioned-presentation list by removing concepts from the list of allowable dimensioned-concepts which have attributes and attribute values that have been removed by the user constraint means and the system constraint means; and
   dimension de-selection means for using the knowledge of mappings to remove from the list of allowable dimensions the dimensions for which there are no concepts in the dimensioned-presentation list.

14. The system of claim 12 wherein the dimension organization means comprises:
   criteria determination means for using the knowledge of mappings to generate a list of attributes and attribute values to be used for concept organization in the particular context;
   attribute prioritization means for using the knowledge of mappings to generate a general prioritized list of attributes and attribute values from the list of attributes and attribute values generated by the criteria determination means;
   center concept selection means for using the knowledge of mappings to search through the list of dimensioned-concepts to find a concept which is a conceptual center of the n-dimensional space;
   dimension concept selection means for searching through the dimensioned-presentation list of dimensioned-concepts to find a concept for each satellite comprising:
      dimension definition means for comparing the general prioritized list of attributes and attribute values to the conceptual center to generate a satellite prioritized list of attributes and attribute values for each satellite; and
      dimension concept search means for using the satellite prioritized list of attributes and attribute values for each satellite to search for a concept for the satellite; and
   method selection means for allowing the system or the user to select a search method to be used by the dimension concept search means.

15. The system of claim 12 wherein the dimension presentation means comprises:
   layout means for placing the conceptual center of the n-dimensional space on the user screen surrounded by satellites which each differ from the center along one dimension; and
   layout selection means for selecting a screen layout appropriate for the number of dimensions to be explored.

16. The system of claim 12 wherein the navigation-dimension means comprises means for allowing the user to navigate through the n-dimensional space by dynamically reorganizing the concepts comprising:
   center alteration means for allowing the user to change the conceptual center of the n-dimensional space;
   dimension re-specification means for generating a new prioritized list of attributes and attribute values for each dimension based on the new conceptual center selected using the center alteration means; and
   satellite concept re-selection means for selecting a new concept for a satellite by searching through the dimensioned-presentation list of dimensioned-concepts using the new prioritized list of attributes and attribute values for the corresponding dimension.

17. The system of claim 16 wherein the center alteration means comprises:

satellite change means for allowing the user to alter the conceptual center of the n-dimensional space by selecting a satellite concept to be moved from a satellite to the conceptual center;

satellite-value change means for allowing the user to re-define an attribute value of a satellite comprising:

select from satellite means for selecting an attribute value for the satellite;

dimension re-definition means for generating a difference list of prioritized attributes and attribute values which define the difference between the conceptual center of the n-dimensional space and the new attribute value for the satellite; and center re-selection means for searching for a conceptual center of the n-dimensional space using the difference list; and center direct change means for allowing the user to select a conceptual center from the dimensioned-presentation list.

18. The system of claim 3 wherein the dynamic categorization means comprises means for organizing concepts by their degree of similarity.

19. The system of claim 18 wherein the dynamic categorization means further comprises:

similarity generation means for generating a plurality of definitions of similarity; and similarity selection means for selecting a similarity definition.

20. The system of claim 19 wherein the similarity generation means comprises:

similarity attribute selection means for generating a list of selected attributes for use in a definition of similarity;

similarity attribute value selection means for generating a list of selected attribute values for use in the definition of similarity; and similarity weighting means for generating a weighting of members of the list of selected attributes and the list of selected attribute values for use in the definition of similarity.

21. The system of claim 20 wherein the similarity generation means further comprises user definition means comprising:

user change means for allowing the user to change the definition of similarity by altering the list of selected attributes, the list of selected attribute values or the weighting; and user define means for allowing the user to generate a new definition of similarity by specifying a new list of selected attributes, a new list of selected attribute values and a new weighting.

22. The system of claim 20 wherein:

the concept constraint means comprises similarity-concept constraint means for generating a similarity-presentation list of similarity-concepts to be presented and for selecting a top concept;

the category organization means comprises similiarity organization means for organizing the similarity-presentation list by degree of similarity of concepts to the top concept using the weighting;

the concept display means comprises similarity presentation means for displaying for the user a plurality of concepts simultaneously including a top concept and a plurality of related concepts which are organized by similarity to the top concept; and the navigation means comprises navigation-similarity means for presenting the user with a technique of navigating through the similarity-concepts.

23. The system of claim 22 wherein the similarity-concept constraint means comprises:

system similarity-list construction means for allowing the system to generate the similarity-presentation list of similarity-concepts using a particular context;

user similarity-list construction means for allowing the user to generate the similarity-presentation list of similarity-concepts;

system top-selection means for allowing the system to select the top concept using a particular context; and user top-selection means for allowing the user to select the top concept.

24. The system of claim 22 wherein the similarity organization means comprises:

weighting retrieval means for accessing a current weighting for the selected similarity definition; and rank ordering means for comparing the top concept to additional similarity-concepts in the similarity-presentation list using the current weighting, for using the comparison to generate a rank-ordered list of the similarity-concepts on a similarity scale, and for assigning a rank ordering to each similarity-concept.

25. The system of claim 24 wherein the similarity presentation means comprises:

ranking selection means for selecting a ranking cutoff comprising a minimum ranking a similarity-concept must have in order to be presented to the user;

similarity-concept presentation means for displaying the top concept and the similiarity-concepts which exceed the ranking cutoff; and ranking presentation means for presenting the selected similarity definition and the rank orderings for the similarity-concepts.

26. The system of claim 24 wherein the navigation-similarity means comprises:

top concept alteration means for allowing the user to select a new top concept;

definition alteration means for allowing the user to select a new similarity definition; and similarity re-specification means for generating a new rank-ordering of similarity-concepts following selection of the new top concept or the new similarity definition.

27. The system of claim 19 wherein the similarity selection means comprises:

user select means for allowing the user to select a definition of similarity; and system select means for allowing the system to select a definition of similarity using a particular context.

28. The system of claim 3 wherein the dynamic categorization means comprises means for organizing the concepts by perspectives.

29. The system of claim 28 wherein the dynamic categorization means further comprises:

perspective description means for defining a perspective as a conjunction of attribute values comprising one attribute value for each attribute in the perspective;

perspective organization means for organizing perspectives into perspective categories including physical perspectives and functional perspectives, physical perspectives comprising perspectives which are organized by physical relationships, functional perspectives comprising perspectives which are organized by functional relationships.

30. The system of claim 29 wherein the perspective organization means comprises perspective-type organization means for organizing perspective categories into a plurality of perspective-types within each category.

31. The system of claim 30 wherein:
the concept constraint means comprises perspective constraint
means comprising:
concept-perspective selection means for generating a perspective list of perspective-concepts which represents different perspectives of a focal concept;
perspective category selection means for selecting a perspective category; and
perspective-type selection means for generating a list of perspective-types by selecting one or more perspective-types from the perspective category;
the category organization means comprises perspective organization means for organizing the perspective list of perspective-concepts according to the selected perspective-types;
the concept display means comprises perspective presentation means for displaying to the user one or more concepts and their perspectives organized by perspective-type; and
the navigation means comprises navigation-perspective means for presenting the user with a technique of navigating through the perspectives.

32. The system of claim 31 wherein:
the concept-perspective selection means comprises:
focal concept selection means for selection of a focal concept; and
related concept selection means for generating a list of related concepts which are related to the focal concept; and
the perspective-type selection means comprises:
perspective-type generation means for generating a list of allowable perspective-types which map onto the focal concept, allowable perspective-types being constrained by the perspective category; and
perspective-type constraint means for generating a list of desired perspective-types by selecting one or more perspective-types from the list of allowable perspective-types.

33. The system of calim 31 wherein the perspective organization means comprises:
criteria determination means for using the knowledge of mappings to generate a list of allowable attributes and attribute values for the selected perspective-types;
attribute prioritization means for using the knowledge of mappings to generate a prioritized list of attributes and attribute values from the list of allowable attributes and attribute values;
standard perspective selection means for selecting a standard perspective for the selected perspective-types; and
search method means for searching for a concept which matches the standard perspective using the prioritized list of attributes and attribute values.

34. The system of claim 31 wherein the perspective presentation means comprises:
concept-perspective presentation means for displaying a concept representing a perspective;
perspective display means for displaying the concept's perspective as a conjunction of attribute values;
perspective relationship presentation means for displaying relationships between the selected perspective-types.

35. The system of claim 31 wherein the perspective presentation means comprises display two concepts means for displaying at least two concepts simultaneously.

36. The system of claim 31 wherein the navigation-perspective means comprises means for allowing the user to navigate through perspectives comprising:
perspective manipulation means comprising:
perspective-category alteration means for allowing the user or the system to change the perspective category;
perspective-type alteration means for allowing the user or the system to generate a new list of perspective-types; and
perspective alteration means for changing the perspective;
perspective re-organization means for dynamically re-organizing the perspective list of perspective-concepts following a change in perspective-category, perspective-types or perspective;
perspective re-selection means for selecting a new perspective to match the dynamically re-organized perspective list;
concept re-selection means for selecting a concept to match the new perspective; and
perspective displayform alteration means for allowing the user to determine whether one or more concepts will be displayed simultaneously.

37. The system of claim 36 wherein the perspective manipulation means further comprises:
category-based alteration means for selecting a new perspective to match a change in perspective-category within a particular context;
type-based alteration means for selecting a new perspective to match a change in perspective-type within a particular context; and
direct perspective alteration means for allowing the user or the system to select a new perspective by selecting a new attribute value.

38. The system of claim 29 wherein the perspective organization means comprises:
attribute value relationship means for describing relationships among attribute values; and
attribute relationship means for describing relationships among attributes.

39. The system of claim 38 wherein the perspective organization means further comprises perspective physical relationship means for describing a physical perspective as a conjunction of attribute value physical relationships and attribute physical relationships.

40. The system of claim 38 wherein the perspective organization means further comprises perspective functional relationship means for describing a functional perspective as a conjunction of attribute value functional relationships and attribute functional relationships.

41. The system of claim 3 wherein the dynamic categorization means comprises means for organizing the concepts by their graphical representations.

42. The system of claim 41 wherein the dynamic categorization means further comprises:

graphical representation means for generating graphical representations of the concepts;

decomposition means for decomposing a graphical representation into a number of sub-components; and allowable change means for generating a list of allowable changes for a sub-component, allowable changes comprising changes which the user may make to the sub-component in a particular context.

43. The system of claim 42 wherein:

the concept constraint means comprises image-concept constraint means for generating an image presentation list of image-concepts which may be presented, and for selecting a pivotal image-concept;

the category organization means comprises image organization means for generating an organization among the image-concepts based on relationships among the image-concepts' graphical representations;

the concept display means comprises image presentation means for displaying for the user the pivotal image-concept and the pivotal image-concept's graphical representation; and the navigation means comprises navigation-image means for presenting the user with a technique of navigating through the image-concepts.

44. The system of claim 43 wherein the image-concept constraint means comprises:

user select pivotal means for allowing the user to select the pivotal image-concept; and system select pivotal means for allowing the system to select the pivotal image-concept using the knowledge of mappings and a particular context.

45. The system of claim 43 wherein the image-concept constraint means comprises list generation means comprising:

related image means for generating a list of related concepts which bear a graphical relationship to the pivotal concept; and list constraint means for generating the image-presentation list by removing concepts from the list of related concepts which do not match the user model.

46. The system of claim 43 wherein the image organization means comprises:

sub-component access means for generating a list of pivotal-concept sub-components; and sub-component organization means for generating a sub-list of image-concepts for each pivotal-concept sub-component, the sub-list comprising the image-concepts which relate to the pivotal-concept sub-component.

47. The system of claim 46 wherein the navigation-image means comprises:

manipulation means for allowing the user to manipulate a sub-component of the pivotal-concept;

temporary representation means for generating a temporary graphical representation of the pivotal-concept incorporating the manipulation of the sub-component;

concept retrieval means for accessing the sub-list of image-concepts for the manipulated sub-component;

prioritization means for generating a list of rankings of members of the sub-list of image-concepts based on similarity between the temporary graphical representation and the graphical representation of each member of the sub-list; and select new image means for selecting the image-concept with the highest ranking in the list of rankings and for making it a new pivotal image-concept.

48. The system of claim 3 wherein the dynamic categorization means comprises equation constraint means for organizing the concepts into a manipulable, graphical representation of an equation.

49. The system of claim 48 wherein the equation constraint means comprises:

available equation means for generating a list of available equations, the list comprising equations which are available to the system;

equation-concept relationship means for determining relationships between equations and the concepts; and equation selection means for selecting the equation to be displayed.

50. The system of claim 49 wherein the equation-concept relationship means comprises:

relationship determination means for determining whether a relationship exists between an equation and a concept; and relationship type means for determining a relationship type for the relationship.

51. The system of claim 49 wherein the equation selection means comprises:

current concept means for generating a list of current concepts comprising concepts which are available in the current context;

equation constraint means for generating a list of related equations, the list comprising the equations which are related to the concepts in the list of current concepts;

user equation selection means for allowing the user to select the equation from the list of related equations; and system equation selection means for allowing the system to select the equation from the list of related equations based on a particular context.

52. The system of claim 51 wherein the system equation selection means comprises:

attention concept selection means for selecting an attention concept comprising the concept which has been manipulated most recently by the system or the user;

equation list constraint means for generating a constrained equation list by removing equations from the list of related equations which have no relationship to the attention concept;

prioritized equation list means for generating a prioritized equation list by rating equations in the constrained equation list using their relationship to the attention concept; and final equation selection means for selecting the equation by finding an equation from the prioritized equation list with a maximum priority rating.

53. The system of claim 52 wherein the concept display means comprises equation display means comprising:

term display means for displaying terms of the equation;

term relationship display means for displaying relationships among the terms;

value display means for displaying values for the terms;

unit display means for displaying units for the terms;

definition display means for displaying definitions of the terms; and equation display mode means comprising:
  numeric display means for displaying the equation in numeric form; and
  graphical display means for displaying the equation in graphical form.

54. The system of claim 53 wherein the value display means comprises:
  typical value means for generating typical values for the terms;
  related value means for generating related values for the terms which relate to the attention concept; and
  value selection means for determining whether to display the typical values or the related values.

55. The system of claim 53 wherein the navigation means comprises equation navigation means comprising:
  value alteration means for allowing the user to select a new term value by manipulating a term value in the graphical form or by manipulating a term value in the numeric form;
  value direct reconfiguration means for adjusting remaining term values when a new term value is selected by the user;
  unit alteration means for allowing the user to select a new unit;
  value unit alteration means for adjusting the term values when the new unit is selected;
  unit reconfiguration means for adjusting the units when the new unit is selected;
  form manipulation means for allowing the user to perform a form manipulation by replacing a term on the left side of the equation with a term from the right side of the equation;
  value form reconfiguration means for adjusting term values after form manipulation; and
  unit form reconfiguration means for adjusting units after form manipulation.

56. The system of claim 3 wherein the dynamic categorization means comprises means for organizing the concepts into a semantic net.

57. The system of claim 56 wherein the means for organizing the concepts into a semantic net comprises:
  net building means for building the semantic net;
  net alteration means for altering the semantic net;
  net display means for displaying the semantic net; and
  net navigation means for navigating through the semantic net.

58. The system of claim 57 wherein the net building means comprises:
  concept net definition means for generating a list of net concepts to be placed in the semantic net;
  relationship net definition means for generating a list of net relationships to be used in the semantic net;
  node definition means for generating a node for each net concept in the list of net concepts;
  link-type definition means for generating a link-type for each relationship in the list of net relationships; and
  relationship placement means for adding a link between two nodes by defining a relationship between two concepts.

59. The system of claim 57 wherein the net alteration means comprises:
  node addition means for adding a node to the semantic net, the node to be added being an add node;
  node deletion means for deleting a node from the semantic net, the node to be deleted being a delete node;
  link addition means for placing a link between two nodes in the semantic net, the link to be added being an add link;
  link deletion means for deleting a link between two nodes in the semantic net, the link to be deleted being a delete link;
  link-type addition means for adding a link-type to the semantic net, the link-type to be added being an add link-type; and
  link-type deletion means for removing a link-type from the semantic net, the link-type to be removed being a delete link-type.

60. The system of claim 59 wherein the node addition means comprises:
  node check means for prohibiting the user from adding an add node to the semantic net which already exists in the semantic net; and
  node find means for displaying a portion of the semantic net which contains the add node.

61. The system of claim 59 wherein the node deletion means comprises:
  node removal means for removing a delete node from the semantic net; and
  node link removal means for removing links connected to the delete node in the semantic net.

62. The system of claim 59 wherein the link addition means comprises:
  link check means for prohibiting the user from adding between two nodes an add link which already exists in the semantic net; and
  link find means for displaying a portion of the semantic net which contains the add link.

63. The system of claim 59 wherein the link-type deletion means comprises link-type link removal means for removing links of the delete link-type from the semantic net.

64. The system of claim 57 wherein the net display means comprises:
  node display means for displaying nodes in the semantic net;
  link display means for displaying links between nodes in the semantic net;
  link-type display means for displaying a link-type for each link in the semantic net; and
  node portion display means for selectively displaying a center node and for displaying nodes and links which emanate from the center node.

65. The system of claim 57 wherein the net navigation means comprises:
  center node selection means for selecting a center node for the semantic net display; and
  filtering means for displaying for the user a portion of the semantic net by filtering out nodes and link-types.

66. The system of claim 65 wherein the net navigation means further comprises:
  menu selection means for allowing the user to select the center node and to filter out nodes and link-types by making selections from a menu; and
  natural language means for allowing the user to select the center node and for filtering out nodes and link-types by using natural language.

67. The system of claim 65 wherein the center node selection means comprises:
  user select center means for allowing the user to select the center node; and
  system select center means for allowing the system to select the center node using the current context.

68. The system of claim 65 wherein the filtering means comprises:
- link-type generation means for generating a list of available link-types;
- user link-type selection means for allowing the user to generate a list of desired link-types for presentation from the list of available link-types; and
- system link-type selection means for allowing the system to generate a list of desired link-types for presentation from the list of available link-types using the current context.

69. The system of claim 2 wherein the user modeling means comprises means for storing information on available activities, comprising:
- means for storing information on concepts conveyed by an activity;
- means for storing information on concepts tested by an activity;
- means for storing methods to call an activity;
- means for storing methods to monitor user interaction with an activity; and
- means for storing methods to map between user interaction and an activity.

70. The system of claim 2 wherein the user modeling means comprises means for storing a concept network of relationships among concepts.

71. The system of claim 2 wherein the user modeling means comprises:
- means for storing information on concepts studied by the user;
- means for storing information on concepts understood by the user; and
- means for storing information on concepts not understood by the user.

72. The system of claim 71 wherein the user modeling means further comprises concept mapping means for mapping between knowledge about which concepts are understood by the user and selection of concepts to be displayed to the user.

73. The system of claim 2 wherein the user modeling means comprises means for generating a user history, comprising:
- means for acquiring background data about the user;
- means for acquiring information about major activities completed in previous user interaction sessions;
- means for acquiring information about major activities completed in a current session;
- means for acquiring information about a current activity;
- means for acquiring information on the number of times the user engaged in an activity; and
- means for acquiring information on user preferences for presentation mode, navigation technique and displayform.

74. The system of claim 73 wherein the user modeling means further comprises preference mapping means for mapping between activities of the user and the user's preferences for presentation modes, displayforms and techniques of navigation.

75. The system of claim 2 wherein the user modeling means comprises means for acquiring temporal information relating to the user's interaction with the system.

76. The system of claim 75 wherein the means for acquiring temporal information comprises:
- means for acquiring information about the user's response time while interacting with the system;
- means for acquiring information about amount of time spent by the user in particular activities; and
- means for acquiring information about temporal sequencing of the user's activities.

77. The system of claim 1 wherein the information description means comprises means for storing multi-media representations corresponding to multiple sensory modalities of the concepts and for storing methods to access the multi-media representations.

78. The system of claim 1 wherein the information description means comprises means for storing textual descriptions of the concepts.

79. The system of claim 1 wherein the information description means comprises means for storing pictorial representations of the concepts.

80. The system of claim 1 wherein the information description means comprises means for storing motion-sequence representations of the concepts.

81. The system of claim 1 wherein the information description means comprises means for storing graphic representations of the concepts.

82. The system of claim 1 wherein the information description means comprises means for storing auditory representations of the concepts.

83. A computerized information presentation system for dynamically organizing information into an n-dimensional space in order to present to a user previously unrecognized relationships among portions of the information and for presenting techniques for navigation through the n-dimensional space comprising:
- information description means for storing information comprising a plurality of dimensioned-concepts, the information description means comprising means for storing for each dimensioned-concept knowledge of allowable attributes for the dimensioned-concept and one or more of attributes, attribute values, and relationships among attributes and attribute values;
- categorization knowledge means for storing knowledge of criteria for placing the dimensioned-concepts into categories suitable for organizing the dimensioned-concepts into an n-dimensional space;
- context determination means for determining a current context based on system state;
- mapping knowledge means for storing knowledge of mappings between a context and the presentation of information; and
- dynamic categorization means for dynamically organizing the dimensioned-concepts into an n-dimensional space using the categorization criteria, the context and the knowledge of mappings and for displaying the n-dimensional space on a user screen.

84. The system of claim 83 wherein the context determination means comprises:
- user modeling means for generating a user model of the user's state of knowledge and the user's preferences by observing and analyzing activities and goals of the user; and
- system state means for generating a system model related to the information presentation by observing and analyzing states of the system.

85. The system of claim 84 wherein the dynamic categorization means further comprises:
- dimensioned-concept constraint means for using a particular context for generating a dimensioned-presentation list of dimensioned-concepts to be presented in an n-dimensional space;

dimension organization means for organizing the dimensioned-presentation list into an n-dimensional space;

dimension presentation means for displaying to the user a plurality of concepts simultaneously including a conceptual center concept and a plurality of satellite concepts which are organized by dimensions; and navigation-dimension means for presenting the user with a technique of navigating through the dimensions and for navigating through the information by dynamically reorganizing the dimensioned-presentation list.

86. The system of claim 85 wherein the dimension presentation means comprises:

information access means for allowing the user to request information which bears a relationship to a concept, the concept and the relationship being selected by the user; and information generation means for generating a list of concepts which bears the selected relationship to the selected concept.

87. The system of claim 86 wherein the dimension presentation means further comprises information constraint means for removing concepts from the generated list of concepts which do not match the user model.

88. The system of claim 86 wherein the dimension presentation means further comprises displayform selection means for using the user model to select a displayform for a concept which matches the user's preferences.

89. The system of claim 88 wherein the displayform selection means comprises means for selecting a displayform from a group comprising text, graphical displays, motion sequences, auditory sequences, and pictures.

90. The system of claim 85 wherein the dimensioned-concept constraint means comprises:

generate allowable concepts means for generating a list of allowable dimensioned-concepts for the current context;

organize allowable concepts means for organizing the allowable dimensioned-concepts according to their attributes and attribute values and for generating a list of attributes and attribute values;

user constraint means for presenting the list of attributes and attribute values and for allowing the user to remove attribute values from the list;

system constraint means for system removal of attribute values from the list;

attribute removal means for removing attributes which no longer have attribute values following removal of attribute values from the list;

attribute constraint means for determining constraints which are placed on remaining attributes when one or more attributes have been removed from the list and for removing additional attributes based on the constraints;

concept de-selection means for generating the dimensioned-presentation list by removing concepts from the list of allowable dimensioned-concepts which have attributes and attribute values that have been removed by the user constraint means and the system constraint means; and dimension de-selection means for using the knowledge of mappings to remove from the list of allowable dimensions the dimensions for which there are no concepts in the dimensioned-presentation list.

91. The system of claim 85 wherein the dimension organization means comprises:

criteria determination means for using the knowledge of mappings to generate a list of attributes and attribute values to be used for concept organization in the particular context;

attribute prioritization means for using the knowledge of mappings to generate a general prioritized list of attributes and attribute values from the list of attributes and attribute values generated by the criteria determination means;

center concept selection means for using the knowledge of mappings to search through the list of dimensioned-concepts to find a concept which is a conceptual center of the n-dimensional space;

dimension concept selection means for searching through the dimensioned-presentation list of dimensioned-concepts to find a concept for each satellite comprising:

dimension definition means for comparing the general prioritized list of attributes and attribute values to the conceptual center to generate a satellite prioritized list of attributes and attribute values for each satellite; and dimension concept search means for using the satellite prioritized list of attributes and attribute values for each satellite to search for a concept for the satellite; and method selection means for allowing the system or the user to select a search method to be used by the dimension concept search means.

92. The system of claim 85 wherein the dimension presentation means comprises:

layout means for placing the conceptual center of the n-dimensional space on the user screen surrounded by satellites which each differ from the center along one dimension; and layout selection means for selecting a screen layout appropriate for the number of dimensions to be explored.

93. The system of claim 85 wherein the navigation-dimension means comprises means for allowing the user to navigate through the n-dimensional space by dynamically reorganizing the concepts comprising:

center alteration means for allowing the user to change the conceptual center of the n-dimensional space;

dimension re-specification means for generating a new prioritized list of attributes and attribute values for each dimension based on the new conceptual center selected using the center alteration means; and satellite concept re-selection means for selecting a new concept for a satellite by searching through the dimensioned-presentation list of dimensioned-concepts using the new prioritized list of attributes and attribute values for the corresponding dimension.

94. The system of claim 93 wherein the center alteration means comprises:

satellite change means for allowing the user to alter the conceptual center of the n-dimensional space by selecting a satellite concept to be moved from a satellite to the conceptual center;

satellite-value change means for allowing the user to re-define an attribute value of a satellite comprising:

select from satellite means for selecting an attribute value for the satellite;

dimension re-definition means for generating a difference list of prioritized attributes and attribute values which define the difference between the conceptual center of the n-dimensional space and the new attribute value for the satellite; and center re-selection means for searching for a conceptual center of the n-dimensional space using the difference list; and center direct change means for allowing the user to select a conceptual center from the dimensioned-presentation list.

95. The system of claim 84 wherein the user modeling means comprises means for storing information on available activities, comprising:

means for storing information on concepts conveyed by an activity;

means for storing information on concepts tested by an activity;

means for storing methods to call an activity;

means for storing methods to monitor user interaction with an activity; and means for storing methods to map between user interaction and an activity.

96. The system of claim 84 wherein the user modeling means comprises means for storing a concept network of relationships among concepts.

97. The system of claim 84 wherein the user modeling means comprises:

means for storing information on concepts studied by the user;

means for storing information on concepts understood by the user; and means for storing information on concepts not understood by the user.

98. The system of claim 97 wherein the user modeling means further comprises concept mapping means for mapping between knowledge about which concepts are understood by the user and selection of concepts to be displayed to the user.

99. The system of claim 84 wherein the user modeling means comprises means for generating a user history, comprising:

means for acquiring background data about the user;

means for acquiring information about major activities completed in previous user interaction sessions;

means for acquiring information about major activities completed in a current session;

means for acquiring information about a current activity;

means for acquiring information on the number of times the user engaged in an activity; and means for acquiring information on user preferences for presentation mode, navigation technique and displayform.

100. The system of claim 98 wherein the user modeling means further comprises preference mapping means for mapping between activities of the user and the user's preferences for displayforms and techniques of navigation.

101. The system of claim 84 wherein the user modeling means comprises means for acquiring temporal information relating to the user's interaction with the system.

102. The system of claim 101 wherein the means for acquiring temporal information comprises:

means for acquiring information about the user's response time while interacting with the system;

means for acquiring information about amount of time spent by the user in particular activities; and means for acquiring information about temporal sequencing of the user's activities.

103. The system of claim 83 wherein the information description means comprises means for storing multi-media representations corresponding to multiple sensory modalities of the concepts and for storing methods to access the multi-media representations.

104. The system of claim 83 wherein the information description means comprises means for storing textual descriptions of the concepts.

105. The system of claim 83 wherein the information description means comprises means for storing pictorial representations of the concepts.

106. The system of claim 83 wherein the information description means comprises means for storing motion-sequence representations of the concepts.

107. The system of claim 83 wherein the information description means comprises means for storing graphic representations of the concepts.

108. The system of claim 83 wherein the information description means comprises means for storing auditory representations of the concepts.

109. The system of claim 83 wherein the information description means comprises:

means for storing information on dimensions of interest;

means for storing information on useful dimensions; and means for storing information on rank-ordering of dimensions.

110. The system of claim 83 wherein the dynamic categorization means further comprises:

dimensioned-concept constraint means for using a particular context for generating a dimensioned-presentation list of dimensioned-concepts to be presented in an n-dimensional space;

dimension organization means for organizing the dimensioned-presentation list into an n-dimensional space;

dimension presentation means for displaying to the user a plurality of concepts simultaneously including a conceptual center concept and a plurality of satellite concepts which are organized by dimensions; and navigation-dimension means for presenting the user with a technique of navigating through the dimensions and for navigating through the information by dynamically reorganizing the dimensioned-presentation list.

111. The system of claim 110 wherein the dimension presentation means comprises:

information access means for allowing the user to request information which bears a relationship to a concept, the concept and the relationship being selected by the user; and information generation means for generating a list of concepts which bears the selected relationship to the selected concept.

112. The system of claim 110 wherein the dimensioned-concept constraint means comprises:

generate allowable concepts means for generating a list of allowable dimensioned-concepts for the current context;

organize allowable concepts means for organizing the allowable dimensioned-concepts according to their attributes and attribute values and for generating a list of attributes and attribute values;

user constraint means for presenting the list of attributes and attribute values and for allowing the user to remove attribute values from the list;

system constraint means for system removal of attribute values from the list;

attribute removal means for removing attributes which no longer have attribute values following removal of attribute values from the list;

attribute constraint means for determining constraints which are placed on remaining attributes when one or more attributes have been removed from the list and for removing additional attributes based on the constraints;

concept de-selection means for generating the dimensioned-presentation list by removing concepts from the list of allowable dimensioned-concepts which have attributes and attribute values that have been removed by the user constraint means and the system constraint means; and dimension de-selection means for using the knowledge of mappings to remove from the list of allowable dimensions the dimensions for which there are no concepts in the dimensioned-presentation list.

113. The system of claim 110 wherein the dimension organization means comprises:

criteria determination means for using the knowledge of mappings to generate a list of attributes and attribute values to be used for concept organization in the particular context;

attribute prioritization means for using the knowledge of mappings to generate a general prioritized list of attributes and attribute values from the list of attributes and attribute values generated by the criteria determination means;

center concept selection means for using the knowledge of mappings to search through the list of dimensioned-concepts to find a concept which is a conceptual center of the n-dimensional space;

dimension concept selection means for searching through the dimensioned-presentation list of dimensioned-concepts to find a concept for each satellite comprising:

dimension definition means for comparing the general prioritized list of attributes and attribute values to the conceptual center to generate a satellite prioritized list of attributes and attribute values for each satellite; and dimension concept search means for using the satellite prioritized list of attributes and attribute values for each satellite to search for a concept for the satellite; and method selection means for allowing the system or the user to select a search method to be used by the dimension concept search means.

114. The system of claim 110 wherein the dimension presentation means comprises:

layout means for placing the conceptual center of the n-dimensional space on the user screen surrounded by satellites which each differ from the center along one dimension; and layout selection means for selecting a screen layout appropriate for the number of dimensions to be explored.

115. The system of claim 110 wherein the navigation-dimension means comprises means for allowing the user to navigate through the n-dimensional space by dynamically reorganizing the concepts comprising:

center alteration means for allowing the user to change the conceptual center of the n-dimensional space;

dimension re-specification means for generating a new prioritized list of attributes and attribute values for each dimension based on the new conceptual center selected using the center alteration means; and satellite concept re-selection means for selecting a new concept for a satellite by searching through the dimensioned-presentation list of dimensioned-concepts using the new prioritized list of attributes and attribute values for the corresponding dimension.

116. The system of claim 115 wherein the center alteration means comprises:

satellite change means for allowing the user to alter the conceptual center of the n-dimensional space by selecting a satellite concept to be moved from a satellite to the conceptual center;

satellite-value change means for allowing the user to re-define an attribute value of a satellite comprising:

select from satellite means for selecting an attribute value for the satellite;

dimension re-definition means for generating a difference list of prioritized attributes and attribute values which define the difference between the conceptual center of the n-dimensional space and the new attribute value for the satellite; and center re-selection means for searching for a conceptual center of the n-dimensional space using the difference list; and center direct change means for allowing the user to select a conceptual center from the dimensioned-presentation list.

117. A computerized information presentation system for dynamically organizing information by similarity in order to present to a user previously unrecognized similarity relationships among portions of the information and for presenting techniques for navigation through the information comprising:

information description means for storing information comprising a plurality of similarity-concepts, the information description means comprising means for storing for each similarity-concept knowledge of allowable attributes for the similarity-concept and one or more of attributes, attribute values, and relationships among attributes and attribute values;

categorization knowledge means for storing knowledge of criteria for placing the similarity-concepts into categories suitable for organizing the similarity-concepts by similarity relationships;

context determination means for determining a current context based on system state;

mapping knowledge means for storing knowledge of mappings between a context and the presentation of information; and dynamic categorization means for dynamically organizing the similarity-concepts by similarity relationships using the categorization criteria, the context and the knowledge of mappings and for displaying similarity relationships on a user screen.

118. The system of claim 117 wherein the context determination means comprises:
  user modeling means for generating a user model of the user's state of knowledge and the user's preferences by observing and analyzing activities and goals of the user; and
  system state means for generating a system model related to the information presentation by observing and analyzing states of the system.

119. The system of claim 118 wherein the user modeling means comprises means for storing information on available activities, comprising:
  means for storing information on concepts conveyed by an activity;
  means for storing information on concepts tested by an activity;
  means for storing methods to call an activity;
  means for storing methods to monitor user interaction with an activity; and
  means for storing methods to map between user interaction and an activity.

120. The system of claim 118 wherein the user modeling means comprises means for storing a concept network of relationships among concepts.

121. The system of claim 118 wherein the user modeling means comprises:
  means for storing information on concepts studied by the user;
  means for storing information on concepts understood by the user; and
  means for storing information on concepts not understood by the user.

122. The system of claim 121 wherein the user modeling means further comprises concept mapping means for mapping between knowledge about which concepts are understood by the user and selection of concepts to be displayed to the user.

123. The system of claim 118 wherein the user modeling means comprises means for generating a user history, comprising:
  means for acquiring background data about the user;
  means for acquiring information about major activities completed in previous user interaction sessions;
  means for acquiring information about major activities completed in a current session;
  means for acquiring information about a current activity;
  means for acquiring information on the number of times the user engaged in an activity; and
  means for acquiring information on user preferences for presentation mode, navigation technique and displayform.

124. The system of claim 123 wherein the user modeling means further comprises preference mapping means for mapping between activities of the user and the user's preferences for displayforms and techniques of navigation.

125. The system of claim 118 wherein the user modeling means comprises means for acquiring temporal information relating to the user's interaction with the system.

126. The system of claim 125 wherein the means for acquiring temporal information comprises:
  means for acquiring information about the user's response time while interacting with the system;
  means for acquiring information about amount of time spent by the user in particular activities; and
  means for acquiring information about temporal sequencing of the user's activities.

127. The system of claim 118 wherein the dynamic categorization means comprises:
  similarity generation means for generating a plurality of definitions of similarity; and
  similarity selection means for selecting a similarity definition.

128. The system of claim 127 wherein the similarity generation means comprises:
  similarity attribute selection means for generating a list of selected attributes for use in a definition of similarity;
  similarity attribute value selection means for generating a list of selected attribute values for use in the definition of similarity; and
  similarity weighting means for generating a weighting of members of the list of selected attributes and the list of selected attribute values for use in the definition of similarity.

129. The system of claim 128 wherein the similarity generation means further comprises user definition means comprising:
  user change means for allowing the user to change the definition of similarity by altering the list of selected attributes, the list of selected attribute values or the weighting; and
  user define means for allowing the user to generate a new definition of similarity by specifying a new list of selected attributes, a new list of selected attribute values and a new weighting.

130. The system of claim 128 wherein the dynamic categorization means further comprises:
  similarity-concept constraint means for generating a similarity-presentation list of similarity-concepts to be presented and for selecting a top concept;
  similiarity organization means for organizing the similarity-presentation list by degree of similarity of concepts to the top concept using the weighting;
  similarity presentation means for displaying for the user a plurality of concepts simultaneously including a top concept and a plurality of related concepts which are organized by similarity to the top concept; and
  navigation-similarity means for presenting the user with a technique of navigating through the similarity-concepts.

131. The system of claim 130 wherein the similarity presentation means comprises:
  information access means for allowing the user to request information which bears a relationship to a concept, the concept and the relationship being selected by the user; and
  information generation means for generating a list of concepts which bears the selected relationship to the selected concept.

132. The system of claim 131 wherein the similarity presentation means further comprises information constraint means for removing concepts from the generated list of concepts which do not match the user model.

133. The system of claim 131 wherein the similarity presentation means further comprises displayform selection means for using the user model to select a displayform for a concept which matches the user's preferences, displayforms comprising text, graphical displays, motion sequences, auditory sequences and pictures.

134. The system of claim 133 wherein the displayform selection means comprises means for selecting a displayform from a group comprising text, graphical displays, motion sequences, auditory sequences and pictures.

135. The system of claim 130 wherein the similarity-concept constraint means comprises:
system similarity-list construction means for allowing the system to generate the similarity-presentation list of similarity-concepts using a particular context;
user similarity-list construction means for allowing the user to generate the similarity-presentation list of similarity-concepts;
system top-selection means for allowing the system to select the top concept using a particular context; and
user top-selection means for allowing the user to select the top concept.

136. The system of claim 130 wherein the similarity organization means comprises:
weighting retrieval means for accessing a current weighting for the selected similarity definition; and
rank ordering means for comparing the top concept to additional similarity-concepts in the similarity-presentation list using the current weighting, for using the comparison to generate a rank-ordered list of the similarity-concepts on a similarity scale, and for assigning a rank ordering to each similarity-concept.

137. The system of claim 136 wherein the similarity presentation means comprises:
ranking selection means for selecting a ranking cutoff comprising a minimum ranking a similarity-concept must have in order to be presented to the user;
similarity-concept presentation means for displaying the top concept and the similarity-concepts which exceed the ranking cutoff; and
ranking presentation means for presenting the selected similarity definition and the rank orderings for the similarity-concepts.

138. The system of claim 136 wherein the navigation-similarity means comprises:
top concept alteration means for allowing the user to select a new top concept;
definition alteration means for allowing the user to select a new similarity definition; and
similarity re-specification means for generating a new rank-ordering of similarity-concepts following selection of the new top concept or the new similarity definition.

139. The system of claim 127 wherein the similarity selection means comprises:
user select means for allowing the user to select a definition of similarity; and
system select means for allowing the system to select a definition of similarity using a particular context.

140. The system of claim 117 wherein the information description means comprises means for storing multi-media representations corresponding to multiple sensory modalities of the concepts and for storing methods to access the multi-media representations.

141. The system of claim 117 wherein the information description means comprises means for storing textual descriptions of the concepts.

142. The system of claim 117 wherein the information description means comprises means for storing pictorial representations of the concepts.

143. The system of claim 117 wherein the information description means comprises means for storing motion-sequence representations of the concepts.

144. The system of claim 117 wherein the information description means comprises means for storing graphic representations of the concepts.

145. The system of claim 117 wherein the information description means comprises means for storing auditory representations of the concepts.

146. The system of claim 117 wherein the dynamic categorization means comprises:
similarity generation means for generating a plurality of definitions of similarity; and
similarity selection means for selecting a similarity definition.

147. The system of claim 146 wherein the similarity generation means comprises:
similarity attribute selection means for generating a list of selected attributes for use in a definition of similarity;
similarity attribute value selection means for generating a list of selected attribute values for use in the definition of similarity; and
similarity weighting means for generating a weighting of members of the list of selected attributes and the list of selected attribute values for use in the definition of similarity.

148. The system of claim 147 wherein the similarity generation means further comprises user definition means comprising:
user change means for allowing the user to change the definition of similarity by altering the list of selected attributes, the list of selected attribute values or the weighting; and
user define means for allowing the user to generate a new definition of similarity by specifying a new list of selected attributes, a new list of selected attribute values and a new weighting.

149. The system of claim 147 wherein the dynamic categorization means further comprises:
similarity-concept constraint means for generating a similarity-presentation list of similarity-concepts to be presented and for selecting a top concept;
similarity organization means for organizing the similarity-presentation list by degree of similarity of concepts to the top concept using the weighting;
similarity presentation means for displaying for the user a plurality of concepts simultaneously including a top concept and a plurality of related concepts which are organized by similarity to the top concept; and
navigation-similarity means for presenting the user with a technique of navigating through the similarity-concepts.

150. The system of claim 149 wherein the similarity presentation means comprises:
information access means for allowing the user to request information which bears a relationship to a concept, the concept and the relationship being selected by the user; and
information generation means for generating a list of concepts which bears the selected relationship to the selected concept.

151. The system of claim 149 wherein the similarity-concept constraint means comprises:
system similarity-list construction means for allowing the system to generate the similarity-presentation list of similarity-concepts using a particular context;

user similarity-list construction means for allowing the user to generate the similarity-presentation list of similarity-concepts;

system top-selection means for allowing the system to select the top concept using a particular context; and user top-selection means for allowing the user to select the top concept.

152. The system of claim 149 wherein the similarity organization means comprises:

weighting retrieval means for accessing a current weighting for the selected similarity definition; and rank ordering means for comparing the top concept to additional similarity-concepts in the similarity-presentation list using the current weighting, for using the comparison to generate a rank-ordered list of the similarity-concepts on a similarity scale, and for assigning a rank ordering to each similarity-concept.

153. The system of claim 152 wherein the similarity presentation means comprises:

ranking selection means for selecting a ranking cutoff comprising a minimum ranking a similarity-concept must have in order to be presented to the user;

similarity-concept presentation means for displaying the top concept and the similarity-concepts which exceed the ranking cutoff; and ranking presentation means for presenting the selected similarity definition and the rank orderings for the similarity-concepts.

154. The system of claim 153 wherein the navigation-similarity means comprises:

top concept alteration means for allowing the user to select a new top concept;

definition alteration means for allowing the user to select a new similarity definition; and similarity re-specification means for generating a new rank-ordering of similarity-concepts following selection of the new top concept or the new similarity definition.

155. The system of claim 146 wherein the similarity selection means comprises:

user select means for allowing the user to select a definition of similarity; and system select means for allowing the system to select a definition of similarity using a particular context.

156. A computerized information presentation system for dynamically organizing information by perspectives in order to present to a user previously unrecognized relationships among portions of the information and for presenting techniques for navigation through the perspectives comprising:

information description means for storing information comprising a plurality of perspective-concepts, the information description means comprising means for storing for each perspective-concept knowledge of allowable attributes for the perspective-concept and one or more of attributes, attribute values, and relationships among attributes and attribute values;

categorization knowledge means for storing knowledge of criteria for placing the perspective-concepts into categories suitable for organizing the perspective-concepts by perspectives;

context determination means for determining a current context based on system state;

mapping knowledge means for storing knowledge of mappings between a context and the presentation of information; and dynamic categorization means for dynamically organizing the perspective-concepts by perspectives using the categorization criteria, the context and the knowledge of mappings and for displaying perspectives on a user screen.

157. The system of claim 156 wherein the context determination means comprises:

user modeling means for generating a user model of the user's state of knowledge and the user's preferences by observing and analyzing activities and goals of the user; and system state means for generating a system model related to the information presentation by observing and analyzing states of the system.

158. The system of claim 157 wherein the user modeling means comprises means for storing information on available activities, comprising:

means for storing information on concepts conveyed by an activity;

means for storing information on concepts tested by an activity;

means for storing methods to call an activity;

means for storing methods to monitor user interaction with an activity; and means for storing methods to map between user interaction and an activity.

159. The system of claim 157 wherein the user modeling means comprises means for storing a concept network of relationships among concepts.

160. The system of claim 157 wherein the user modeling means comprises:

means for storing information on concepts studied by the user;

means for storing information on concepts understood by the user; and means for storing information on concepts not understood by the user.

161. The system of claim 110 wherein the user modeling means further comprises concept mapping means for mapping between knowledge about which concepts are understood by the user and selection of concepts to be displayed to the user.

162. The system of claim 157 wherein the user modeling means comprises means for generating a user history, comprising:

means for acquiring background data about the user;

means for acquiring information about major activities completed in previous user interaction sessions;

means for acquiring information about major activities completed in a current session;

means for acquiring information about a current activity;

means for acquiring information on the number of times the user engaged in an activity; and means for acquiring information on user preferences for presentation mode, navigation technique and displayform.

163. The system of claim 162 wherein the user modeling means further comprises preference mapping means for mapping between activities of the user and the user's preferences for displayforms and techniques of navigation.

164. The system of claim 157 wherein the user modeling means comprises means for acquiring temporal information relating to the user's interaction with the system.

165. The system of claim 164 wherein the means for acquiring temporal information comprises:
means for acquiring information about the user's response time while interacting with the system;
means for acquiring information about amount of time spent by the user in particular activities; and
means for acquiring information about temporal sequencing of the user's activities.

166. The system of claim 157 wherein the dynamic categorization means comprises:
perspective description means for defining a perspective as a conjunction of attribute values comprising one attribute value for each attribute in the perspective;
perspective organization means for organizing perspectives into perspective categories including physical perspectives and functional perspectives, physical perspectives comprising perspectives which are organized by physical relationships, functional perspectives comprising perspectives which are organized by functional relationships.

167. The system of claim 166 wherein the perspective organization means comprises perspective-type organization means for organizing perspective categories into a plurality of perspective-types within each category.

168. The system of claim 167 wherein the dynamic categorization means further comprises:
perspective constraint means comprising:
concept-perspective selection means for generating a perspective list of perspective-concepts which represents different perspectives of a focal concept;
perspective category selection means for selecting a perspective category; and
perspective-type selection means for generating a list of perspective-types by selecting one or more perspective-types from the perspective category;
perspective organization means for organizing the perspective list of perspective-concepts according to the selected perspective-types;
perspective presentation means for displaying to the user one or more concepts and their perspectives organized by perspective-type; and
navigation-perspective means for presenting the user with a technique of navigating through the perspectives.

169. The system of claim 168 wherein the perspective presentation means comprises:
information access means for allowing the user to request information which bears a relationship to a concept, the concept and the relationship being selected by the user; and
information generation means for generating a list of concepts which bears the selected relationship to the selected concept.

170. The system of claim 169 wherein the perspective presentation means further comprises information constraint means for removing concepts from the generated list of concepts which do not match the user model.

171. The system of claim 169 wherein the perspective presentation means further comprises displayform selection means for using the user model to select a displayform for a concept which matches the user's preferences.

172. The system of claim 171 wherein the displayform selection means comprises means for selecting a displayform from a group comprising text, graphical displays, motion sequences, auditory sequences and pictures.

173. The system of claim 168 wherein:
the concept-perspective selection means comprises:
focal concept selection means for selection of a focal concept; and
related concept selection means for generating a list of related concepts which are related to the focal concept; and
the perspective-type selection means comprises:
perspective-type generation means for generating a list of allowable perspective-types which map onto the focal concept, allowable perspective-types being constrained by the perspective category; and
perspective-type constraint means for generating a list of desired perspective-types by selecting one or more perspective-types from the list of allowable perspective-types.

174. The system of claim 168 wherein the perspective organization means comprises:
criteria determination means for using the knowledge of mappings to generate a list of allowable attributes and attribute values for the selected perspective-types;
attribute prioritization means for using the knowledge of mappings to generate a prioritized list of attributes and attribute values from the list of allowable attributes and attribute values;
standard perspective selection means for selecting a standard perspective for the selected perspective-types; and
search method means for searching for a concept which matches the standard perspective using the prioritized list of attributes and attribute values.

175. The system of claim 168 wherein the perspective presentation means comprises:
concept-perspective presentation means for displaying a concept representing a perspective;
perspective display means for displaying the concept's perspective as a conjunction of attribute values;
perspective relationship presentation means for displaying relationships between the selected perspective-types.

176. The system of claim 168 wherein the perspective presentation means comprises display two concepts means for displaying at least two concepts simultaneously.

177. The system of claim 168 wherein the navigation-perspective means comprises means for allowing the user to navigate through perspectives comprising:
perspective manipulation means comprising:
perspective-category alteration means for allowing the user or the system to change the perspective category;
perspective-type alteration means for allowing the user or the system to generate a new list of perspective-types; and
perspective alteration means for changing the perspective;
perspective re-organization means for dynamically re-organizing the perspective list of perspective-concepts following a change in perspective-category, perspective-types or perspective;

perspective re-selection means for selecting a new perspective to match the dynamically re-organized perspective list;

concept re-selection means for selecting a concept to match the new perspective; and perspective displayform alteration means for allowing the user to determine whether one or more concepts will be displayed simultaneously.

178. The system of claim 177 wherein the perspective manipulation means further comprises:

category-based alteration means for selecting a new perspective to match a change in perspective-category within a particular context;

type-based alteration means for selecting a new perspective to match a change in perspective-type within a particular context; and direct perspective alteration means for allowing the user or the system to select a new perspective by selecting a new attribute value.

179. The system of claim 166 wherein the perspective organization means comprises:

attribute value relationship means for describing relationships among attribute values; and attribute relationship means for describing relationships among attributes.

180. The system of claim 179 wherein the perspective organization means further comprises perspective physical relationship means for describing a physical perspective as a conjunction of attribute value physical relationships and attribute physical relationships.

181. The system of claim 179 wherein the perspective organization means further comprises perspective functional relationship means for describing a functional perspective as a conjunction of attribute value functional relationships and attribute functional relationships.

182. The system of claim 156 wherein the information description means comprises means for storing multimedia representations corresponding to multiple sensory modalities of the concepts and for storing methods to access the multi-media representations.

183. The system of claim 156 wherein the information description means comprises means for storing textual descriptions of the concepts.

184. The system of claim 156 wherein the information description means comprises means for storing pictorial representations of the concepts.

185. The system of claim 156 wherein the information description means comprises means for storing motion-sequence representations of the concepts.

186. The system of claim 156 wherein the information description means comprises means for storing graphic representations of the concepts.

187. The system of claim 156 wherein the information description means comprises means for storing auditory representations of the concepts.

188. The system of claim 156 wherein the dynamic categorization means comprises:

perspective description means for defining a perspective as a conjunction of attribute values comprising one attribute value for each attribute in the perspective;

perspective organization means for organizing perspectives into perspective categories including physical perspectives and functional perspectives, physical perspectives comprising perspectives which are organized by physical relationships, functional perspectives comprising perspectives which are organized by functional relationships.

189. The system of claim 188 wherein the perspective organization means comprises perspective-type organization means for organizing perspective categories into a plurality of perspective-types within each category.

190. The system of claim 187 wherein the dynamic categorization means further comprises:

perspective constraint means comprising:

concept-perspective selection means for generating a perspective list of perspective-concepts which represents different perspectives of a focal concept;

perspective category selection means for selecting a perspective category; and perspective-type selection means for generating a list of perspective-types by selecting one or more perspective-types from the perspective category;

perspective organization means for organizing the perspective list of perspective-concepts according to the selected perspective-types;

perspective presentation means for displaying to the user one or more concepts and their perspectives organized by perspective-type; and navigation-perspective means for presenting the user with a technique of navigating through the perspectives.

191. The system of claim 190 wherein the perspective presentation means comprises:

information access means for allowing the user to request information which bears a relationship to a concept, the concept and the relationship being selected by the user; and information generation means for generating a list of concepts which bears the selected relationship to the selected concept.

192. The system of claim 190 wherein:

the concept-perspective selection means comprises:

focal concept selection means for selection of a focal concept; and related concept selection means for generating a list of related concepts which are related to the focal concept; and the perspective-type selection means comprises:

perspective-type generation means for generating a list of allowable perspective-types which map onto the focal concept, allowable perspective-types being constrained by the perspective category; and perspective-type constraint means for generating a list of desired perspective-types by selecting one or more perspective-types from the list of allowable perspective-types.

193. The system of claim 190 wherein the perspective organization means comprises:

criteria determination means for using the knowledge of mappings to generate a list of allowable attributes and attribute values for the selected perspective-types;

attribute prioritization means for using the knowledge of mappings to generate a prioritized list of attributes and attribute values from the list of allowable attributes and attribute values;

standard perspective selection means for selecting a standard perspective for the selected perspective-types; and search method means for searching for a concept which matches the standard perspective using the prioritized list of attributes and attribute values.

194. The system of claim 190 wherein the perspective presentation means comprises:
concept-perspective presentation means for displaying a concept representing a perspective;
perspective display means for displaying the concept's perspective as a conjunction of attribute values;
perspective relationship presentation means for displaying relationships between the selected perspective-types.

195. The system of claim 190 wherein the perspective presentation means comprises display two concepts means for displaying at least two concepts simultaneously.

196. The system of claim 190 wherein the navigation-perspective means comprises means for allowing the user to navigate through perspectives comprising:
perspective manipulation means comprising:
perspective-category alteration means for allowing the user or the system to change the perspective category;
perspective-type alteration means for allowing the user or the system to generate a new list of perspective-types; and
perspective alteration means for changing the perspective;
perspective re-organization means for dynamically re-organizing the perspective list of perspective-concepts following a change in perspective-category, perspective-types or perspective;
perspective re-selection means for selecting a new perspective to match the dynamically re-organized perspective list;
concept re-selection means for selecting a concept to match the new perspective; and
perspective displayform alteration means for allowing the user to determine whether one or more concepts will be displayed simultaneously.

197. The system of claim 196 wherein the perspective manipulation means further comprises:
category-based alteration means for selecting a new perspective to match a change in perspective-category within a particular context;
type-based alteration means for selecting a new perspective to match a change in perspective-type within a particular context; and
direct perspective alteration means for allowing the user or the system to select a new perspective by selecting a new attribute value.

198. The system of claim 188 wherein the perspective organization means comprises:
attribute value relationship means for describing relationships among attribute values; and
attribute relationship means for describing relationships among attributes.

199. The system of claim 198 wherein the perspective organization means further comprises perspective physical relationship means for describing a physical perspective as a conjunction of attribute value physical relationships and attribute physical relationships.

200. The system of claim 198 wherein the perspective organization means further comprises perspective functional relationship means for describing a functional perspective as a conjunction of attribute value functional relationships and attribute functional relationships.

201. A computerized information presentation system for dynamically organizing information by graphical representations in order to present to a user previously unrecognized relationships among portions of the information and for presenting techniques for navigation through the information comprising:
information description means for storing information comprising a plurality of image-concepts, the information description means comprising means for storing for each image-concept knowledge of allowable attributes for the image-concept and one or more of attributes, attribute values, and relationships among attributes and attribute values;
categorization knowledge means for storing knowledge of criteria for placing the image-concepts into categories suitable for organizing the image-concepts by graphical representations;
context determination means for determining a current context based on system state;
mapping knowledge means for storing knowledge of mappings between a context and the presentation of information; and
dynamic categorization means for dynamically organizing the image-concepts by graphical representations using the categorization criteria, the context and the knowledge of mappings, for displaying manipulable graphical representations on a user screen, and for navigating by interpreting user manipulations.

202. The system of claim 201 wherein the context determination means comprises:
user modeling means for generating a user model of the user's state of knowledge and the user's preferences by observing and analyzing activities and goals of the user; and
system state means for generating a system model related to the information presentation by observing and analyzing states of the system.

203. The system of claim 202 wherein the user modeling means comprises means for storing information on available activities, comprising:
means for storing information on concepts conveyed by an activity;
means for storing information on concepts tested by an activity;
means for storing methods to call an activity;
means for storing methods to monitor user interaction with an activity; and
means for storing methods to map between user interaction and an activity.

204. The system of claim 202 wherein the user modeling means comprises means for storing a concept network of relationships among concepts.

205. The system of claim 202 wherein the user modeling means comprises:
means for storing information on concepts studied by the user;
means for storing information on concepts understood by the user; and
means for storing information on concepts not understood by the user.

206. The system of claim 205 wherein the user modeling means further comprises concept mapping means for mapping between knowledge about which concepts are understood by the user and selection of concepts to be displayed to the user.

207. The system of claim 202 wherein the user modeling means comprises means for generating a user history, comprising:
- means for acquiring background data about the user;
- means for acquiring information about major activities completed in previous user interaction sessions;
- means for acquiring information about major activities completed in a current session;
- means for acquiring information about a current activity;
- means for acquiring information on the number of times the user engaged in an activity; and
- means for acquiring information on user preferences for presentation mode, navigation technique and displayform.

208. The system of claim 207 wherein the user modeling means further comprises preference mapping means for mapping between activities of the user and the user's preferences for displayforms and techniques of navigation.

209. The system of claim 202 wherein the user modeling means comprises
- means for acquiring temporal information relating to the user's interaction with the system.

210. The system of claim 209 wherein the means for acquiring temporal information comprises:
- means for acquiring information about the user's response time while interacting with the system;
- means for acquiring information about amount of time spent by the user in particular activities; and
- means for acquiring information about temporal sequencing of the user's activities.

211. The system of claim 202 wherein the dynamic categorization means comprises:
- graphical representation means for generating graphical representations of the concepts;
- decomposition means for decomposing a graphical representation into a number of sub-components; and
- allowable change means for generating a list of allowable changes for a sub-component, allowable changes comprising changes which the user may make to the sub-component in a particular context.

212. The system of claim 211 wherein the dynamic categorization means further comprises:
- image-concept constraint means for generating an image presentation list of image-concepts which may be presented, and for selecting a pivotal image-concept;
- image organization means for generating an organization among the image-concepts based on relationships among the image-concepts' graphical representations;
- image presentation means for displaying for the user the pivotal image-concept and the pivotal image-concept's graphical representation; and
- navigation-image means for presenting the user with a technique of navigating through the image-concepts.

213. The system of claim 212 wherein the image presentation means comprises:
- information access means for allowing the user to request information which bears a relationship to a concept, the concept and the relationship being selected by the user; and
- information generation means for generating a list of concepts which bears the selected relationship to the selected concept.

214. The system of claim 213 wherein the image presentation means further comprises information constraint means for removing concepts from the generated list of concepts which do not match the user model.

215. The system of claim 213 wherein the image presentation means further comprises displayform selection means for using the user model to select a displayform for a concept which matches the user's preferences.

216. The system of claim 215 wherein the displayform selection means comprises means for selecting a displayform from a group comprising text, graphical displays, motion sequences, auditory sequences and pictures.

217. The system of claim 212 wherein the image-concept constraint means comprises:
- user select pivotal means for allowing the user to select the pivotal image-concept; and
- system select pivotal means for allowing the system to select the pivotal image-concept using the knowledge of mappings and a particular context.

218. The system of claim 212 wherein the image-concept constraint means comprises list generation means comprising:
- related image means for generating a list of related concepts which bear a graphical relationship to the pivotal concept; and
- list constraint means for generating the image-presentation list by removing concepts from the list of related concepts which do not match the user model.

219. The system of claim 212 wherein the image organization means comprises:
- sub-component access means for generating a list of pivotal-concept sub-components; and
- sub-component organization means for generating a sub-list of image-concepts for each pivotal-concept sub-component, the sub-list comprising the image-concepts which relate to the pivotal-concept sub-component.

220. The system of claim 219 wherein the navigation-image means comprises:
- manipulation means for allowing the user to manipulate a sub-component of the pivotal-concept;
- temporary representation means for generating a temporary graphical representation of the pivotal-concept incorporating the manipulation of the sub-component;
- concept retrieval means for accessing the sub-list of image-concepts for the manipulated sub-component;
- prioritization means for generating a list of rankings of members of the sub-list of image-concepts based on similarity between the temporary graphical representation and the graphical representation of each member of the sub-list; and
- select new image means for selecting the image-concept with the highest ranking in the list of rankings and for making it a new pivotal image-concept.

221. The system of claim 201 wherein the information description means comprises means for storing multi-media representations corresponding to multiple sensory modalities of the concepts and for storing methods to access the multi-media representations.

222. The system of claim 201 wherein the information description means comprises means for storing textual descriptions of the concepts.

223. The system of claim 201 wherein the information description means comprises means for storing pictorial representations of the concepts.

224. The system of claim 201 wherein the information description means comprises means for storing motion-sequence representations of the concepts.

225. The system of claim 201 wherein the information description means comprises means for storing graphic representations of the concepts.

226. The system of claim 201 wherein the information description means comprises means for storing auditory representations of the concepts.

227. The system of claim 201 wherein the dynamic categorization means comprises:
graphical representation means for generating graphical representations of the concepts;
decomposition means for decomposing a graphical representation into a number of sub-components; and
allowable change means for generating a list of allowable changes for a sub-component, allowable changes comprising changes which the user may make to the sub-component in a particular context.

228. The system of claim 227 wherein the dynamic categorization means further comprises:
image-concept constraint means for generating an image presentation list of image-concepts which may be presented, and for selecting a pivotal image-concept;
image organization means for generating an organization among the image-concepts based on relationships among the image-concepts' graphical representations;
image presentation means for displaying for the user the pivotal image-concept and the pivotal image-concept's graphical representation; and
navigation-image means for presenting the user with a technique of navigating through the image-concepts.

229. The system of claim 228 wherein the image presentation means comprises:
information access means for allowing the user to request information which bears a relationship to a concept, the concept and the relationship being selected by the user; and
information generation means for generating a list of concepts which bears the selected relationship to the selected concept.

230. The system of claim 228 wherein the image-concept constraint means comprises:
user select pivotal means for allowing the user to select the pivotal image-concept; and
system select pivotal means for allowing the system to select the pivotal image-concept using the knowledge of mappings and a particular context.

231. The system of claim 228 wherein the image-concept constraint means comprises list generation means comprising:
related image means for generating a list of related concept which bear a graphical relationship to the pivotal concept; and
list constraint means for generating the image-presentation list by removing concepts from the list of related concepts which do not match the current context.

232. The system of claim 228 wherein the image organization means comprises:
sub-component access means for generating a list of pivotal-concept sub-components; and
sub-component organization means for generating a sub-list of image-concepts for each pivotal-concept sub-component, the sub-list comprising the image-concepts which relate to the pivotal-concept sub-component.

233. The system of claim 232 wherein the navigation-image means comprises:
manipulation means for allowing the user to manipulate a sub-component of the pivotal-concept;
temporary representation means for generating a temporary graphical representation of the pivotal-concept incorporating the manipulation of the sub-component;
concept retrieval means for accessing the sub-list of image-concepts for the manipulated sub-component;
prioritization means for generating a list of rankings of members of the sub-list of image-concepts based on similarity between the temporary graphical representation and the graphical representation of each member of the sub-list; and
select new image means for selecting the image-concept with the highest ranking in the list of rankings and for making it a new pivotal image-concept.

234. A computerized information presentation system for dynamically organizing information into a manipulable, graphical representation of an equation in order to present to a user previously unrecognized relationships among portions of the information and for presenting techniques for navigation through the information comprising:
information description means for storing information comprising a plurality of concepts, the information description means comprising means for storing for each concept knowledge of allowable attributes for the concept and one or more of attributes, attribute values, and relationships among attributes and attribute values;
categorization knowledge means for storing knowledge of criteria for placing the concepts into categories suitable for organizing the concepts into a manipulable, graphical representation of an equation;
context determination means for determining a current context based on system state;
mapping knowledge means for storing knowledge of mappings between a context and the presentation of information; and
dynamic categorization means for dynamically organizing the concepts into a manipulable, graphical representation of an equation using the categorization criteria, the context and the knowledge of mappings and for displaying a manipulable, graphical representation of an equation on a user screen.

235. The system of claim 234 wherein the context determination means comprises:
user modeling means for generating a user model of the user's state of knowledge and the user's preferences by observing and analyzing activities and goals of the user; and
system state means for generating a system model related to the information presentation by observing and analyzing states of the system.

236. The system of claim 235 wherein the user modeling means comprises means for storing information on available activities, comprising:

means for storing information on concepts conveyed by an activity;

means for storing information on concepts tested by an activity;

means for storing methods to call an activity;

means for storing methods to monitor user interaction with an activity; and means for storing methods to map between user interaction and an activity.

237. The system of claim 235 wherein the user modeling means comprises means for storing a concept network of relationships among concepts.

238. The system of claim 235 wherein the user modeling means comprises:

means for storing information on concepts studied by the user;

means for storing information on concepts understood by the user; and means for storing information on concepts not understood by the user.

239. The system of claim 238 wherein the user modeling means further comprises concept mapping means for mapping between knowledge about which concepts are understood by the user and selection of concepts to be displayed to the user.

240. The system of claim 235 wherein the user modeling means comprises means for generating a user history, comprising:

means for acquiring background data about the user;

means for acquiring information about major activities completed in previous user interaction sessions;

means for acquiring information about major activities completed in a current session;

means for acquiring information about a current activity;

means for acquiring information on the number of times the user engaged in an activity; and means for acquiring information on user preferences for presentation mode, navigation technique and displayform.

241. The system of claim 240 wherein the user modeling means further comprises preference mapping means for mapping between activities of the user and the user's preferences for displayforms and techniques of navigation.

242. The system of claim 235 wherein the user modeling means comprises means for acquiring temporal information relating to the user's interaction with the system.

243. The system of claim 242 wherein the means for acquiring temporal information comprises:

means for acquiring information about the user's response time while interacting with the system;

means for acquiring information about amount of time spent by the user in particular activities; and means for acquiring information about temporal sequencing of the user's activities.

244. The system of claim 235 wherein the dynamic categorization means comprises equation constraint means comprising:

available equation means for generating a list of available equations, the list comprising equations which are available to the system;

equation-concept relationship means for determining relationship between equations and the concepts; and equation selection means for selecting the equation to be displayed.

245. The system of claim 244 wherein the equation-concept relationship means comprises:

relationship determination means for determining whether a relationship exists between an equation and a concept; and relationship type means for determining a relationship type for the relationship.

246. The system of claim 244 wherein the equation selection means comprises:

current concept means for generating a list of current concepts comprising concepts which are available in the current context;

equation constraint means for generating a list of related equations, the list comprising the equations which are related to the concepts in the list of current concepts;

user equation selection means for allowing the user to select the equation from the list of related equations; and system equation selection means for allowing the system to select the equation from the list of related equations based on a particular context.

247. The system of claim 246 wherein the system equation selection means comprises:

attention concept selection means for selecting an attention concept comprising the concept which has been manipulated most recently by the system or the user;

equation list constraint means for generating a constrained equation list by removing equations from the list of related equations which have no relationship to the attention concept;

prioritized equation list means for generating a prioritized equation list by rating equations in the constrained equation list using their relationship to the attention concept; and final equation selection means for selecting the equation by finding an equation from the prioritized equation list with a maximum priority rating.

248. The system of claim 235 wherein the dynamic categorization means further comprises equation display means comprising:

term display means for displaying terms of the equation;

term relationship display means for displaying relationships among the terms;

value display means for displaying values for the terms;

unit display means for displaying units for the terms;

definition display means for displaying definitions of the terms; and equation display mode means comprising:

numeric display means for displaying the equation in numeric form; and graphical display means for displaying the equation in graphical form.

249. The system of claim 248 wherein the equation display means further comprises:

information access means for allowing the user to request information which bears a relationship to a concept, the concept and the relationship being selected by the user; and information generation means for generating a list of concepts which bears the selected relationship to the selected concept.

250. The system of claim 249 wherein the equation display means further comprises information constraint means for removing concepts from the generated list of concepts which do not match the user model.

251. The system of claim 249 wherein the equation display means further comprises displayform selection means for using the user model to select a displayform for a concept which matches the user's preferences.

252. The system of claim 251 wherein the displayform selection means comprises means for selecting a displayform from a group comprising text, graphical displays, motion sequences, auditory sequences and pictures.

253. The system of claim 248 wherein the value display means comprises:
- typical value means for generating typical values for the terms;
- related value means for generating related values for the terms which relate to the attention concept; and
- value selection means for determining whether to display the typical values or the related values.

254. The system of claim 248 wherein the dynamic categorization means further comprises equation navigation means comprising:
- value alteration means for allowing the user to select a new term value by manipulating a term value in the graphical form or by manipulating a term value in the numeric form;
- value direct reconfiguration means for adjusting remaining term values when a new term value is selected by the user;
- unit alteration means for allowing the user to select a new unit;
- value unit alteration means for adjusting the term values when the new unit is selected;
- unit reconfiguration means for adjusting the units when the new unit is selected;
- form manipulation means for allowing the user to perform a form manipulation by replacing a term on the left side of the equation with a term from the right side of the equation;
- value form reconfiguration means for adjusting term values after form manipulation; and
- unit form reconfiguration means for adjusting units after form manipulation.

255. The system of claim 234 wherein the information description means comprises means for storing multi-media representations corresponding to multiple sensory modalities of the concepts and for storing methods to access the multi-media representations.

256. The system of claim 234 wherein the information description means comprises means for storing textual description of the concepts.

257. The system of claim 234 wherein the information description means comprises means for storing pictorial representations of the concepts.

258. The system of claim 234 wherein the information description means comprises means for storing motion-sequence representations of the concepts.

259. The system of claim 234 wherein the information description means comprises means for storing graphic representations of the concepts.

260. The system of claim 234 wherein the information description means comprises means for storing auditory representations of the concepts.

261. The system of claim 234 wherein the dynamic categorization means comprises equation constrain means comprising:
- available equation means for generating a list of available equations, the list comprising equations which are available to the system;
- equation-concept relationship means for determining relationships between equations and the concepts; and
- equation selection means for selecting the equation to be displayed.

262. The system of claim 261 wherein the equation-concept relationship means comprises:
- relationship determination means for determining whether a relationship exists between an equation and a concept; and
- relationship type means for determining a relationship type for the relationship.

263. The system of claim 261 wherein the equation selection means comprises:
- current concept means for generating a list of current concepts comprising concepts which are available in the current context;
- equation constraint means for generating a list of related equations, the list comprising the equations which are related to the concepts in the list of current concepts;
- user equation selection means for allowing the user to select the equation from the list of related equations; and
- system equation selection means for allowing the system to select the equation from the list of related equations based on a particular context.

264. The system of claim 263 wherein the system equation selection means comprises:
- attention concept selection means for selecting an attention concept comprising the concept which has been manipulated most recently by the system or the user;
- equation list constraint means for generating a constrained equation list by removing equations from the list of related equations which have no relationship to the attention concept;
- prioritized equation list means for generating a prioritized equation list by rating equations in the constrained equation list using their relationship to the attention concept; and
- final equation selection means for selecting the equation by finding an equation from the prioritized equation list with a maximum priority rating.

265. The system of claim 234 wherein the dynamic categorization means further comprises equation display means comprising:
- term display means for displaying terms of the equation;
- term relationship display means for displaying relationships among the terms;
- value display means for displaying values for the terms;
- unit display means for displaying units for the terms;
- definition display means for displaying definitions of the terms; and
- equation display mode means comprising:
  - numeric display means for displaying the equation in numeric form; and
  - graphical display means for displaying the equation in graphical form.

266. The system of claim 265 wherein the equation display means further comprises:
- information access means for allowing the user to request information which bears a relationship to a concept, the concept and the relationship being selected by the user; and information generation means for generating a list of concepts which bears the selected relationship to the selected concept.

267. The system of claim 265 wherein the value display means comprises:
typical value means for generating typical values for the terms;
related value means for generating related values for the terms which relate to the attention concept; and
value selection means for determining whether to display the typical values or the related values.

268. The system of claim 265 wherein the dynamic categorization means further comprises equation navigation means comprising:
value alteration means for allowing the user to select a new term value by manipulating a term value in the graphical form or by manipulating a term value in the numeric form;
value direct reconfiguration means for adjusting remaining term values when a new term value is selected by the user;
unit alteration means for allowing the user to select a new unit;
value unit alteration means for adjusting the term values when the new unit is selected;
unit reconfiguration means for adjusting the units when the new unit is selected;
form manipulation means for allowing the user to perform a form manipulation by replacing a term on the left side of the equation with a term from the right side of the equation;
value form reconfiguration means for adjusting term values after form manipulation; and
unit form reconfiguration means for adjusting units after form manipulation.

269. A computerized information presentation system for dynamically organizing information into a semantic net in order to present to a user previously unrecognized relationships among portions of the net and for presenting techniques for navigation through the net comprising:
information description means for storing information comprising a plurality of concepts, the information description means comprising means for storing for each concept knowledge of allowable attributes for the concept and one or more of attributes, attribute values, and relationships among attributes and attribute values;
categorization knowledge means for storing knowledge of criteria for placing the concepts into categories suitable for organizing the concepts into a semantic net;
context determination means for determining a current context based on system state;
mapping knowledge means for storing knowledge of mappings between a context and the presentation of information; and
dynamic categorization means for dynamically organizing the concepts into a semantic net using the categorization criteria, the context and the knowledge of mappings and for displaying a semantic net on a user screen.

270. The system of claim 269 wherein the context determination means comprises:
user modeling means for generating a user model of the user's state of knowledge and the user's preferences by observing and analyzing activities and goals of the user; and
system state means for generating a system model related to the information presentation by observing and analyzing states of the system.

271. The system of claim 270 wherein the user modeling means comprises means for storing information on available activities, comprising:
means for storing information on concepts conveyed by an activity;
means for storing information on concepts tested by an activity;
means for storing methods to call an activity;
means for storing methods to monitor user interaction with an activity; and
means for storing methods to map between user interaction and an activity.

272. The system of claim 270 wherein the user modeling means comprises means for storing a concept network of relationships among concepts.

273. The system of claim 270 wherein the user modeling means comprises:
means for storing information on concepts studied by the user;
means for storing information on concepts understood by the user; and
means for storing information on concepts not understood by the user.

274. The system of claim 273 wherein the user modeling means further comprises concept mapping means for mapping between knowledge about which concepts are understood by the user and selection of concepts to be displayed to the user.

275. The system of claim 270 wherein the user modeling means comprises means for generating a user history, comprising:
means for acquiring background data about the user;
means for acquiring information about major activites completed in previous user interaction sessions;
means for acquiring information about major activities completed in a current session;
means for acquiring information about a current activity;
means for acquiring information on the number of times the user engaged in an activity; and
means for acquiring information on user preferences for presentation mode, navigation technique and displayform.

276. The system of claim 275 wherein the user modeling means further comprises preference mapping means for mapping between activities of the user and the user's preferences for displayforms and techniques of navigation.

277. The system of claim 270 wherein the user modeling means comprises means for acquiring temporal information relating to the user's interaction with the system.

278. The system of claim 277 wherein the means for acquiring temporal information comprises:
means for acquiring information about the user's response time while interacting with the system;
means for acquiring information about amount of time spent by the user in particular activities; and
means for acquiring information about temporal sequencing of the user's activities.

279. The system of claim 270 comprising:
net building means for building the semantic net;
net alteration means for altering the semantic net;

net display means for displaying the semantic net; and
net navigation means for navigating through the semantic net.

280. The system of claim 279 wherein the net building means comprises:
concept net definition means for generating a list of net concepts to be placed in the semantic net;
relationship net definition means for generating a list of net relationships to be used in the semantic net;
node definition means for generating a node for each net concept in the list of net concepts;
link-type definition means for generating a link-type for each relationship in the list of net relationships; and
relationship placement means for adding a link between two nodes by defining a relationship between two concepts.

281. The system of claim 279 wherein the net alteration means comprises:
node addition means for adding a node to the semantic net, the node to be added being an add node;
node deletion means for deleting a node from the semantic net, the node to be deleted being a delete node;
link addition means for placing a link between two nodes in the semantic net, the link to be added being an add link;
link deletion means for deleting a link between two nodes in the semantic net, the link to be deleted being a delete link;
link-type addition means for adding a link-type to the semantic net, the link-type to be added being an add link-type; and
link-type deletion means for removing a link-type from the semantic net, the link-type to be removed being a delete link-type.

282. The system of claim 281 wherein the node addition means comprises:
node check means for prohibiting the user from adding an add node to the semantic net which already exists in the semantic net; and
node find means for displaying a portion of the semantic net which contains the add node.

283. The system of claim 281 wherein the node deletion means comprises:
node removal means for removing a delete node from the semantic net; and
node link removal means for removing links connected to the delete node in the semantic net.

284. The system of claim 281 wherein the link addition means comprises:
link check means for prohibiting the user from adding between two nodes an add link which already exists in the semantic net; and
link find means for displaying a portion of the semantic net which contains the add link.

285. The system of claim 281 wherein the link-type deletion means comprises link-type link removal means for removing links of the delete link-type from the semantic net.

286. The system of claim 279 wherein the net display means comprises:
node display means for displaying nodes in the semantic net;
link display means for displaying links between nodes in the semantic net;
link-type display means for displaying a link-type for each link in the semantic net; and
node portion display means for selectively displaying a center node and for displaying nodes and links which emanate from the center node.

287. The system of claim 279 wherein the net display means comprises:
information access means for allowing the user to request information which bears a relationship to a concept, the concept and the relationship being selected by the user; and
information generation means for generating a list of concepts which bears the selected relationship to the selected concept.

288. The system of claim 287 wherein the net display means further comprises information constraint means for removing concepts from the generated list of concepts which do not match the user model.

289. The system of claim 287 wherein the net display means further comprises displayform selection means for using the user model to select a displayform for a concept which matches the user's preferences.

290. The system of claim 289 wherein the displayform selection means comprises means for selecting a displayform from a group comprising text, graphical displays, motion sequences, auditory sequences and pictures.

291. The system of claim 279 wherein the net navigation means comprises:
center node selection means for selecting a center node for the semantic net display; and
filtering means for displaying for the user a portion of the semantic net by filtering out nodes and link-types.

292. The system of claim 291 wherein the net navigation means further comprises:
menu selection means for allowing the user to select the center node and to filter out nodes and link-types by making selections from a menu; and
natural language means for allowing the user to select the center node and for filtering out nodes and link-types by using natural language.

293. The system of claim 291 wherein the center node selection means comprises:
user select center means for allowing the user to select the center node; and
system select center means for allowing the system to select the center node using the current context.

294. The system of claim 291 wherein the filtering means comprises:
link-type generation means for generating a list of available link-types;
user link-type selection means for allowing the user to generate a list of desired link-types for presentation from the list of available link-types; and
system link-type selection means for allowing the system to generate a list of desired link-types for presentation from the list of available link-types using the current context.

295. The system of claim 269 wherein the information description means comprises means for storing multi-media representations corresponding to multiple sensory modalities of the concepts and for storing methods to access the multi-media representations.

296. The system of claim 269 wherein the information description means comprises means for storing textual descriptions of the concepts.

297. The system of claim 269 wherein the information description means comprises means for storing pictorial representations of the concepts.

298. The system of claim 269 wherein the information description means comprises means for storing motion-sequence representations of the concepts.

299. The system of claim 269 wherein the information description means comprises means for storing graphic representations of the concepts.

300. The system of claim 269 wherein the information description means comprises means for storing auditory representations of the concepts.

301. The system of claim 269 comprising:
net building means for building the semantic net;
net alteration means for altering the semantic net;
net display means for displaying the semantic net; and
net navigation means for navigating through the semantic net.

302. The system of claim 301 wherein the net building means comprises:
concept net definition means for generating a list of net concepts to be placed in the semantic net;
relationship net definition means for generating a list of net relationships to be used in the semantic net;
node definition means for generating a node for each net concept in the list of net concepts;
link-type definition means for generating a link-type for each relationship in the list of net relationships; and
relationship placement means for adding a link between two nodes by defining a relationship between two concepts.

303. The system of claim 301 wherein the net alteration means comprises:
node addition means for adding a node to the semantic net, the node to be added being an add node;
node deletion means for deleting a node from the semantic net, the node to be deleted being a delete node;
link addition means for placing a link between two nodes in the semantic net, the link to be added being an add link;
link deletion means for deleting a link between two nodes in the semantic net, the link to be deleted being a delete link;
link-type addition means for adding a link-type to the semantic net, the link-type to be added being an add link-type; and
link-type deletion means for removing a link-type from the semantic net, the link-type to be removed being a delete link-type.

304. The system of claim 303 wherein the node addition means comprises:
node check means for prohibiting the user from adding an add node to the semantic net which already exists in the semantic net; and
node find means for displaying a portion of the semantic net which contains the add node.

305. The system of claim 303 wherein the node deletion means comprises:
node removal means for removing a delete node from the semantic net; and
node link removal means for removing links connected to the delete node in the semantic net.

306. The system of claim 303 wherein the link addition means comprises:
link check means for prohibiting the user from adding between two nodes an add link which already exists in the semantic net; and
link find means for displaying a portion of the semantic net which contains the add link.

307. The system of claim 303 wherein the link-type deletion means comprises link-type link removal means for removing links of the delete link-type from the semantic net.

308. The system of claim 301 wherein the net display means comprises:
node display means for displaying nodes in the semantic net;
link display means for displaying links between nodes in the semantic net;
link-type display means for displaying a link-type for each link in the semantic net; and
node portion display means for selectively displaying a center node and for displaying nodes and links which emanate from the center node.

309. The system of claim 301 wherein the net display means comprises:
information access means for allowing the user to request information which bears a relationship to a concept, the concept and the relationship being selected by the user; and
information generation means for generating a list of concepts which bears the selected relationship to the selected concept.

310. The system of claim 301 wherein the net navigation means comprises:
center node selection means for selecting a center node for the semantic net display; and
filtering means for displaying for the user a portion of the semantic net by filtering out nodes and link-types.

311. The system of claim 310 wherein the net navigation means further comprises:
menu selection means for allowing the user to select the center node and to filter out nodes and link-types by making selections from a menu; and
natural language means for allowing the user to select the center node and for filtering out nodes and link-types by using natural language.

312. The system of claim 310 wherein the center node selection means comprises:
user select center means for allowing the user to select the center node; and
system select center means for allowing the system to select the center node using the current context.

313. The system of claim 310 wherein the filtering means comprises:
link-type generation means for generating a list of available link-types;
user link-type selection means for allowing the user to generate a list of desired link-types for presentation from the list of available link-types; and
system link-type selection means for allowing the system to generate a list of desired link-types for presentation from the list of available link-types using the current context.

* * * * *

UNITED STATES PATENT AND TRADEMARK OFFICE
CERTIFICATE OF CORRECTION

PATENT NO. : 4,905,163   Page 1 of 2

DATED : February 27, 1990

INVENTOR(S) : Garber et al.

It is certified that error appears in the above-identified patent and that said Letters Patent is hereby corrected as shown below:

Abstract, line 4, after "information" insert --and for presenting techniques for navigation through the information--.

Column 4, line 50, "EkgLab)" should be --EkgLab:--.

Column 6, line 8, "points" should be --point--.

Column 7, line 4, "Systems" should be --System--.

Column 18, line 45, "'through'" should be --'thorough'--.

Column 27, line 7, add -- ©1988 3M Company--.

Column 28, line 22, add -- ©1988 3M Company--.

Column 38, line 38, after "machine." insert --Related concepts might include different views of the copying machine.--.

Column 39, line 30, after "system" (2nd) insert --on the model of car and ask the user to examine the car with the Focus system--.

Column 41, line 17, add -- ©1988 3M Company--.

Column 43, line 23, add -- ©1988 3M Company--.

Column 43, line 55, add -- ©1988 3M Company--.

Column 54, line 22, "Poisueille's" should be --Poiseuille's--.

Column 63, line 33, add -- ©1988 3M Company--.

Column 65, line 50, after "was" insert --described above in--.

UNITED STATES PATENT AND TRADEMARK OFFICE
CERTIFICATE OF CORRECTION

PATENT NO. : 4,905,163

DATED : February 27, 1990

INVENTOR(S) : Garber et al.

It is certified that error appears in the above-identified patent and that said Letters Patent is hereby corrected as shown below:

Column 71, line 49, "calim" should be --claim--.

Column 90, line 42, "110" should be --160--.

Column 99, line 61, "concept" should be --concepts--.

Column 101, line 65, "relationship" should be --relationships--.

Signed and Sealed this

Eleventh Day of June, 1991

Attest:

HARRY F. MANBECK, JR.

Attesting Officer

Commissioner of Patents and Trademarks